US006650965B2

(12) United States Patent
Takagi et al.

(10) Patent No.: US 6,650,965 B2
(45) Date of Patent: Nov. 18, 2003

(54) ROBOT APPARATUS AND BEHAVIOR DECIDING METHOD

(75) Inventors: Tsuyoshi Takagi, Kanagawa (JP); Masahiro Fujita, Saitama (JP); Rika Hasegawa, Chiba (JP); Kotaro Sabe, Tokyo (JP); Craig Ronald Arkin, Atlanta, GA (US)

(73) Assignee: Sony Corporation, Tokyo (JP)

( * ) Notice: Subject to any disclaimer, the term of this patent is extended or adjusted under 35 U.S.C. 154(b) by 209 days.

(21) Appl. No.: 09/979,434

(22) PCT Filed: Mar. 26, 2001

(86) PCT No.: PCT/JP01/02419
§ 371 (c)(1),
(2), (4) Date: Mar. 13, 2002

(87) PCT Pub. No.: WO01/70468
PCT Pub. Date: Sep. 27, 2001

(65) Prior Publication Data
US 2002/0156751 A1 Oct. 24, 2002

(30) Foreign Application Priority Data
Mar. 24, 2000 (JP) ........................................ 2000-088596

(51) Int. Cl.[7] .............................................. G06F 19/00
(52) U.S. Cl. ........................ 700/245; 700/246; 700/248; 700/250; 700/259; 701/23; 701/301; 318/568.12; 901/1
(58) Field of Search .............................. 700/245, 246, 700/250, 248, 259; 318/568.12; 701/23, 301; 901/1

(56) References Cited

U.S. PATENT DOCUMENTS

| 4,657,104 | A | * | 4/1987 | Holland ........................ 180/211 |
| 5,870,527 | A | | 2/1999 | Fujikawa et al. ............ 700/245 |
| 5,963,712 | A | * | 10/1999 | Fujita et al. ............ 318/568.12 |
| 6,038,493 | A | * | 3/2000 | Tow ............................. 700/259 |
| 6,058,385 | A | * | 5/2000 | Koza et al. ..................... 706/13 |
| 6,275,773 | B1 | * | 8/2001 | Lemelson et al. ........... 340/436 |
| 6,321,140 | B1 | * | 11/2001 | Fujita et al. ................. 250/253 |

FOREIGN PATENT DOCUMENTS

| JP | 8-76810 | 3/1996 |
| JP | 9-114514 | 5/1997 |
| JP | 10-333731 | 12/1998 |
| JP | 11-143849 | 5/1999 |

OTHER PUBLICATIONS

Breazeal et al., Infant–like social interactions between a robot and a human caregiver, 1998, Internet, p.1–p.44.*
Hara et al. Real–time facial interaction between human and 3D face robot agent, 1996, Internet/IEEE, pp. 401–409.*

* cited by examiner

Primary Examiner—William A. Cuchlinski, Jr.
Assistant Examiner—McDieunel Marc
(74) Attorney, Agent, or Firm—Frommer Lawrence & Haug LLP; William S. Frommer; Dennis M. Smid

(57) ABSTRACT

A behavior decision system (70) includes a perceptual information acquisition unit (90) which acquires a cause factor being external or internal information acquired by a CCD camera (20), distance sensor (22), microphone (23) or the like and which influences a behavior and a motivational information acquisition unit (81) which acquires an occurrence tendency of a behavior influenced by the cause factor based on the cause factor from the perceptual information acquisition unit (90), a behavior selecting processor (82) which compares occurrence tendencies corresponding to two or more behaviors, acquired by the perceptual information acquisition unit (90) and motivational information acquisition unit (81) and belonging to the same group, to thereby select one of the behaviors, and an output semantics converter module (68) which controls moving parts based on the behavior selected by the behavior selecting processor (82) for expressing the selected behavior. With the behavior decision system, there can be provided a robot having an improved likeness to a living thing or a creature and showing a more similar behavior to that of an animal.

20 Claims, 33 Drawing Sheets

| | input | | output |
|---|---|---|---|
| MODULATOR: CAN ADD EMOTION STATE TO SELECTED BEHAVIOR. EX. SELECTED BEHAVIOR IS "MOVE-FORWARD" AND EMOTION STATE IS "ANGER" WHOSE LEVEL IS 100. | (Move-forward, 10cm) | (Anger,100) From IEModel | (Move-forward, 10, Anger, 100) |
| OUTPUT SEMANTICS CONVERTER MODULE: CONVERTS BEHAVIOR TO SEQUENCE OF MOTIONS CORRESPONDING TO TYPE OF ROBOT. ALSO, IT CONVERTS EMOTION STATE HAVING BEEN ADDED IN MODULATOR TO SEQUENCE OF MOTIONS. EX. ROBOT TYPE IS "QUADRUPED". | (Move-forward, 10, Anger, 100) | | (walk-forward, 10, speed level, 100) |
| POSTURE MANAGEMENT MODULE: MANAGES POSTURES AND MOTIONS OF ROBOT. MANAGING CURRENT POSTURE AND INTENDED POSTURE AND MOTION OF ROBOT, IT PREVENTS ROBOT FROM TAKING UNREASONABLE POSTURE TO AVOID INTERFERENCE WITH OTHER ROBOT. EX. WHEN ROBOT IN SITTING POSITION RECEIVES COMMAND "WALK FORWARD", POSTURE MANAGEMENT MODULE WILL MAKE SEARCH FOR SHORTEST PATH TO "WALKING" NODE AND ISSUE COMMANDS ONE AFTER ANOTHER TO NODE. | (walk-forward, 10, speed level, 100) | | 1. Sitting to Standing<br>2. (walk-forward, 10, speedlevel, 100) |
| Motion Replay / Motion Generator: RECEIVES COMMAND FROM POSTURE MANAGEMENT MODULE AND OUTPUTS ANGLE COMMAND TO CORRESPONDING MOTOR IN ROBOT. | 1. Sitting to Standing<br>2. (walk-forward, 10, speedlevel, 100) | | |

FIG.9

| SUBSYSTEM | MODE1 | MODE2 | MODULE |
|---|---|---|---|
| INVESTIGATIVE | | | Investigative Locomotio |
| | | | HeadinAirSniffing |
| | | | Sniffing Conspecific |
| | | | AlertLooking |
| | | | Investigative Nosing/Sn |
| | | | Scent Tracking |
| | | | Encounter |
| | | | Pointing |
| EPIMELETIC | Shelter Building | | Pre-Sleep Turning |
| | | | Dig Den Enlargement |
| | Grooming | | Scratching Self |
| | | | Object Rubbing |
| | | | Rolling on Ground |
| | | | Biting Own Fur |
| | | | Shaking Self |
| | | | Licking Self |
| | | | Licking Puppy |
| | | | Being Petted |
| | Feeding | | Nursing |
| | | | Regurgitation |
| | | | Burying Food |
| | Puppy Care | | Carry Food to Pups |
| | | | Carry Pup to Nest |
| | | | Push Pup with Nose |
| | | | Guarding Nest |
| ET-EPIMELETIC | | | Epimeletic Whining |
| | | | Whining For Attention |
| | | | Yelping For Attention |
| | | | Tail Wagging Friendly |
| | | | Licking Face/Hands |
| | | | Et-epimeletic Pawing |
| | | | Jumping Up |
| | | | Rooting for Nipple |
| | | | Close Following Caregive |

FIG.31

| | | |
|---|---|---|
| ALLELOMIMETIC | | Pack Locomotion |
| | | Stationary Pack Forming |
| | | Getting Up Together |
| | | Communal Sleeping |
| | | Howling In Unison |
| | | Solitary Howling |
| | | Communal Yawning |
| | | Pack Competition |
| AGONISTIC | Fighting predation | Agonistic Chasing |
| | | Fear Biting |
| | | Attack Biting |
| | | Agonistic Snapping Teet |
| | | Agonistic Pawing |
| | | Agonistic Growling |
| | | Agonistic Barking |
| | | Agonistic Snarling |
| | | TailWagging Deffensive |
| | | Herding Sequence |
| | | Agonistic Slamming |
| | | Fear Display |
| | Deffense/Escape | Defensive Sitting |
| | | Defensive Crouching |
| | | Running Away |
| | | Defensive Yelping |
| | | Defensive Tail Down |
| | | Defensive Rolling on B |
| | | Move Away From Thre |
| | | Seek Out Human |
| | Dominant Attitude | Forepaws on Back |
| | | Ritualized Agonistic Wr |
| | | Assume Dominant Post |
| | | Agonistic Circling |
| | | Mounting |
| | | Stare |
| | Subordinate Attitude | Remain Stationary |
| | | Submissive Tail Down |
| | | Assume Submissive Po |
| | | Appeasement |
| | | Head Turn Away |
| | | Submissive Grin |
| | | Submissive Lip Licking |
| | | Submissive Elimination |
| | | Agonistic Hair Raising |

FIG.31 (cont)

| SUBSYSTEM | MODE1 | MODE2 | MODULE |
|---|---|---|---|
| SEXUAL | Male | | Following Female |
| | | | Sexual Wrestling |
| | | | Assume Courtship Pose |
| | | | Sexual Licking |
| | | | Male Mounting |
| | | | Male Clasping |
| | | | Pelvic Thrusts |
| | | | Copulatory Tie |
| | Female | | Running with Male |
| | | | Nip Male |
| | | | Sexual Wrestling |
| | | | Assume Courtship Pose |
| | | | Invite Male |
| | | | Standing for Male |
| | | | Copulatory Tie |
| ELIMINATIVE | Male Micturition | | Standing Urination |
| | | | Raised Leg Urination |
| | | | Female Micturition |
| | | | Eliminative Wandering |
| | | | Defecation Sequence Mo |
| | | | Eliminative Scratching |
| | | | Revisit Previous Eliminate |
| | | | ScentMarking |
| | | | Pup Elimination |
| INGESTIVE | | | Lapping Liquids |
| | | | Eating Solid Food |
| | | | Gnawing Food |
| | | | Grass Eating |
| | | | Infantile Sucking |
| | | | Ingestive Head Shake |
| | | | Retrieving Food |

FIG.32

| | | |
|---|---|---|
| COMFORT-SEEKING | | Lyingin Heap |
| | | Lying Close Together |
| | | Curling Up |
| MISCELLANEOUS MOTORACTIVITY | | Sleep Twitching |
| | | Stretching |
| | | Yawning |
| | | Roll Over |
| | | Pain Reaction |
| PLAY | Play Eliciting | Play Greeting |
| | | Play Bow |
| | | Play Face |
| | Play Soliciting | Exaggerated Approach |
| | | Approach Withdrawal |
| | | Play Face Pawing |
| | | Play Face Licking |
| | Social Play | Play Biting |
| | | Social Play Pawing |
| | | Playful Chasing |
| | | Playful Being Chased |
| | | Fetch Play |
| | | Play Stalking |
| | | Play Pouncing |
| | | Play Leaping |
| | | Playful Circling |
| | Self-directed Play | Tail Chasing |
| | | Imaginary Pouncing |
| | Object Play | Play Mouth Grasp |
| | | Play Head Shake |
| MALADAPTIVE BEHAVIOR | | Passive Frustration |
| | | Angry Frustration |
| | | Growl at Owner |
| | | Aggression Towards Bab |
| | | Separation Anxiety |
| | | Hyper-Alert |
| | | Predatory Aggression |
| | | Rage Syndrome |

FIG.32 (cont)

ROBOT APPARATUS AND BEHAVIOR DECIDING METHOD

TECHNICAL FIELD

The present invention generally relates to a robot apparatus behavior deciding method and a robot apparatus, and more particularly to an autonomous robot apparatus and a method for deciding the behavior of the robot apparatus.

BACKGROUND ART

Recently, there have been proposed robot apparatuses shaped each like an animal, namely, so-called pet robots. Each of such robot apparatuses is shaped like a dog or cat kept in a common family, and autonomously behaves in response to the action such as "hitting" or "patting" by the user (owner) and adaptively to its surrounding environment. For example, its autonomous behavior includes "yelping", "mewing", "sleeping", etc. similar to the behavior of an actual animal.

If a robot apparatus could behave more similarly to an actual pet animal, it has an improved likeness to a living thing or a creature and the user will feel more familiar and satisfactory with such a robot apparatus. The robot apparatus will amuse the user thereof more than ever.

To make the robot apparatus behave like an actual animal, it has been proposed to use an ethological approach for decision of the robot apparatus behavior.

For example, as a result of the behavior study with the ethological approach, a state of motivation space representation was disclosed in the paper by Sibly, Mcfarland et al. (ethologists) in 1975. Also, Ludlow disclosed competitive models of behavior in 1976. These results were argued in the "Old Tricks, New Dogs: Ethology and Interactive Creatures" (April, 1997) by Bruce Mitchell Blumberg (Bruce of Arts, Amherst College, 1977; Master of Sciences, Sloan School of Management, MIT, 1981). Bruce Mitchell Blumberg applied the above-mentioned theories to dogs created by 3D CG (computer graphics) and proved the above theories to be a behavior selection mechanism.

It should be reminded that Bruce Mitchell Blumberg verified the behavior selection mechanism of the animals using CG, not by applying the mechanism to any robot apparatuses existing in the substantial space.

For a computer-graphically created virtual creature displayed on a display screen of a computer system, it is possible to make a direct coupling between selection and apparition of behavior (behavior selection=behavior apparition) and so feed back the behavior to its motivation by the selection. For an actual robot apparatus, however, the selection and apparition of behavior cannot always be coupled directly to each other (namely, the behavior selection is not always equal to the behavior apparition) for the following reasons.

Selected behavior is possibly canceled by behavior effected irrespective of schemed behavior such as reflexive one.

Without an input from a sensor, it cannot be known whether behavior could have really been done.

An example to which the reason described just above is applicable will be given below. That is, even when action to "kick the ball with the foot" is selected when the robot has reached a distance at which it can kick the ball and a behavior command is output (given to the robot), the robot apparatus cannot kick the ball in some cases, for example, if the ball lies on a slope. A result that "the ball could successfully be kicked", of the action to "kick the ball with the foot", can only be recognized when it has been recognized that the robot apparatus has touched the ball and the ball has been moved forward. Namely, for this recognition, it is necessary to evaluate the behavior based on information supplied from a sensor included in the robot apparatus and change the internal state of the robot apparatus according to the result of the evaluation.

As seen from the above, the technique proposed by Bruce Mitchell Blumberg is not enough to decide the behavior of a robot apparatus existing in the substantial space.

DISCLOSURE OF THE INVENTION

Accordingly, the present invention has an object to overcome the above-mentioned drawbacks of the prior art by providing a robot apparatus having an improved likeness to a living thing or a creature and a method for deciding the behavior of the robot apparatus.

The above object can be attained by providing a robot apparatus whose moving parts are controlled to make the robot apparatus behave expressively, the device including:

means for detecting external or internal information;

means for acquiring a cause factor influencing the behavior from the external or internal information detected by the information detecting-means;

means for acquiring an occurrence tendency of the cause factor-influenced behavior based on the cause factor acquired by the cause factor-acquiring-means;

means for making a comparison among occurrence tendencies of two or more behaviors, acquired by the occurrence tendency acquiring means and belonging to the same group;

means for selecting one of the behaviors based on the result of the occurrence tendency comparison made by the occurrence tendency comparing means; and means for controlling the moving parts based on the behavior selected by the behavior selecting means to have the robot apparatus express the selected behavior;

the occurrence tendency of the behavior selected by the behavior selecting means being varied adaptively to the cause factor which is variable due to the actual occurrence of the behavior.

In the robot apparatus constructed as above, external or internal information is detected by the information detecting-means, a cause factor influencing the behavior is acquired by the cause factor acquiring means from the external or internal information detected by the information detecting-means, and an occurrence tendency of the cause factor-influenced behavior is acquired by the occurrence tendency acquiring means based on the cause factor acquired by the cause factor acquiring means.

A comparison is made by the occurrence tendency comparing means among occurrence tendencies of two or more behaviors, acquired by the occurrence tendency acquiring means and belonging to the same group, one of the behaviors is selected by the behavior selecting means based on the result of the occurrence tendency comparison made by the occurrence tendency comparing means, and the moving parts are controlled by the moving part controlling means based on the behavior selected by the behavior selecting means to have the robot apparatus express the selected behavior. The occurrence tendency of the behavior selected by the behavior selecting means is varied adaptively to the cause factor which is variable due to the actual occurrence of the behavior.

The above robot apparatus selects one of the behaviors through a comparison between occurrence tendencies decided under the influence of the cause factor, and expresses the behavior as an ethological approach.

Also the above object can be attained by providing a method for deciding the behavior of a robot apparatus whose moving parts are controlled to have the robot apparatus behave expressively, the method including the steps of:

detecting external or internal information of the robot by an information detecting-means;

acquiring a cause factor influencing the behavior from the external or internal information detected in the information detecting step;

acquiring an occurrence tendency of the cause factor-influenced behavior based on the cause factor acquired in the cause factor acquiring step;

making a comparison among occurrence tendencies of two or more behaviors, acquired in the occurrence tendency acquiring step and belonging to the same group;

selecting one of the behaviors based on the result of the occurrence tendency comparison made in the occurrence tendency comparing step; and controlling the moving parts based on the behavior selected in the behavior selecting step to have the robot apparatus express the selected behavior;

the occurrence tendency of the behavior selected in the behavior selecting step being varied adaptively to the cause factor which is variable due to the actual occurrence of the behavior.

In the above robot apparatus behavior deciding method, external or internal information is detected in the information detecting step, a cause factor influencing the behavior is acquired in the cause factor acquiring step from the external or internal information detected in the information detecting step, and an occurrence tendency of the cause factor-influenced behavior is acquired in the occurrence tendency acquiring step based on the cause factor acquired in the cause factor acquiring step.

A comparison is made in the occurrence tendency comparing step among occurrence tendencies of two or more behaviors, acquired in the occurrence tendency acquiring step and belonging to the same group, one of the behaviors is selected in the behavior selecting step based on the result of the occurrence tendency comparison made in the occurrence tendency comparing step, and the moving parts are controlled in the moving part controlling step based on the behavior selected in the behavior selecting step to have the robot apparatus to express the selected behavior. The occurrence tendency of the behavior selected in the behavior selecting step is varied adaptively to the cause factor which is variable due to the actual occurrence of the behavior.

The above robot apparatus behavior detecting method selects one of the behaviors through a comparison between occurrence tendencies decided under the influence of the cause factor, and expresses the behavior as an ethological approach.

BRIEF DESCRIPTION OF THE DRAWINGS

FIG. 9 explains functions of the elements included in the second half of the behavior decision system.

FIG. 31 shows in detail the first half of each behavior group in the subsystem layer, mode layer and module layer.

FIG. 32 shows in detail the second half of each behavior group in the subsystem layer, mode layer and module layer.

BEST MODE FOR CARRYING OUT THE INVENTION

The best mode for carrying out the present invention will be described in detail with reference to the accompanying drawings. The best mode concerns a robot apparatus whose instinct and emotion (internal state) are changed based on external and internal factors and which behaves adaptively to the changes of the external and internal factors.

First the construction of the robot apparatus will be described, and then the applications of the present invention to the robot apparatus will be described in detail.

(1) Construction of the Robot Apparatus According to the Present Invention

Figure 1:
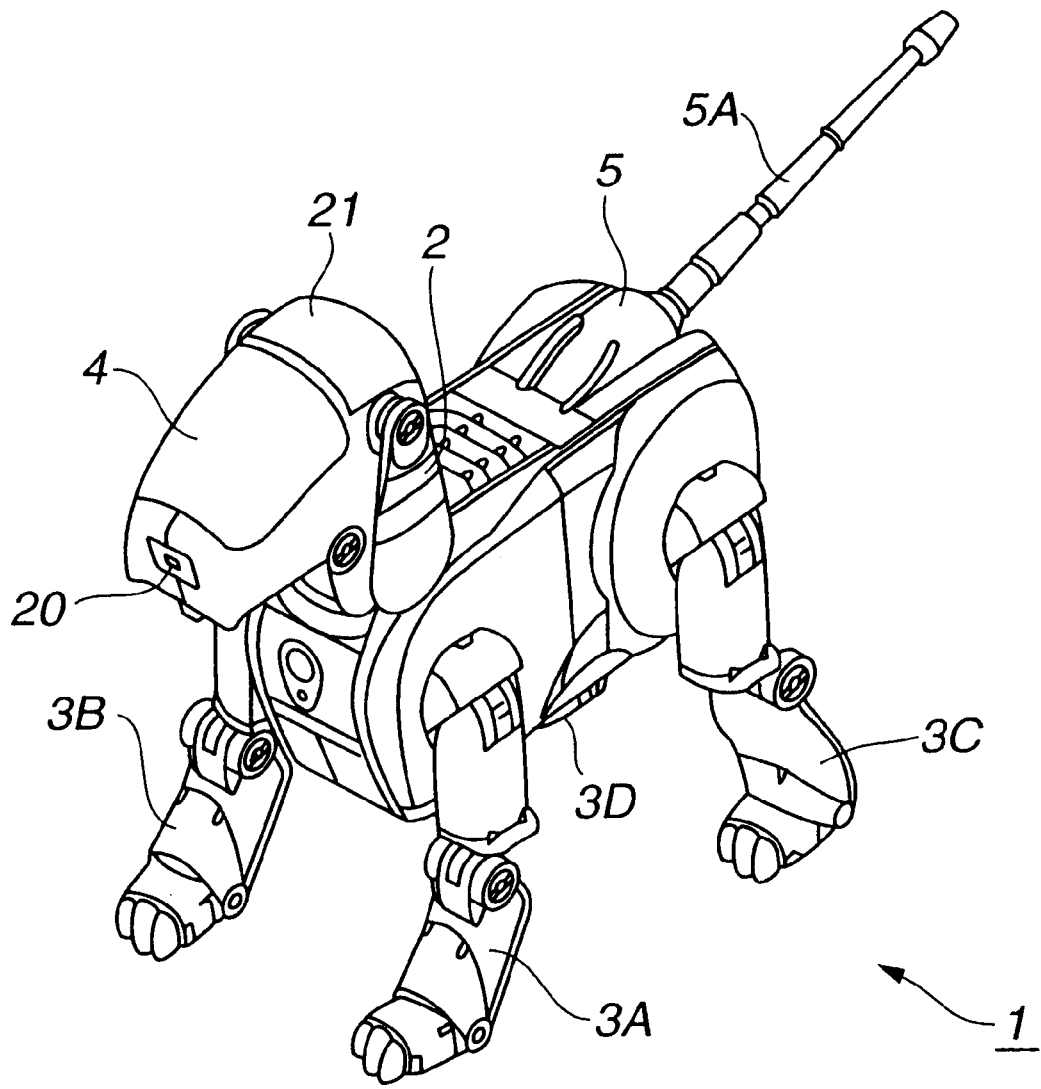
FIG. 1 is a perspective view of a robot apparatus according to the present invention.

As shown in FIG. 1, the robot apparatus (referred to simply as "robot" hereafter) is generally indicated with a reference 1. It is a pet robot shaped in the similitude of a "dog". As shown, the robot 1 includes a body unit 2, leg units 3A to 3D joined to the front right and left and rear right and left, respectively, of the body unit 2, and a head unit 4 and tail unit 5 joined to the front and rear ends, respectively, of the body unit 2.

Figure 2:
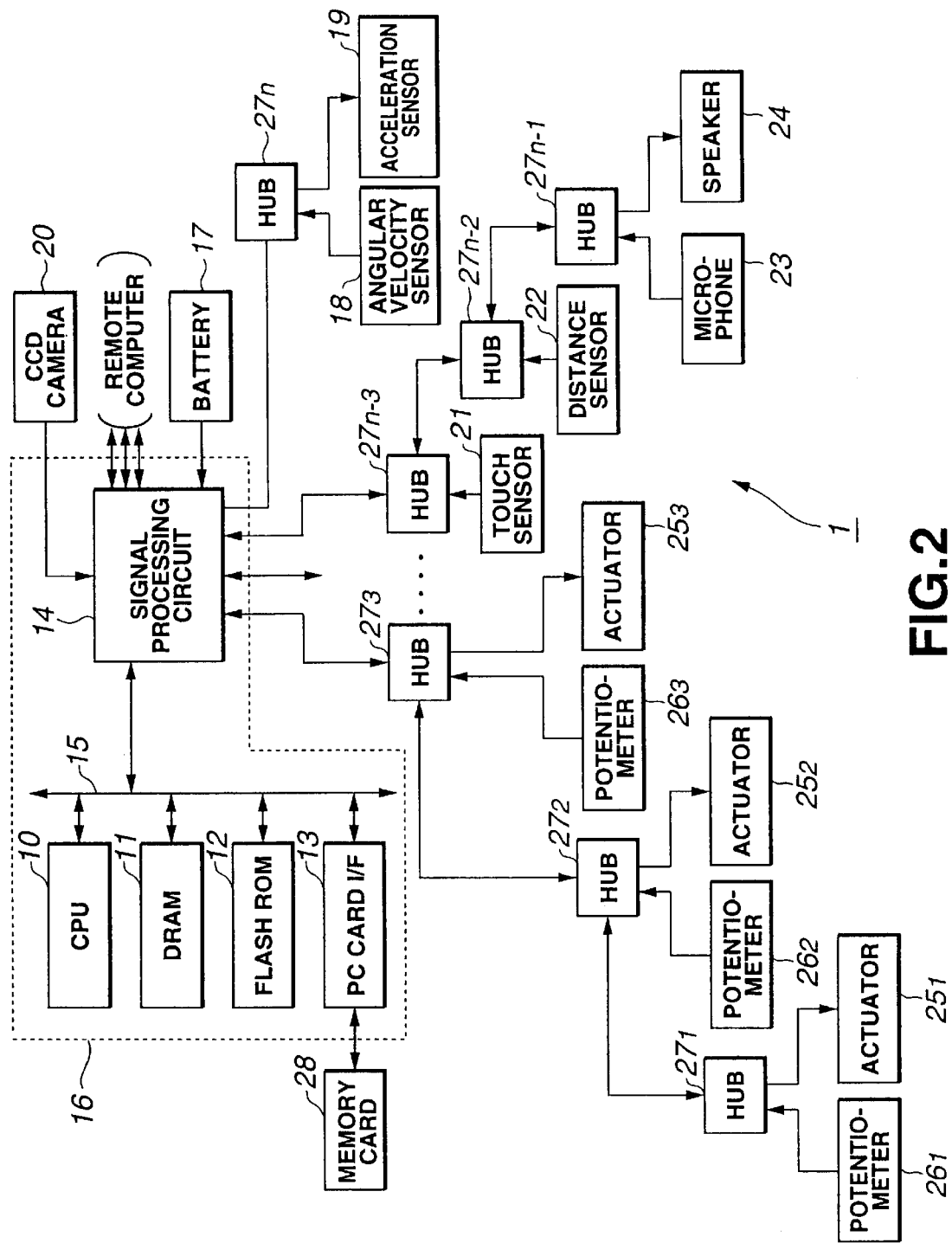
FIG. 2 is a block diagram of the circuit configuration of the robot apparatus in FIG. 1.

As shown in FIG. 2, the body unit 2 houses a CPU (central processing unit) 10, DRAM (dynamic random-access memory) 11, flash ROM (read-only memory) 12, PC (personal computer) card interface circuit 13 and a signal processing circuit 14, all connected to each other via an internal bus 15 to form a controller 16, and further a battery 17 to supply a power to the robot 1. Further the body unit 2 houses an angular velocity sensor 18 and acceleration sensor 19, to detect the orientation and acceleration of the robot 1, etc.

The head unit 4 houses a CCD (charge coupled device) camera 20 to image the environment surrounding the robot 1, a touch sensor 21 to detect a pressure given to the robot 1 as physical action such as "patting" or "hitting" by the user, a distance sensor 22 to measure a distance from an object existing before the robot 1, a microphone 23 to collect external sounds, a speaker 24 to output a sound such as barking, LEDs (light emitting diode) (not shown) as "eyes" of the robot 1, and so on, located in place, respectively.

Further, actuators 251, 252, . . . and potentiometers 261, 262, . . . are located in joints of the leg units 3A to 3D, articulations between the leg units 3A to 3D and body unit 2, an articulation between the head unit 4 and body unit 2, and in an articulation between a tail 5A and tail unit 5, respectively. The numbers of actuators and potentiometers used in each joint and articulation depend upon the degree of freedom of the actuator and potentiometer. For example, each of the actuators 251, 252, . . . uses a servo motor. As the servo motor is driven, the leg units 3A to 3D are controlled to shift to a target posture or motion.

Each of the angular velocity sensor 18, acceleration sensor 19, touch sensor 21, distance sensor 22, microphone 23, speaker 24, LEDs, actuators 251, 252, . . . and potentiometers 261, 262, . . . is connected to the signal processing circuit 14 of the controller 16 via a corresponding one of hubs 271 to 27n, and CCD camera 20 and battery 17 are connected directly to the signal processing circuit 14.

The signal processing circuit 14 sequentially acquires data supplied from each of the above sensors (these will be referred to as "sensor data" hereafter), image data and speech data, and stores each of them into place in the DRAM 11 via the internal bus 15. Also the signal processing circuit 14 sequentially acquires data supplied from the battery 17 and indicating the remaining potential in the battery 17, and stores each of them into place in the DRAM 11.

Based on each of the sensor data, image data, speech data and remaining battery potential data thus stored in the DRAM 11, the CPU 10 will control the behavior of the robot 1.

Actually, after the power is initially supplied to the robot 1, the CPU 10 reads a control program from a memory card 28 set in a PC card slot (not shown) in the body unit 2 or flash ROM 12 via the PC card interface circuit 13 or directly, and stores it into the DRAM 11.

Also, the CPU 10 determines the internal state of the robot 1, environment surrounding the robot 1, the existence of an instruction or action from the user, etc. based on the sensor data, image data, speech data, remaining battery potential data sequentially stored from the signal processing circuit 14 into the DRAM 11 as above.

Further, the CPU 10 decides the next behavior based on the determination result and the control program stored in the DRAM 11, and drives the necessary actuators 251, 252, . . . for the next behavior on the basis of the result of determination to thereby shake or nod the head unit 4, wag the tail 5A of the tail unit 5 or drive the leg units 3A to 3D for walking.

Also at this time, the CPU 10 generates speech data as necessary, and supplies it as speech signals to the speaker 24 via the signal processing circuit 14, thereby outputting a voice or speech created from the speech signals, turning on or off or flickering the LEDs.

Thus, the robot 1 autonomously behaves adaptively to its internal state or surrounding environment, or an instruction or action from the user.

(2) Software Structure of the Control Program

Figure 3:
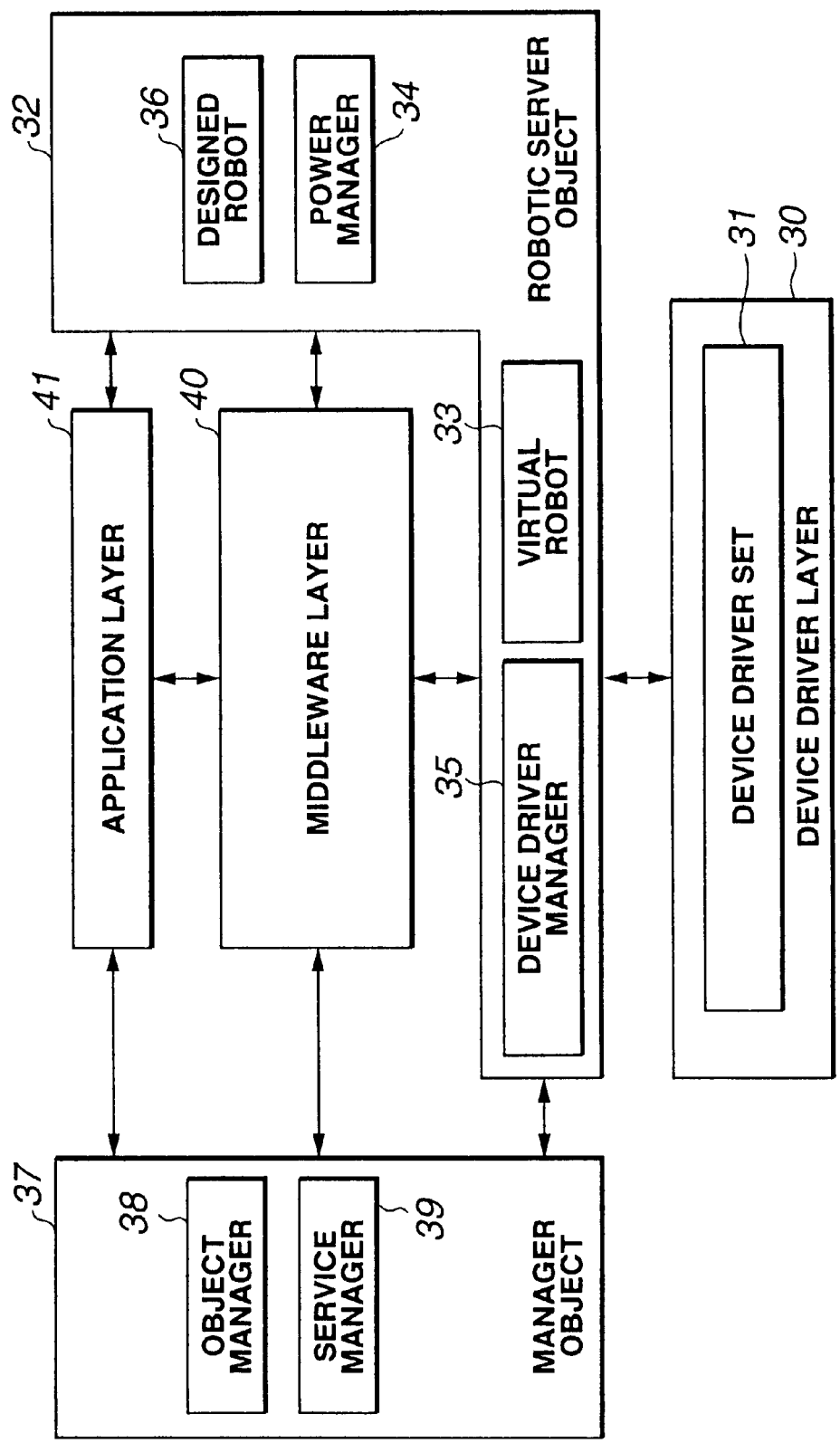
FIG. 3 is a block diagram of the software configuration of the robot apparatus in FIG. 1.

The above control program for the robot 1 has a software structure as shown in FIG. 3. As shown, a device driver layer 30 is positioned in the lowest layer of the control program, and consists of a device driver set 31 including multiple device drivers. In this case, each device driver is an object allowed to make a direct access to the CCD camera 20 (see FIG. 2) and an ordinary hardware used in a computer such as a timer, and works with an interruption from an appropriate hardware.

As shown in FIG. 3, a robotic server object 32 is also positioned in the lowest layer of the device driver layer 30. This object 32 consists of, for example, a virtual robot 33 including a software group which provides an interface for access to hardware such as the above-mentioned various sensors, actuators 251, 252, . . . , etc., a power manager 34 including a software group which manages power switching etc., a device driver manager 35 including a software group which manages other various device drivers, and a designed robot 36 including a software group which manages the mechanism of the robot 1.

There is also provided a manager object 37 consisting of an object manager 38 and service manager 39. In this case, the object manager 38 is a software group to manage start and termination of each of the software groups included in the robotic server object 32, middleware layer 40 and application layer 41, respectively. The service manager 39 is a software group which manages the association between objects on the basis of information on an association between objects stated in an association file stored in the memory card 28 (see FIG. 2).

The middleware layer 40 is positioned above the robotic server object 32 and consists of a software group which provides basic functions of the robot 1 such as image processing, speech processing, etc. The application layer 41 is positioned above the middleware layer 40 and consists of a software group which decides behavior of the robot 1 based on the result of a process effected by each software group included in the middleware layer 40.

Figure 4:
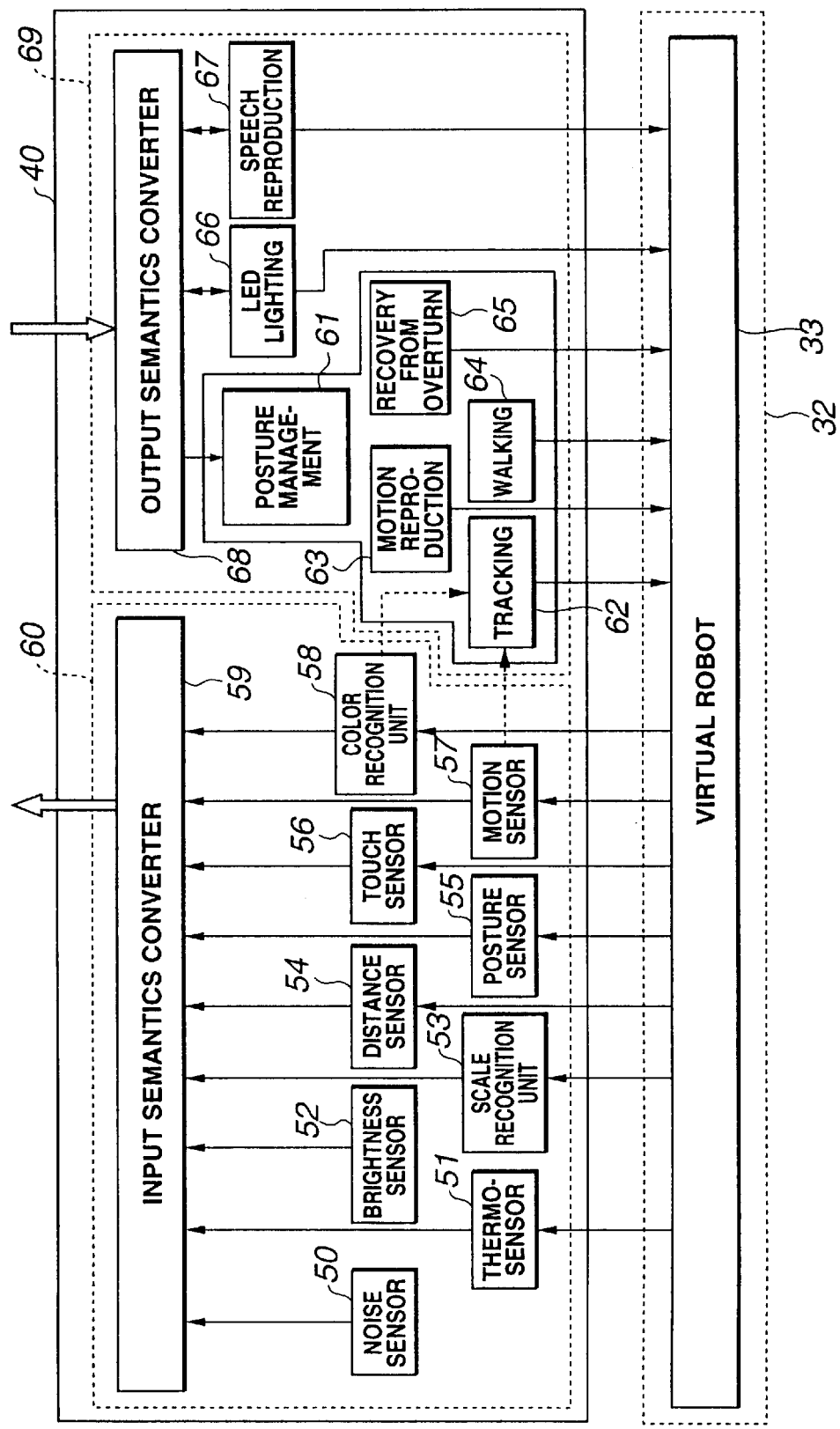
FIG. 4 is a block diagram of a middleware layer in the software configuration in the robot apparatus in FIG. 1.

The software structures of the middleware layer 40 and application layer 41 are shown in detail in FIG. 4.

As shown in FIG. 4, the middleware layer 40 consists of a recognition system 60 including signal processing modules 50 to 58 intended for noise detection, temperature detection, brightness detection, scale detection, distance detection, posture detection, touch sensing, motion detection and color recognition, respectively, and an input semantics converter module 59, and an output system 69 including an output semantics converter module 68 and signal processing modules 61 to 67 intended for posture management, tracking, motion reproduction, walking, recovery from overturn, LED lighting and speech reproduction, respectively.

The signal processing modules 50 to 58 in the recognition system 60 acquire appropriate sensor data, image data and speech data read from the DRAM 11 (see FIG. 2) by the virtual robot 33 in the robotic server object 32, process the data in a predetermined manner and supply the data processing result to the input semantics converter module 59. In this example, the virtual robot 33 is formed as a function to transfer or convert signals under a predetermined communication rule.

Based on the data processing result supplied from the signal processing modules 50 to 58, the input semantics converter module 59 recognizes the internal state and surrounding environment of the robot 1 such as "noisy", "hot", "bright", "ball was detected", "overturn was detected", "patted", "hit", "musical scale was heard", "moving object was detected" or "obstacle was detected", and an instruction or action from the user, and outputs the recognition result to the application layer 41 (see FIG. 2). Note that the application layer 41 has built therein a behavior decision system designed for decision of behavior, which will be described in detail later.

On the other hand, in the output system 69, the output semantics converter module 68 controls each of the signal processing modules 61 to 67 based on behavior information. That is, the output semantics converter module 68 responds to the recognition result from the recognition system 60 and outputs to each of the signal processing modules 61 to 67 control information (commands) adaptively to the internal state and surrounding environment of the robot 1 such as "noisy", "hot", "bright", "ball was detected", "overturn was detected", "patted", "hit", "musical scale was heard", "moving object was detected" or "obstacle was detected", and an instruction or action from the user.

The behavior information supplied to the output semantics converter module 68 includes abstract behavior command such as "go ahead", "joy", "whine" or "track(a all)". The output semantics converter module 68 supplies such behavior commands to each of the signal processing modules 61 to 67. The behavior information supplied to the output semantics converter module 68 originates from the behavior decision system which is a higher-order information processing system. The behavior decision system forms an essential part of the present invention, and will be described in detail later.

Each of the signal processing modules 61 to 67 works based on the behavior command from the output semantics converter module 68 to output a control signal for controlling each device to the virtual robot 33. More particularly, the signal processing modules 61 to 67 generate a servo command, sound data and/or drive data based on the received behavior command, and sequentially sends them to the actuators 251, 252, . . . (in FIG. 2), speaker 24 (in FIG. 2) and/or "eye's" LEDs, respectively, via the virtual robot 33 in the robotic server object 32 (in FIG. 3) and signal processing circuit 14 (in FIG. 2) in this order.

With each device controlled based on the signal (command) from the virtual robot 33, the robot 1 behaves in a predetermined manner.

Next, the behavior decision system is described that decides the next behavior (transitional action or intended action) based on a recognition result from the input semantics converter module 59 and output information on the thus decided behavior to the output semantics converter module 68.

(3) Configuration of the Robot Behavior Decision System

Figure 5:
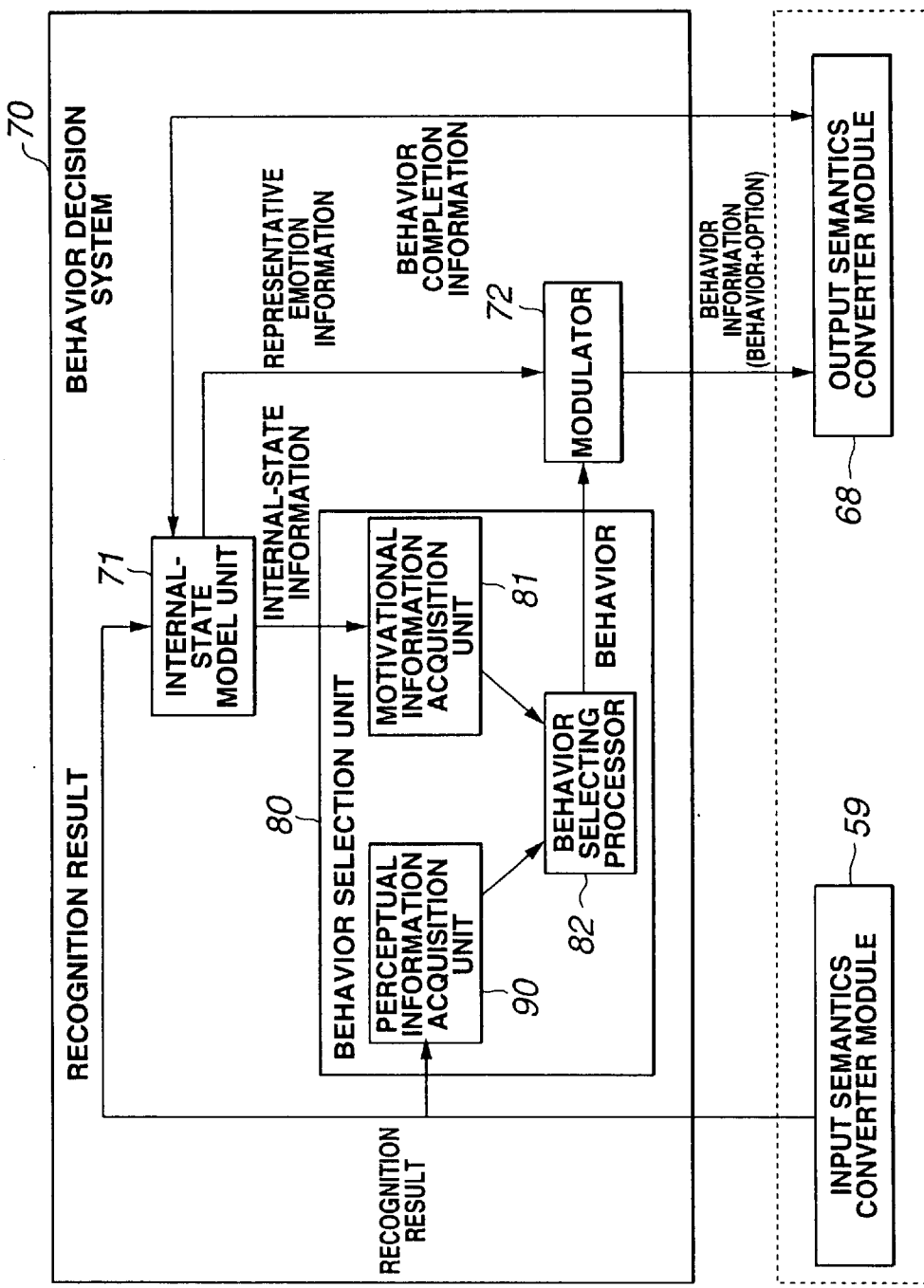
FIG. 5 is a block diagram of the robot apparatus behavior decision system.

The robot 1 decides a behavior (will also be referred to as "behavior" hereafter wherever appropriate) by a behavior decision system 70 as shown in FIG. 5. The behavior decision system 70 decides a behavior based on the recognition result from the input semantics converter module 59, and outputs information on the behavior to the output semantics converter module 68. As shown in FIG. 5, the behavior decision system 70 includes a behavior selection unit 80, internal-state model unit 71 and a modulator 72.

The behavior selection unit 80 selects the desired one from a set of behaviors. More specifically, the behavior selection unit 80 selects the desired behavior based on the recognition result from the input semantics converter module 59. The behavior selection unit 80 includes for example a perceptual information acquisition unit 90, motivational information acquisition unit 81 and a behavior selecting processor 82 to select a behavior.

In the behavior decision system 70, the perceptual information acquisition unit 90 and motivational information acquisition unit 81 function to acquire a cause factor being external or internal information detected by a detecting-means for detecting external or internal information, such as the CCD camera 20, distance sensor 22, microphone 23 or the like, and which influences the robot behavior, and to acquire an occurrence tendency of the behavior influenced by a cause factor detected by the cause factor acquiring means. The behavior selecting processor 82 in the behavior decision system 70 works to make a comparison among occurrence tendencies of two or more behaviors, acquired by the perceptual information acquisition unit 90 and motivational information acquisition unit 81 and belonging to the same group, and to select one of the behaviors based on the result of the occurrence tendency comparison thus made. Also in the behavior decision system 70, the output semantics converter module 68 controls the moving parts based on the behavior selected by the behavior selecting processor 82 to have the robot 1 express the selected behavior.

Then, the behavior selection unit 80 selects a behavior by means of the behavior selecting processor 82 based on the perceptual information acquired by the perceptual information acquisition unit 90 from the recognition result and motivational information acquired by the motivational information acquisition unit 81 from the internal state information supplied from the internal-state model unit 71. The behavior selection unit 80 will be described in detail later.

On the other hand, the internal-state model unit 71 has an internal-state model which changes the instinct and emotion (internal state) of the robot 1 adaptively to the external and internal factors. The term "external factor" used herein refers to for example "hit" information, "patted" information, an instruction from the user of the robot 1 or the like. The term "internal factor" refers to for example information of "battery potential has become lower", information of "body temperature has risen" or the like.

More specifically, the internal-state model unit 71 changes the internal state based on the recognition result supplied from the input semantics converter module 59 and outputs the internal state information to the behavior selection unit 80 and modulator 72.

The motivational information acquisition unit 81 acquires motivational information based on the above internal state information, which will be described in detail later.

On the other hand, the modulator 72 generates behavior information (behavior command) on a behavior to finally be expressed by the robot 1. More specifically, the modulator 72 generates behavior information to finally be expressed from a behavior selected by the behavior selection unit 80 and internal state information supplied from the internal-state model unit 71 and outputs the data to the output semantics converter module 68.

The modulator 72 can have the robot 1 express a behavior combined with the behavior decided (selected) by the behavior selection unit 80 and instinct and emotional states supplied from the internal-state model unit 71, combined with the behavior. That is, the behavior selection unit 80 selects a behavior "eat an apple" as the next behavior based on the recognition result and the like, while the internal-state model unit 71 acquires for example a state "angry" as the current internal state of the robot 1 based on the recognition result. Then, the modulator 72 combines the internal state "angry" with the behavior "eat an apple" based on the information and thus generates behavior information of "eat an apple angrily", and outputs the information to the output semantics converter module 68. The output semantics converter module 68 will signal each of the signal processing modules 61 to 67 to control each device which will in turn control each moving part, whereby the robot 1 is caused to express the next behavior (intended behavior), namely, to eat the apple angrily.

Also the internal state information indicative of the instinct and emotional states generated in the internal-state model unit 71 is used when deciding (selecting) a behavior of the robot 1, and also as combined with the decided behavior.

As above, the behavior decision system 70 decides a behavior based on the result of recognition. Each component of the behavior decision system 70 will be described in further detail below.

(3-1) Construction of the Internal-state Model Unit

The internal-state model unit 71 changes the internal state such as the instinct and emotion adaptively to external and internal factors. The instinct and emotional states supplied from the internal-state model unit 71 are used when deciding a behavior of the robot 1, and also as combined with the decided behavior.

The internal-state model unit 71 consists of a set of elements related to instinct (desire) and character which vary adaptively to external and internal factors.

More specifically, the internal-state model unit 71 includes a total of 27 elements indicative of internal state, whose 9 instinctive elements are "fatigue", "temperature", "pain", "hunger", "thirst", "affection", "curiosity", "elimination" and "sexual", and 18 emotional elements are "happiness", "sadness", "anger", "surprise", "disgust", "fear", "frustration", "boredom", "somnolence", "gregariousness", "patience", "tense", "relaxed", "alertness", "guilt", "spite", "loyalty", "submission" and "jealousy".

Each of the above emotional elements holds a parameter indicative of the intensity thereof. The internal-state model unit 71 cyclically changes the parameter of each of these elements based on a specific recognition result such as "hit" or "patted" supplied from the input semantics converter module 59, elapsed time, etc.

More particularly, the emotional elements uses a predetermined algorithm to compute a variation of the emotion at a time from a recognition result supplied from the input semantics converter module 59, behavior of the robot 1 at that time and elapsed time from the last renewal. Then, taking the emotion variation as $\Delta E[t]$, current parametric value of the emotion as $E[t]$ and coefficient indicating the sensitivity to the emotion as $k_e$, the internal-state model unit 71 determines a parametric value $E[t+1]$ of the emotion in the next cycle by computing an equation (1), and replaces the emotion parametric value $E[t+1]$ with the current parametric value $E[t]$ of the emotion, to replace the previous parametric value of the emotion.

$$E[t+1]=E[t]+k_e\times\Delta E[t] \qquad (1)$$

The internal-state model unit 71 similarly computes the equation (1) to renew the parametric values of all the remaining emotions such as "happiness".

Note that it is predetermined how much the recognition result and information from the output semantics converter module 68 influences the variation $\Delta E[t]$ of the parametric value of each emotion. The predetermination is such that for example, the result of recognition of "hit" will have a great influence on the variation $\Delta E[t]$ of the parametric value of the "anger" emotion, while the result of recognition of "patted" will have a great influence on the variation $\Delta E[t]$ of the parametric value of the "joy" emotion.

The information from the output semantics converter module 68 is feed back information on behavior (behavior-completion information). Namely, it is information on the result of behavior expression. The internal-state model unit 71 will change the emotion with such information, and also the instinct as will be described in detail later.

For example, "whining" behavior will lower the level of "anger" emotion. Note that the result of behavior may be fed back by an output (behavior having a feeling added thereto) of the modulator 72.

On the other hand, each desire (instinct) holds a parameter indicative of the extent thereof The internal-state model unit 71 cyclically renews the parametric value of each instinctive element included in the instinctive elements on the basis of a recognition result supplied from the input semantics converter module 59, elapsed time and information from the output semantics converter 68.

More particularly, the internal-state model unit 71 uses a predetermined algorithm to compute a variation of each instinct (desire) "fatigue", "affection", "curiosity", "sexual" and "elimination" at a time from a recognition result, elapsed time and information from the output semantics converter module 68. Then, taking the desire variation as $\Delta I[k]$, current parametric value of the desire as $I[k]$ and coefficient indicating the sensitivity to the desire as $K_i$, the internal-state model unit 71 determines a parametric value I[k+1] of the desire in the next cycle by computing an equation (2) in a given cycle, and replaces the value I[k+1] with the current parametric value I[k] of the desire, to replace the previous parametric value of the desire.

$$I[k+1]=I[k]+k_i \times \Delta I[k] \quad (2)$$

The internal-state model unit 71 also computes the above equation (2) to renew the parametric values of all the remaining elements of instinct (desire) such as "fatigue" in the same manner.

Note that it is predetermined how much the recognition result and information from the output semantics converter module 68 influences the variation ΔI[k] of the parametric value of each desire. The predetermination is such that for example, information from the output semantics converter module 68 will have a great influence on the variation ΔI[k] of the parametric value of "fatigue" state.

Also, the parametric value of a predetermined desire can be determined as described below.

For the "pain" element included in the instinctive elements, the number of times abnormal posture has been taken is taken as N, extent of the pain is taken as K1 and velocity of pain alleviation is taken as $K_2$ based on the number of times the abnormal posture received from the posture detecting signal processing module 55 in the middleware layer 40 via h input semantics converter module 59, and a parametric value I[k] of the "pain" is computed using the following equation (3), and the result of the computation is replaced with the parametric value I[k] of the current pain, thereby changing the parametric value of the "pain". When I[k]<0, I[k]=0, t=0 and N=0.

$$I[k]=K_1 \times N - K_2 \times t \quad (3)$$

For the instinctive element "temperature", the temperature is taken as T, outside air temperature is as $Y_0$ and coefficient of temperature elevation is as K3 based on temperature data supplied from the temperature detecting signal processing module 51 via the input semantics converter module 59. A parametric value I[k] of the "temperature" is computed using the following equation (4), and the result of the computation is replaced with the parametric value I[k] of the current temperature, thereby renewing the parametric value of the "temperature". When T−$T_0$<0, I[k]=0.

$$I[k]=(T-T_0) \times K_3 \quad (4)$$

For the instinctive element "hunger", the remaining battery potential is taken as BL based on remaining battery potential data (information acquired by a remaining batter potential detecting module (not shown)) supplied via the input semantics converter module 59, a parametric value I[k] of the "hunger" is computed using the following equation (5) in a predetermined cycle, and the result of the computation is replaced with the parametric value I[k] of the current hunger, thereby renewing the parametric value of the "hunger".

$$I[k]=100-B_L \quad (5)$$

For the instinctive element "thirst", it is assumed that based on the changing speed of the remaining battery potential data supplied via the input semantics converter module 59, the remaining battery potential is taken as $B_L(t)$ at a time t and remaining battery potentials are acquired at times $t_1$ and $t_2$, respectively. Then a parametric value I[k] of the "thirst" is computed using the following equation (6), and the result of the computation is replaced with the parametric value I[k] of the current thirst, thereby renewing the parametric value of the "thirst".

$$I[k]=\{B_L(t_2)-B_L(t_1)\}/(t_2-t_1) \quad (6)$$

Note that in this embodiment, the parametric values of each the emotions and desire elements (instinct) are defined to vary within a range of 0 to 100, and the coefficients $k_e$ and $k_i$ are also set for each of the emotions and desire elements.

The internal-state model unit 71 is constructed as above, and the robot 1 is adapted to autonomously behave with the instinct (desired) and emotional states (parameters) changed by the internal-state model unit 71 adaptively to its own internal state and the environmental condition in which the robot 1 exists.

(3-2) Instinct and Emotion Changes Corresponding to the Environment

In addition, the robot 1 adapts the emotions and instincts to the values of three of the ambient conditions, "noise", "temperature" and "illumination" (these will be referred to as "environmental conditions" hereafter). That is, for example, when the environment is "bright", the robot 1 becomes bright or cheerful, but when the robot 1 is in the "dark", it will be calm.

More specifically, the robot 1 includes, in addition to the previously mentioned CCD camera 20, distance sensor 22, touch sensor 21, microphone 23, etc., a temperature sensor (not shown) provided in place to detect the ambient temperature and which works as one of the external sensors to detect environmental conditions. According to the temperature sensor, the recognition system 60 in the middleware layer 40 includes signal processing modules 50 to 52 to detect the noise, temperature and brightness, respectively.

The noise-detecting signal processing module 50 is adapted to detect the level of ambient noise based on speech data provided by the microphone 23 (see FIG. 2) via the virtual robot 33 in the robotic server object 32, and outputs the detection result to the input semantics converter module 59.

Also, the temperature-detecting signal processing module 51 is adapted to detect an ambient temperature based on sensor data supplied from the thermosensor via the virtual robot 33, and outputs the detection result to the input semantics converter module 59.

Further, the brightness-detecting signal processing module 52 is adapted to detect an ambient illumination based on image data supplied from the CCD camera 20 (see FIG. 2) via the virtual robot 33, and outputs the detection result to the input semantics converter module 59.

The input semantics converter module 59 recognizes the level of each of the ambient "noise", "temperature" and "illumination" based on the outputs from the signal processing modules 50 to 52, and outputs the recognition result to the internal-state model unit 71 of the application module 41 (see FIG. 5).

More specifically, the input semantics converter module 59 recognizes the level of ambient "noise" based on an output from the noise detecting signal processing module 50, and outputs a recognition result like "noisy" or "quiet" to the internal-state model unit 71.

Also the input semantics converter module 59 recognizes the level of ambient "temperature" based on an output from the temperature detecting signal processing module 51, and outputs a recognition result like "hot" or "cold" to the internal-state model unit 71 and perceptual information acquisition unit 90.

Further the input semantics converter module 59 recognizes the intensity of ambient "illumination" based on an output from the brightness detecting signal processing module 52, and outputs a recognition result like "bright" or "dark" to the internal-state model unit 71.

The internal-state model unit 71 cyclically changes the parametric values by computing the equation (1) based on the various recognition results supplied from the input semantics converter module 59 as above.

Then the internal-state model unit 71 increases or decreases the value of the coefficient $k_e$ in equation (1) for a predetermined appropriate emotion based on the recognition results regarding "noise", "temperature" and "illumination" supplied from the input semantics converter module 59.

More particularly, for example, when a recognition result "noisy" is supplied, the internal-state model unit 71 will increase the value of the coefficient $k_e$ for the "anger" emotion by a predetermined number. On the other hand, when the recognition result supplied is "quiet", the internal-state model unit 71 will decrease the value of the coefficient $k_e$ for the "anger" emotion by a predetermined number. Thereby, the parametric value of the "anger" emotion will be changed under the influence of the ambient "noise".

Also, when a recognition result "hot" is supplied, the internal-state model unit 71 will decrease the value of the coefficient $k_e$ for the "joy" emotion by a predetermined number. On the other hand, when the recognition result supplied is "cold", the internal-state model unit 71 will increase the value of the coefficient $k_e$ for the "sadness" emotion by a predetermined number. Thus, the parametric value of the "sadness" emotion will be changed under the influence of the ambient "temperature".

Further, when a recognition result "bright" is supplied, the internal-state model unit 71 will decrease the value of the coefficient $k_e$ for the "joy" emotion by a predetermined number. On the other hand, when the recognition result supplied is "dark", the internal-state model unit 71 will increase the value of the coefficient $k_e$ for the "fear" emotion by a predetermined number. Thus, the parametric value of the "fear" emotion will be changed under the influence of the ambient "illumination".

Similarly, the internal-state model unit 71 cyclically changes the parametric value of each of the desire elements by computing the equations (2) to (6) based on various recognition results supplied from the input semantics converter module 59 as above.

Also, the internal-state model unit 71 increases or decreases the value of the coefficient $k_i$ in equation (2) for a predetermined appropriate desire based on the recognition results regarding "noise", "temperature" and "illumination" supplied from the input semantics converter module 59.

Also, for example, when recognition results "noisy" and "bright" are supplied, the internal-state model unit 71 will decrease the value of the coefficient $k_i$ for the "fatigue" state by a predetermined number. On the other hand, when the recognition results supplied are "quiet" and "dark", the internal-state model unit 71 will increase the value of the coefficient $k_i$ for the "fatigue" state by a predetermined number. Further, for example, when a recognition result "hot" or "cold", the internal-state model unit 71 will increase the value of the coefficient $k_i$ for the "fatigue" by a predetermined number.

Thus, as a result, when the robot 1 is in a "noisy" environment for example, the parametric value of the "anger" emotion readily increases while that of the "fatigue" state readily decreases, so that the robot 1 will express "irritated behavior. On the other hand, when the environment surrounding the robot 1 is "quiet", the parametric value of the "anger" emotion readily decreases while that of the "fatigue" state readily increases, so that the robot 1 will act "gently.

Also, when the robot 1 is in a "hot" environment, the parametric value of the "joy" emotion readily decreases while that of the "fatigue" state readily increases, so the robot 1 will exhibit "lazy" behavior. On the other hand, when the robot 1 is in a "cold" environment, the parametric value of the "sadness" emotion readily increases while that of the "fatigue" state readily increases, so the robot 1 will act as if affected by the cold.

When the robot 1 is in the "bright" environment, the parametric value of the "joy" emotion readily increases while that of the "fatigue" state readily decreases, so that the robot 1 will exhibit "cheerful" behavior. On the other hand, in the "dark" environment, the parametric value of the "joy" emotion readily increases while that of the "fatigue" state readily increases, so that the robot 1 will behave "evenly".

Thus the robot 1 can change its instinct and emotional states adaptively to the environment (external and internal factors) by means of the internal-state model unit 71 and expresses the changed instinct and emotional states by its behavior. Further, the instinct and emotional states acquired by the internal-state model unit 71 are used as information for selection of behavior in the behavior selection unit 80.

(3-3) Construction of the Behavior Selection Unit

The behavior selection unit 80 selects one of a set of behaviors prepared in advance. The behavior selection unit 80 is constructed to select (decide) behavior using the ethological approach.

Generally, an animal is considered to decide a behavior based on multiple external and internal factors (generically referred to as "cause factor" hereafter) which influence the animal's behavior. The cause factors are complicatedly intertwined with each other. The robot 1 is designed based on general behavior decision mechanism of the animal to decide a behavior.

Figure 6A:
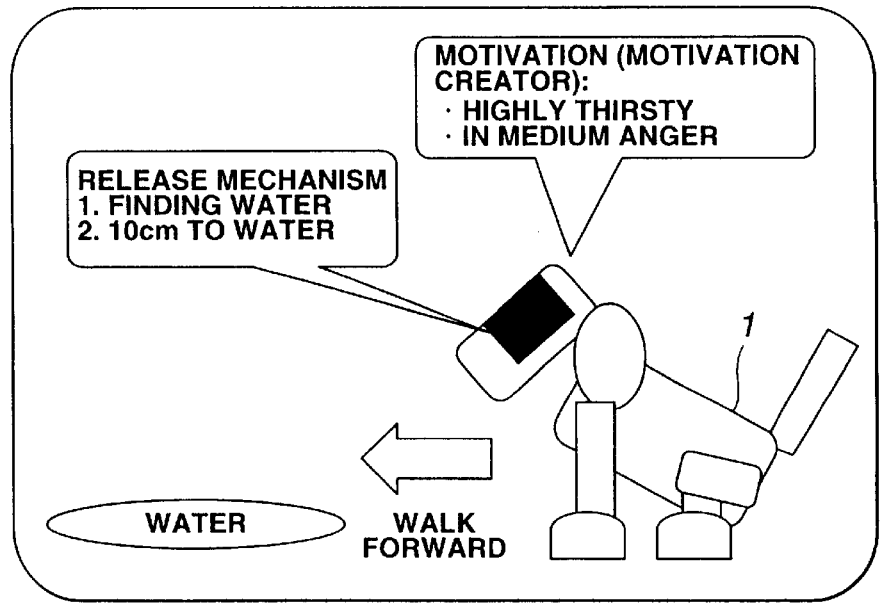
FIGS. 6A and 6B explain the robot apparatus whose behavior is decided using the ethological approach.

The robot 1 having a behavior decision mechanism constructed using the ethological approach will decide a behavior to express by following the procedure below for example when there is a pool in front of the robot 1 as shown in FIG. 6A.

The robot 1 will "find water" and perceive and recognize (evaluate) an external cause factor (based on an external perceptual element; for example, perception) "10 cm to water". On the other hand, the robot 1 has motivations "high thirst" and "medium level of anger" as the internal cause factor (based on internal motivational element; for example, instinct and emotion). Note that the motivation is acquired using a parametric value from the aforementioned internal-state model unit 71, which will be described in detail later.

In the behavior decision based on the ethological approach, there is made at least the following judgment.

Namely, even when the robot 1 is in a "highly thirsty" state and has "found water", it will not always express any water-drinking behavior if the distance from water is long. For example when water is distant from the robot 1, the latter will possibly be in a degraded condition correspondingly and have a higher thirst. In this case, the robot 1 will instinctively avoid the water-drinking behavior.

On the contrary, even when the robot 1 has a "lower thirst" and "there is water in front thereof", it will express the water-drinking behavior in some cases. Namely, it is not always judged based on the internal cause factor "thirst" whether the robot 1 expresses the water-drinking behavior, but judgment for the behavior decision is made based on the external cause factors "there is water" and "it exists in front" of the robot 1. That is, a behavior is decided (selected) based on multiple external and internal cause factors complicatedly intertwined with each other.

The behavior is compared to others before finally deciding a behavior. For example when the robot 1 wants to "drink water" and "eat", it makes a comparison between the extent or feasibility of the desire to "drink water" is compared with the extent or feasibility of the desire to "eat" and selects for example the water-drinking behavior as one of the possible behaviors.

Based on the ethological approach, the robot 1 finally decides a behavior. That is, with the internal state such as "high thirst", the robot 1 makes an overall judgment based on the information "finding of water" and "distance of 10 cm to water" to express the water-drinking behavior while excluding any other behaviors such as "eating" behavior.

Also, the robot 1 expresses the "eating" behavior with anger as the state "at medium level of anger". The behavior expression is provided by the aforementioned modulator 72. Then, in the robot 1, the anger as the internal state is lowered in level due to the "finding of water". The anger level is lowered by feed back behavior completion information from the output semantics converter module 68 to the internal-state model unit 71.

Figure 6B:
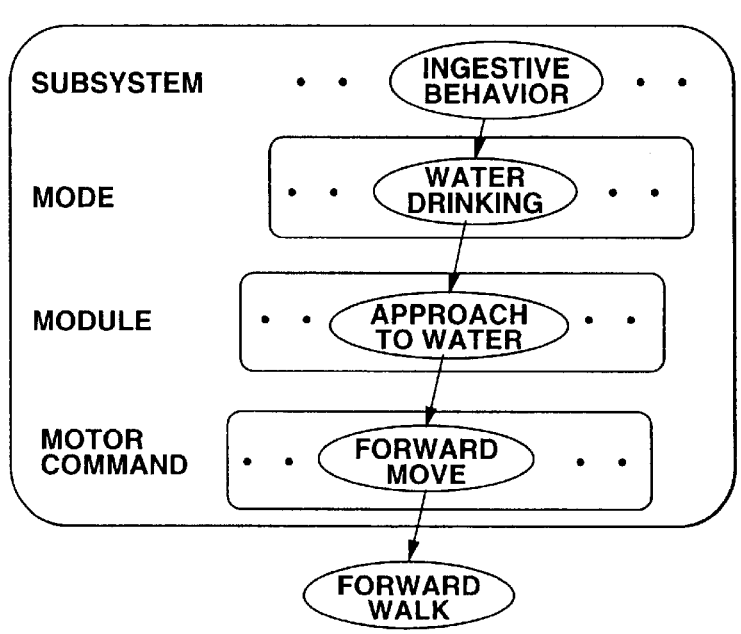

FIG. 6B shows the procedure for selecting actions down to "walk forward" as the "water-drinking behavior" based on the aforementioned ethological approach.

First, when in the state as shown in FIG. 6A, the robot 1 selects "ingestive behavior" from among multiple behaviors including "ingestive behavior", "agonistic behavior", "investigative behavior", etc. The robot 1 holds a subsystem (subsystem layer) as a group of selectable behaviors including the "ingestive behavior", "agonistic behavior", "investigative behavior", etc.

The behavior group includes multiple low-order behavior groups which together form a high-order behavior. The low-order behavior groups control each other, which is also true for the following.

Next, the robot 1 selects "water-drinking behavior" from the selected ingestive-behaviors. The ingestive-behaviors include also "eating" behavior. For example, the robot 1 holds modes (mode layer) in which a group of selectable behaviors such as "water drinking" behavior, "eating" behavior are included. That is, the robot 1 holds the behavior group including "water drinking" and "eating" behaviors as behaviors subordinate to the "ingestive" behavior subsystem.

Next, the robot 1 selects to "move forward" for "go-to-water" behavior and expresses the behavior. For the "go-to-water" behavior, possible behaviors include "move backward", "turn to right", "turn to left". The robot 1 holds motor commands (command layer) including the "move forward", "move backward", "turn to right", "turn to left", etc.

By following the above procedure, the robot 1 takes the ethological approach to express the bottom-layer behavior like "walk forward" as the final behavior of the high-order behaviors included in the "ingestive behavior" subsystem.

Figure 7:
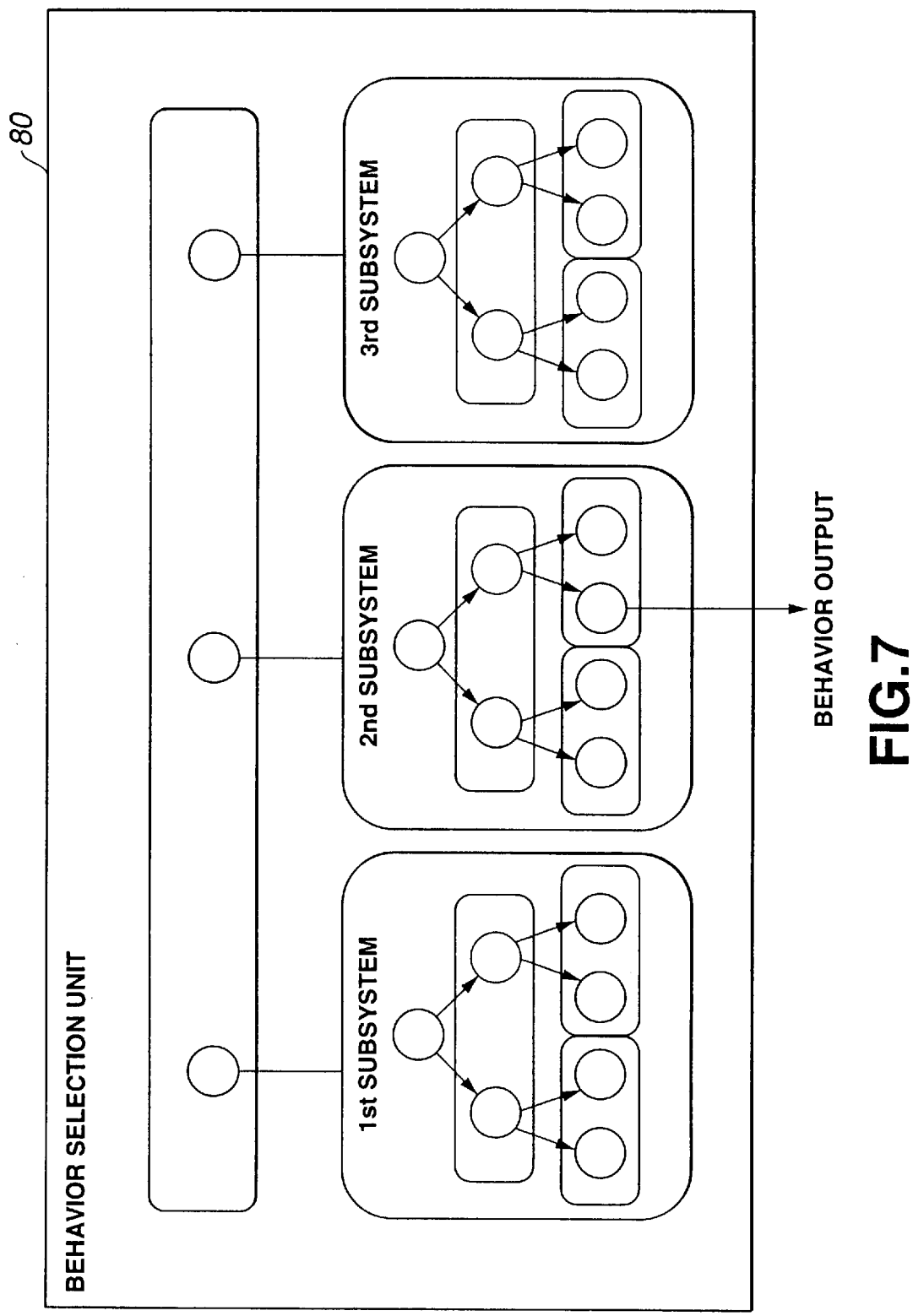
FIG. 7 shows a behavior selection system constructed in the behavior selector and in which multiple behaviors form a hierarchical structure.

FIG. 7 shows a behavior selection system built for decision selection. The behavior selection system is formed in the behavior selection unit 80.

In the behavior selection system, a set of behaviors is organized in the form of the hierarchical structure (tree structure). In this system, the higher layer includes abstract behaviors such as desire elements. In the hierarchical-structure behavior selection system includes a behavior group consisting of a set of low-order behaviors which together form a high-order behavior. For example, when the robot 1 exhibits a high-order behavior like "agonistic behavior", lower-order behaviors include "fighting/predation", "defense/eacape", etc.

The behavior selection system may be designed to hold each behavior in the form of data (e.g., in the form of a data base), namely, it may be designed for an object-oriented system for example. When the behavior selection unit is designed as an object-oriented type, the behavior selection system is constructed to have behaviors as independent units of an object and operates with each unit of the object for selection of a behavior.

In the behavior selection system in which the set of behaviors is organized in the form of the hierarchical structure as shown in FIG. 7, the behaviors in the high-order layer are abstract ones such as desire while those in the low-order layer are concrete ones to realize the desire.

In such a behavior selection system, selection is made through behaviors in the low-order layer, that is, there is selected a behavior to realize a high-order behavior, namely, a final behavior. That is, behaviors in the middle layer contain information on a path extending from the highest-order behaviors to the lowest-order ones.

While proceeding along the above path from the high-order layer to the low-order layer, a behavior is selected in each of the layers based on the aforementioned external and internal cause factors.

As shown in FIG. 5, the behavior selection unit 80 includes the perceptual information acquisition unit 90, motivational information acquisition unit 81 and behavior selecting processor 82. Each of these elements of the behavior selection unit 80 will function as outlined below with reference to FIGS. 8 and 9.

The perceptual information acquisition unit 90 acquires perceptual information for each of behaviors. For acquisition of perceptual information, the perceptual information acquisition unit 90 computes an RM (release mechanism) value indicative of an evaluation of the perception in a release mechanism which will be described in detail later. When the perceptual information acquisition unit 90 finds "water" and recognizes that the robot 1 is at a distance of 10 cm from the "water", the value of the ingestive behavior (water-drinking behavior) will be larger, that is, the water-drinking behavior will likely be selected.

The motivational information acquisition unit 81 acquires motivational information for each behavior based on the internal state of the robot 1. For acquisition of motivational information for each behavior, for example, It computes a motivation for each behavior based on the aforementioned instinct and emotion values. More specifically, it computes a Mot value indicative of the state of a motivation in a motivation creator which will be described in detail later. The motivational information acquisition unit 81 acquires the thirsty state of the robot 1. Thus, the motivation value of the ingestive behavior will be larger and the water-drinking behavior included in the ingestive behavior will have a further value.

The behavior selecting processor 82 selects a desired behavior based on motivational information (motivation value) from the motivational information acquisition unit 81 and perceptual information (value) from the perceptual information acquisition unit 90. When selecting the desired behavior, the behavior selecting processor 82 arbitrates other elements of behavior belonging to the same group of behaviors. For example, the behavior selecting processor 82 selects the ingestive behavior in the subsystem layer and selects the water-drinking behavior in the ingestive behavior.

Also, the behavior selecting processor 82 programs actual motion groups based on the selected behavior. By way of example, such a programed motion group is to select "move-forward".

Note that the internal-state model unit 71 acquires information on internal state such as instinct and emotional states of the robot 1 as above. For example, for acquisition of internal-state information, the internal-state model unit 71 computes instinct and emotion values. More specifically, the internal-state model unit 71 computes parametric values of the instinct (desire) and emotion or an IE value which will be described in detail later. For example, the internal-state model unit 71 acquires information on the thirsty state caused by motion or the like.

Figure 8:
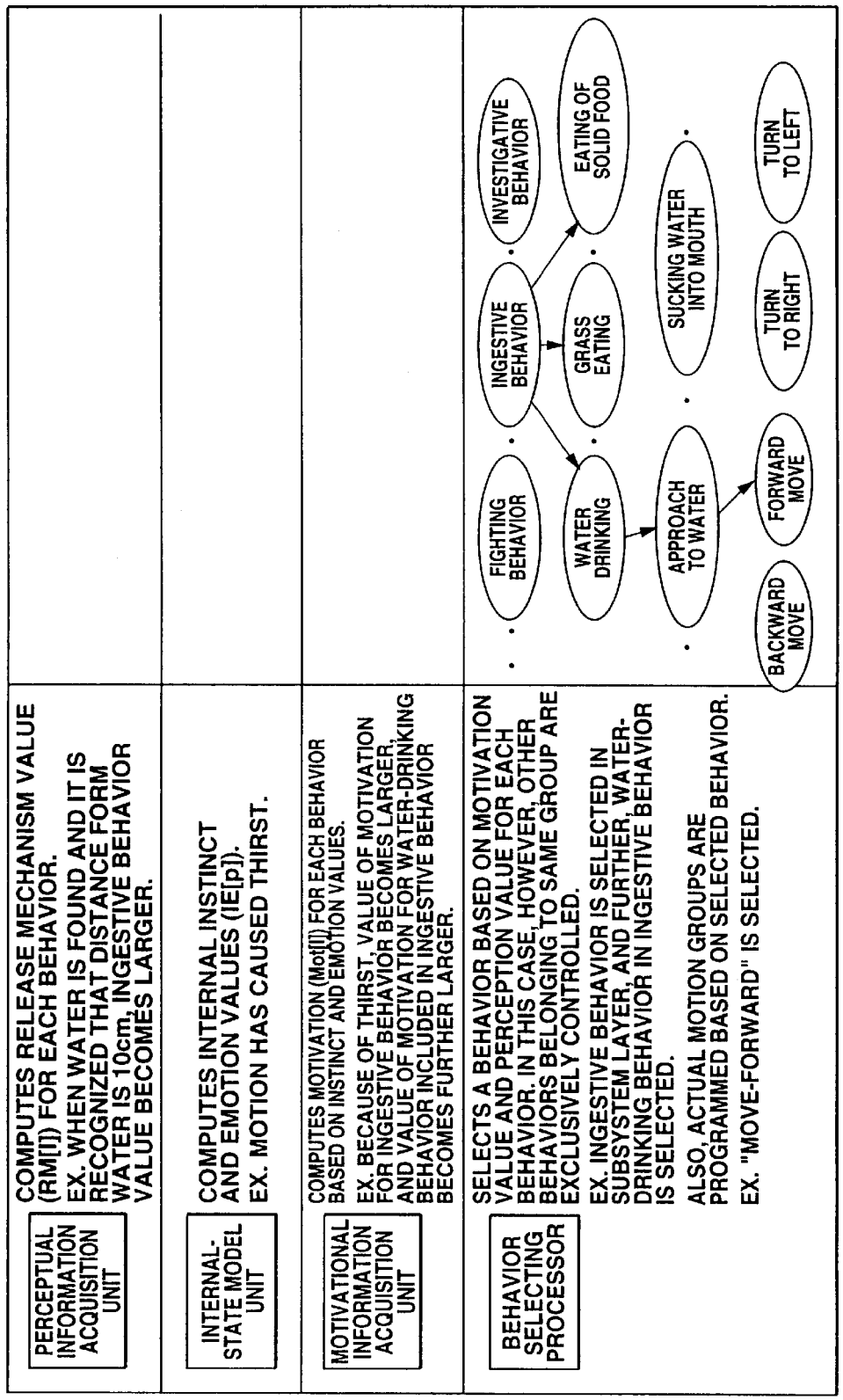
FIG. 8 explains functions of the elements included in the first half of the behavior decision system.

As shown in FIG. 8, the output semantics converter module 68 converts a behavior to a sequence of motions corresponding to the type of robot 1. For example, when the output semantics converter module 68 recognizes that the robot 1 is of a quadruped type, it will provide a sequence of motions corresponding to an input behavior and the emotion state of the robot 1. Namely, the output semantics converter module 68 sends a command to the signal processing modules 61 to 67 based on a behavior command from the higher-order behavior decision system 70.

The modulator 72, posture management module, etc. shown in FIG. 9 will be described in detail later. Note that in FIG. 9, the "input" column shows shapes of input commands while the "output" column shows shapes of output commands.

The behavior selection unit 80 is constructed as above. Next, the ethological approach adopted for the behavior selection by the behavior selection unit 80 will be described below.

(3-4) Behavior Selection Using the Ethological Approach

Figure 10:
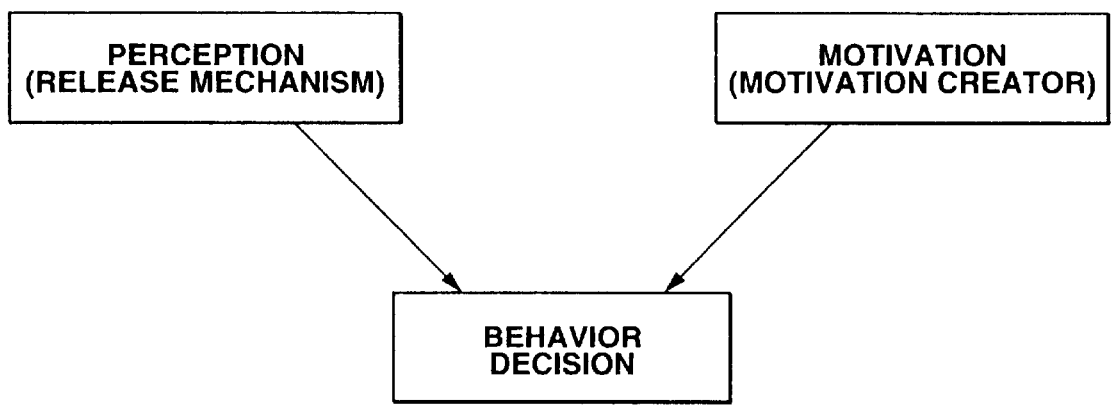
FIG. 10 is a block diagram explaining the decision of behavior according to perception and motivation using the ethological approach.

Generally, behavior of an animal is decided (selected) based on a set of factors complicatedly intertwined with each other. FIG. 10 shows a simple example in which a behavior is decided based on perceptual and motivational information.

The perception is external information which influences the behavior and may be considered as a condition motivated or restricted by input environmental information. The motivation is internal information such as "hungry" or the like expressing an internal state and may be considered as an internal intention to express the behavior. Thus, perception and motivation can be used as a cause to decide a behavior to enact.

A behavior is decided based on perception and motivation as described in detail below. Note that the following principle of behavior decision (selection) is based on the state space approach having been proposed by Silby and Mcfarland (1975).

The theory of Silby and Mcfarland (1975) is based on the assumption that the animal most likely takes an action (behavior) it has expressed more frequently. An occurrence tendency can be clearly defined by a vector space. The magnitude of a vector indicates a so-called occurrence tendency magnitude based on an index having a certain commonality. The occurrence tendency includes for example a tendency (degree) with which an ingestive behavior occurs and a tendency (degree) with which a water-drinking behavior occurs. All the occurrence tendencies are depicted as points in the occurrence tendency space.

The occurrence tendency space is divided into areas each showing similar occurrences of behavior and separated by a switching line.

On the other hand, the occurrence tendency depends upon various cause factors. For example, the eating behavior tendency depends upon the limits of food, opportunity of ingestion, possibility of predation, etc. Another vector space is used to clearly indicate all these cause factors. Decision of an occurrence tendency based on cause factors is based on the following. A mapping is made from a state space of cause factors to an occurrence tendency space to provide a state space of occurrence tendencies, adaptive to any states of cause factors. A behavior can be decided in the occurrence tendency state space. The relations between the cause factors and occurrence tendencies will be described below with reference to FIGS. 11A to 11C.

Figure 11A:
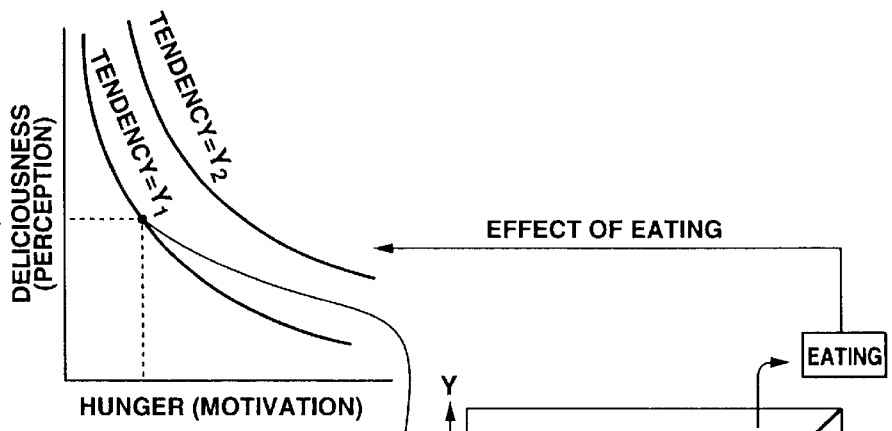
FIGS. 11A to 11C show characteristic curves of a cause factor state space in which cause factors are mapped, and an occurrence tendency space in which occurrence tendencies of behaviors defined by the cause factor state space are mapped, respectively.
Figure 11B:
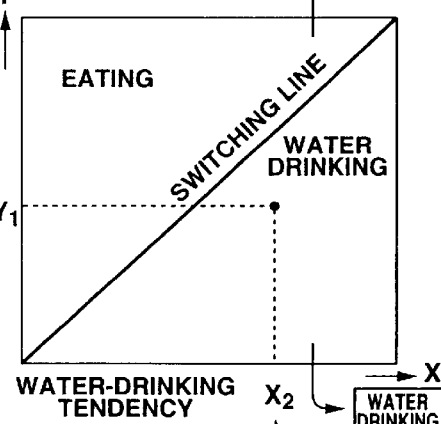
Figure 11C:
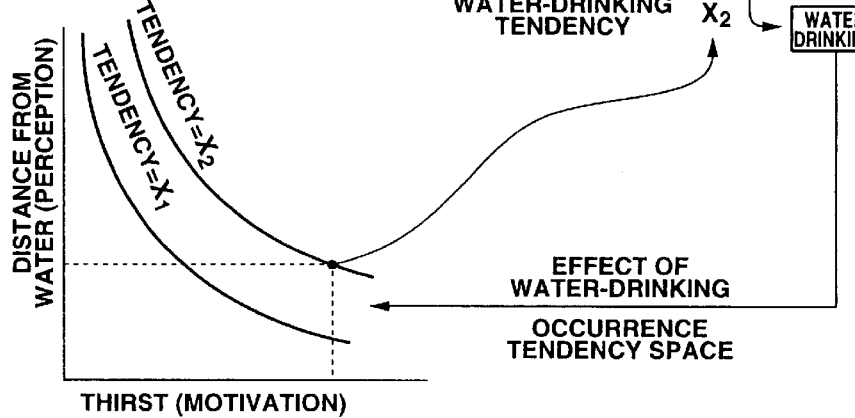

FIGS. 11A and 11C show the cause factor state space depicting the states of cause factors. The cause factor state space consists of cause factors which influence the conduct of a behavior. The cause factors include the aforementioned "perception" and "motivation". Note that FIGS. 11A to 11C show only the two-dimensional space for the simplicity of illustration and explanation but actually, many of behavior occurrence tendencies are decided based on a cause factor state space of three or more dimensions.

FIG. 11A shows a tendency for eating-behavior, namely, a tendency of eating-behavior occurrences (referred to as "eating tendency" hereafter). In FIG. 11A, the horizontal axis indicates a motivation "hunger" as being one of the cause factors while the vertical axis indicates the perception "deliciousness" as being another cause factor. FIG. 11C shows a tendency of water-drinking behavior, namely, a tendency of "water drinking" behavior occurrences (referred to as "water-drinking tendency" hereafter). In FIG. 11C, the horizontal axis indicates "thirst" as "motivation" while the vertical axis indicates "distance from water" as "perception".

FIG. 11B shows a space of "eating tendency" and "water-drinking tendency" based on the cause factors in FIGS. 11A and 11C. Namely, FIG. 11B shows the space in which an occurrence tendency of a behavior influenced by the cause factors is mapped for comparison between the eating and water-drinking tendencies.

First, the cause factor state space is described with reference to FIG. 12. The cause factor state space in FIG. 12 is that of "eating behavior" shown in FIG. 11A.

Figure 12:
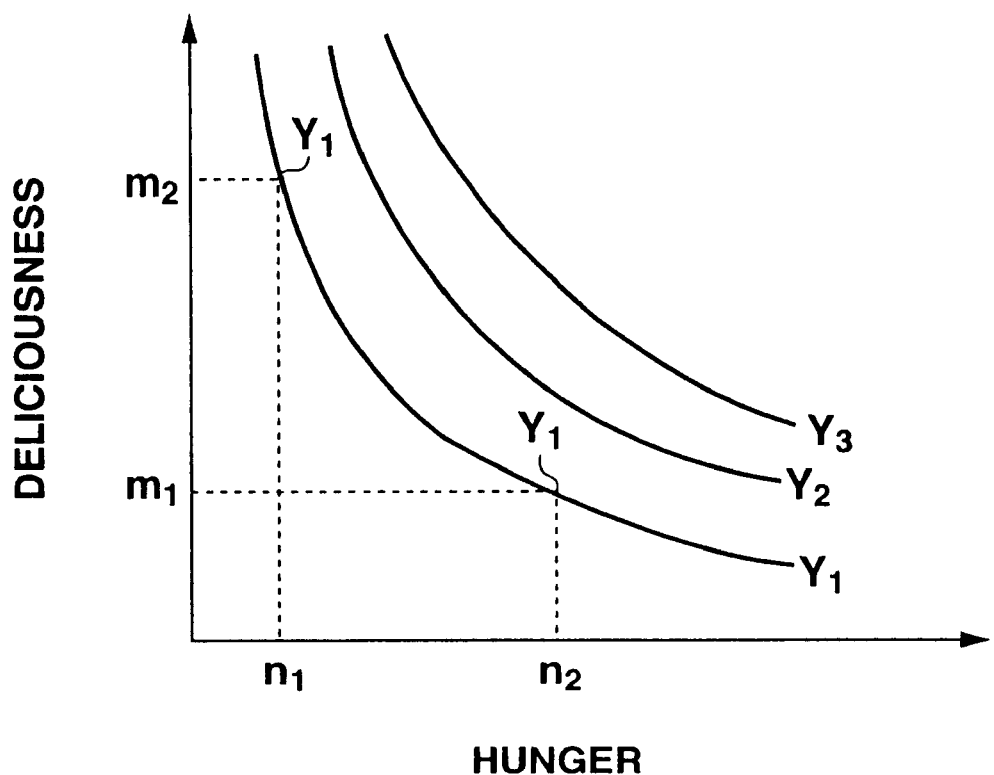
FIG. 12 explains the cause factor state space.

As seen from FIG. 12, when there is very delicious food ($m_2$ state) and the hunger is not very strong (cause state) (n1 state) or when the hunger is very strong ($n_2 > n_1$) and the available food is not so delicious (cause state) ($_{M1} < m_2$), eating behavior occurs. That is, the eating behavior cannot always be said to occur depending solely upon the motivation "hunger" nor depends solely upon the perception "deliciousness", but it will occur depending on the interaction between "hunger" and "deliciousness".

In other words, even with different degrees of "hunger", eating behavior occurs. At a set of points in the cause factor state space, there exist cause states "hunger" and "deliciousness" which cause occurrences of eating-behavior to be equivalent to each other, namely, resulting in similar degrees of eating tendencies. For example, the eating tendency when a very "delicious" food is given when there is no hunger is generally the same as that when a food "not so delicious" is given when there is a strong hunger.

For example, it assumed here that "hunger" and "deliciousness" are taken as cause factors in eating behavior. For the degrees of the eating behavior occurrence tendencies to be similar to each other, the "hunger" is low while the "deliciousness" is high or the "hunger" is high while the "deliciousness" is low. Therefore, the "hunger" and "deliciousness" are inversely proportional to each other for similar degrees of eating behavior occurrence tendencies. Connecting points of similar eating tendencies to each other results in a curve, for example, as shown in FIG. 12. As seen, there exist a set of cause factor states in which the eating tendencies are similar in strength (vector magnitude) y to each other and the cause factor states are depicted as a curve in the cause factor state space.

In the cause factor state space, there exist a set of eating tendencies different in strength ($y_1$, $y_2$, ...) to each other, depicting contours of the eating tendency strength as shown in FIG. 12.

In FIG. 12, the eating tendency is stronger as it goes upward in the cause factor state space, which means that everyone will show eating behavior when he or she is very hungry and there is very delicious food before him.

Thus, the strength of eating tendency can be defined with cause factors and the strength of water-drinking tendency can be defined similarly.

That is to say, when there is a strong thirst, the water-drinking behavior will occur even if the distance from water is long. Also, when the thirst is weak but the distance from water is short, the water-drinking behavior will occur as the result of the interaction between the "thirst" and "distance from water".

In other words, the water-drinking behavior occurs irrespective of the degree of the "thirst", strong or weak. At a set of points in the cause factor state space, there are cause states of similar water-drinking tendencies based on the "thirst" and "distance from water". For example, the water-drinking tendency when there is no "thirst" but there is water in a very near place is similar to that when the "thirst" is very strong but water is in a very far place.

For similar degrees of water-drinking tendencies, the "thirst" and "distance from water" are inversely proportional to each other. Connecting points of similar degrees of water-drinking tendencies will result in a curve in the cause factor state space as shown in FIG. 11C. Namely, there are a set of cause states similar in strength x of water-drinking tendency to each other and they are depicted as a curve in the cause factor state space as in FIG. 11C in which there are shown water-drinking tendencies different in strength ($x_1$, $x_2$, ...) as contours.

As above, the strength of "eating tendency" and that of "water-drinking tendency" are determined based on the cause factor states, the tendencies are compared with each other based on their strength and one of the behaviors is decided (selected). The occurrence tendencies are compared with each other in the occurrence tendency space as shown in FIG. 11B. The occurrence tendency space consists of tendencies of behaviors which can occur.

For example, when the strength $y_1$ of an eating tendency and strength $x_2$ of a water-drinking tendency are detected in a cause state, the strength $y_1$ of eating tendency and strength $x_2$ of water-drinking tendency, mapped from the cause factor state space, are combined with each other in the occurrence tendency space as shown in FIG. 11B, for the purpose of comparison. More specifically, a behavior is selected as described below.

As shown in FIG. 11B, the occurrence tendency space is divided into two areas by a switching line. One of the areas is defined by the switching line and the x-axis indicating (y=0) the water-drinking tendency (this area will be referred to as water-drinking behavior selecting area), and the other is defined by the switching line and the y-axis indicating the eating tendency (x=0) (this area will be referred to as Aeating behavior selecting area).

In each of the areas defined by the switching line in the occurrence tendency space, one behavior is decided based on the position of a value (x, y) mapped from the cause factor state space. That is, when the value (x, y) is found in the water-drinking behavior selecting area, the water-drinking behavior will be selected, and when the value (x, y) lies in the eating behavior selecting area, the eating behavior will be selected. Therefore, in the example shown in FIG. 11C, since the value ($x_2$, $y_1$) lies in water-drinking behavior selecting area, the water-drinking behavior will be selected.

Note that the cause factor state space is shown for the state variable (cause factor) for each of the eating and water-drinking behaviors for the simplicity of illustration and explanation. Actually, however, one state variable will influence the occurrence tendencies of a set of behaviors. The curves in the cause factor space are connected to a state in which the level of the occurrence tendency of a specific behavior is attained.

Also, a behavior finally selected will possibly influence the cause factors for the behavior as well as a set of other cause factors. For this reason, information is arbitrated.

The behavior decision (selection) method using cause factors for the ethological approach was proposed by Silby and Mcfarland (in 1975) and Ludlow (competitive model) for example.

(3-5) Formulae for Enabling Behavior Decision Using the Ethological Approach

Figure 13A:
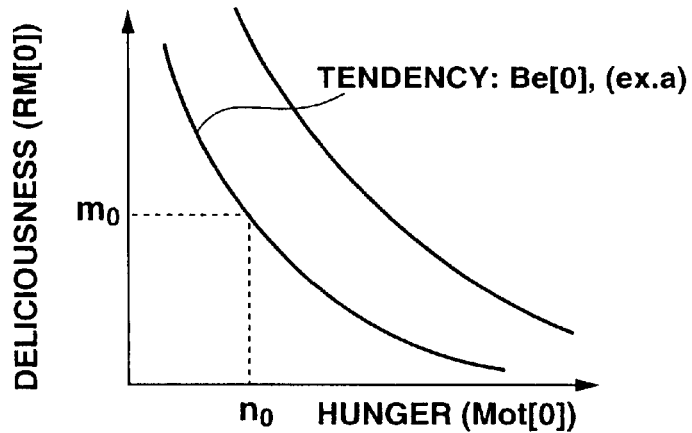
FIGS. 13A and 13B show characteristic curves of ingestive behavior and water-drinking behavior, respectively, explaining the mathematical occurrence of the ethological approach.

The ethological approach for the above-mentioned behavior decision is just theoretical, and for application thereof to the actual robot 1, the aforementioned ethological approach must be computerized or encoded as data base. To implement the present invention, the ethological approach-based behavior decision is encoded as follows:

As shown in FIG. 13A, the "hungry" state (degree) as the cause factor of "eating behavior" is taken as Mot[0], and "deliciousness" is evaluated as RM[0]. The eating tendency (tendency strength) when Mot[0] and RM[0] take certain values, respectively, is taken as Be[0].

Figure 13B:
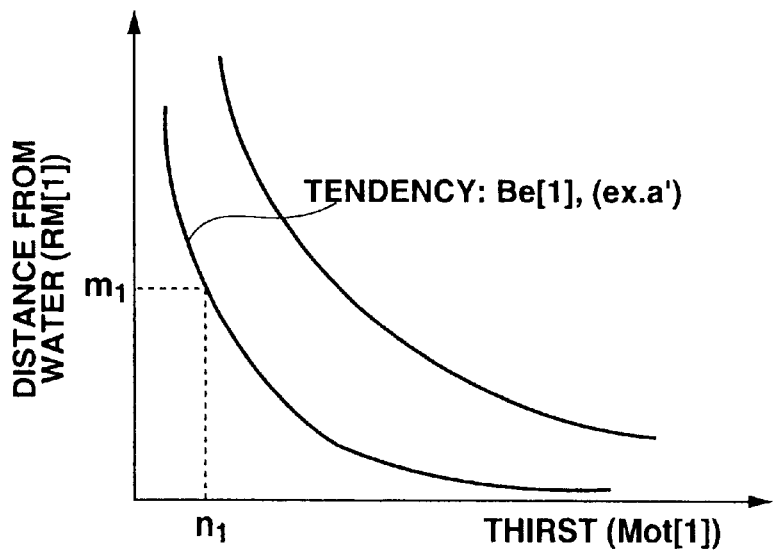

Similarly, as shown in FIG. 13B, the "thirsty" state (degree) as the cause factor of "water-drinking behavior" is taken as Mot[1] and "distance from water" is evaluated as RM[1]. The water-drinking tendency (tendency strength) when Mot[1] and RM[1] have certain values, respectively, is taken as Be[1]. These items are in a relationship shown in Table below.

| Release mechanism | Eating behavior | Deliciousness evaluation of food | RM[0] |
|---|---|---|---|
| | Water-drinking behavior | Evaluation of distance from water | RM[1] |
| Motivation creator | Eating behavior | Hunger | Mot[0] |
| | Water-drinking behavior | Thirst | Mot[1] |

Note that in this embodiment, since comparison is made between two occurrence tendencies of "eating behavior" and "water-drinking behavior", two values RM[0] and RM[1] are selected for the perception while two values Mot[0] and Mot[1] are taken for the motivation, but comparison may be made among more occurrence tendencies. Thus, on the assumption that the perception (external intelligent element) is RM[i], motivation (internal motivational element) is Mot[i], occurrence tendency is Be[i] and i is an integer, these items are generalized. These items found in the following description are generalized ones unless specific types of behavior to occur or to be expressed are specified for them.

In this example, similar occurrence tendencies of "eating behavior" are found when the cause factors "thirst" and "deliciousness" are in a relation of inverse proportion. For similar degrees of occurrence tendencies, however, the cause factors acting on the occurrence tendency are not always in such a relation of inverse proportion. Namely, the relation among Be[i], RM[i] and Mot[i] can be given by the following equation (7) but RM[i] and Mot[i] is not always in an inverse-proportional relation. In short, the occurrence tendency is not influenced solely by a motivation (internal motivational element) but also by a perception (external intelligent element).

$$Be[i]=func(RM[i], Mot[i]) \tag{7}$$

Also, the perceptual evaluation RM[i] of "deliciousness" or "distance from water" is acquired by the perceptual information acquisition unit 90, and motivation Mot[i] like "hunger" or "thirst" is acquired by the motivational information acquisition unit 81. The operations for acquisition of these information by the perceptual and motivational information acquisition units 90 and 81 will be described in detail later.

Figure 14:
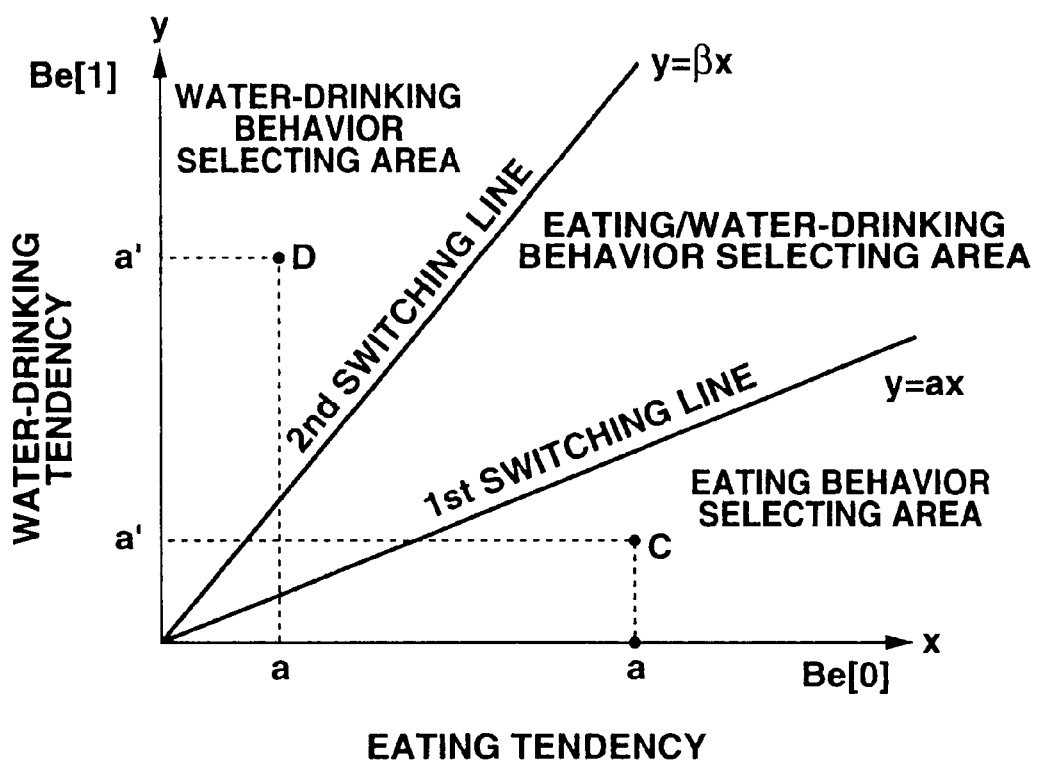
FIG. 14 shows a characteristic curve of the occurrence tendency space in which there are mapped the ingestive tendency and water-drinking tendency used for explanation of the mathematical occurrence of the ethological approach.

The eating and water-drinking tendencies acquired based on the perception (external intelligent element) and motivation (internal motivational element) as above are as shown in the occurrence tendency space in FIG. 14.

In the occurrence tendency space shown in FIG. 14, there are two switching liens, first (y=αx) and second (y=βx). That is, the space is divided into three areas. On the other hand, the occurrence tendency space in FIG. 11B has only one switching line. The reason why one switching line is set in the space in FIG. 11B while the three switching lines are set in the space in FIG. 14 is as follows.

Theoretically, different types of behavior can be selected even with one switching line as previously described. Should the theory be applied to the actual robot 1 as it is, however, if the occurrence tendency of each behavior is near the switching line, a currently selected behavior and any other behaviors are switched more frequently, making the robot I thrash between behaviors. Such a phenomenon is caused when the occurrence tendency of the selected and conducted behavior is smaller than that of another behavior. Namely, when a motivation (desire) is accomplished, the degree thereof will be smaller, with the result that the occurrence tendency of a behavior influenced by that motivation will be smaller.

As above, the two switching lines divide the occurrence tendency space into three areas: an area where "eating behavior" is selected (eating behavior selecting area), area where "water-drinking behavior" is selected (water-drinking behavior selecting area), and an area where either "eating behavior" or "water-drinking behavior" is selected (eating/water-drinking behavior selecting area). Thereby, it is possible to prevent the robot 1 from thrashing between behaviors. The reason will be described later why setting of the two switching lines enables the robot 1 to behave evenly.

A behavior showing the strongest occurrence tendency is selected in the occurrence tendency space shown in FIG. 14 as described below.

As shown in FIG. 14, the occurrence tendency space consists of an eating tendency Be[0] and water-drinking tendency Be[1] with the eating tendency Be[0] being taken along the x-axis and the water-drinking tendency Be[1] being taken along the y-axis. In this occurrence tendency space, the first and second switching lines are set as y=αx and y=βx, respectively. For example, coefficients of slopes α and β are arbitrary values, and can be decided according to the growth of the robot 1.

The eating tendency Be[0] takes a value based on the "hunger" Mot[0] and "deliciousness" RM[0] shown in FIG. 13A, while the water-drinking tendency Be[1] takes a value based on the "thirst" Mot[1] and "distance from water" RM[1] shown in FIG. 13B.

In the occurrence tendency space, when a value (a, a') mapped from the cause factor state space lies in the eating behavior selecting area (at point C) as shown in FIG. 14, the eating behavior is selected. When the value (a, a') lies in water-drinking behavior selecting area (at point D), the water-drinking behavior is selected.

The term a of the value (a, a') is an "eating tendency" Be[0] when the "hunger" is Mot[0]=$n_0$ and "deliciousness" RM[0]=$m_0$ as shown in FIG. 13A, while the term a' of the value (a, b') is a "water-drinking tendency" Be[1] when the "thirst" Mot[1]=$n_1$ and "distance from water" RM[1]=$m_1$ as shown in FIG. 13B.

The above behavior selection can be implemented by the following algorithm:

First, a value of a'/a(Be[1]/Be[0]) will be considered for the behavior selection. It is when ∞>a'/a>β that the value (a, a') lies in the water-drinking behavior selecting area defined by x=0 and second switching line (y=βx). Also, it is when α>a'/a>0 that the value (a, a') is in the eating behavior selecting area defined by y=0 and first switching line (y=αx).

Figure 15A:
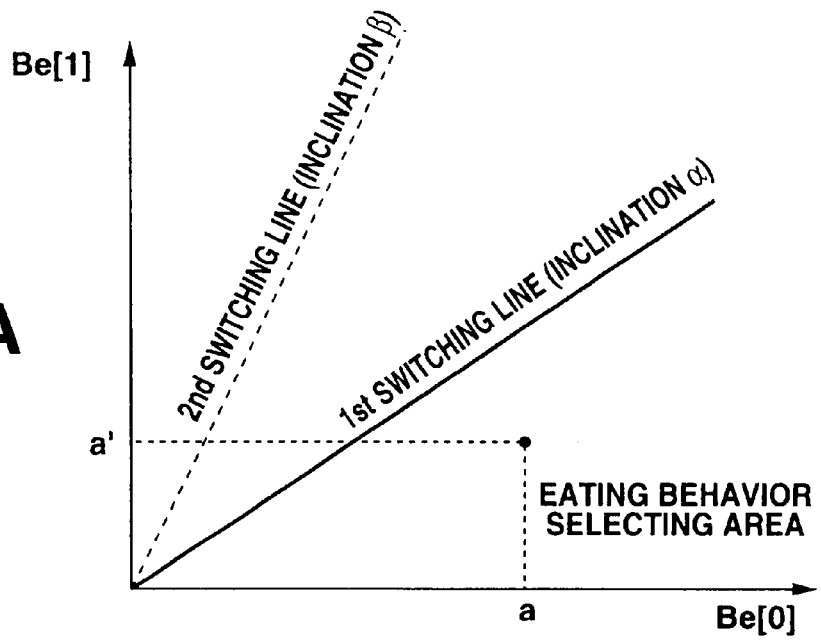
FIGS. 15A and 15B show characteristic curves of a value mapped in the cause factor state space, being in an ingestive behavior selection area and in a water-drinking behavior selection area, respectively.

The following relation can be derived from the above expressions. When α>a'/a>0, namely, when the value (a, a') lies in the eating behavior selecting area, the occurrence tendency space will be as shown in FIG. 15A and the following relations (8) and (9) are established.

$$aα−a'>0 \tag{8}$$

$$1−a'/a>0 \tag{9}$$

The coefficient of slope α of the first switching line can be given as α' in a relation to α as given by the equation (10). The value α' is a gain (>1) of behavior arbitration(exclusive control) from the water-drinking tendency Be[1] against eating tendency Be[0] as described in detail later.

$$(Be[0])/(Be[1])=1/α=α' \tag{10}$$

It will be derived from such a relation that the "eating behavior" is selected when the requirement (11) is met:

$$a−a'α'>0 \tag{11}$$

Figure 15B:
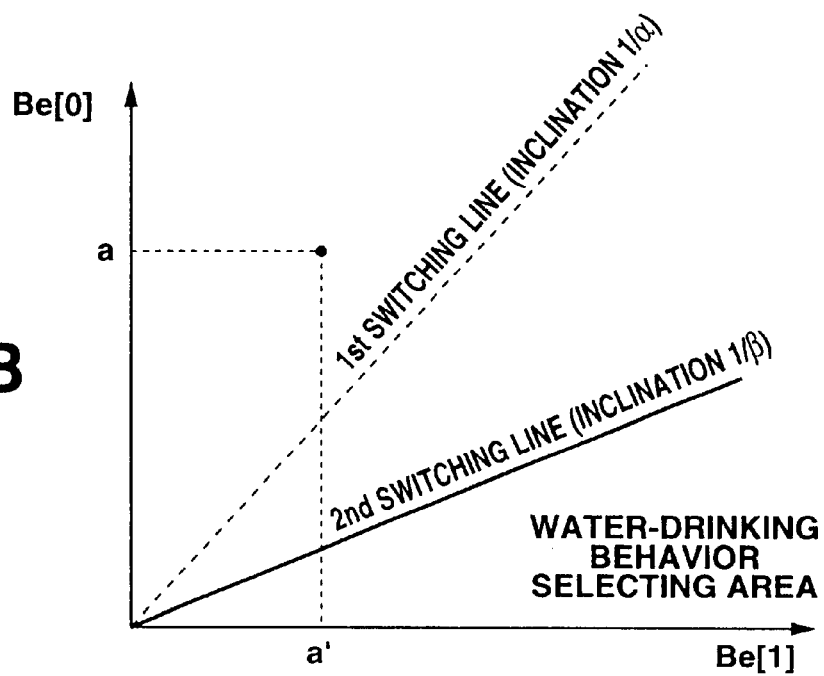

FIG. 15B shows the selection of the water-drinking behavior. The slope β of the second switching line is given by the following equation (12). Note that β is a gain (>1) of behavior arbitration(exclusive control) from the eating tendency Be[0] against the water-drinking tendency Be[1].

$$(Be[1])/(Be[0])=β \tag{12}$$

It will be derived from the above relation that the "water-drinking behavior" is selected when the requirement given by the relation (13) is met:

$$a'−aβ>0 \tag{13}$$

The above requirements are met by the following relations (14) and (15). When the requirement (14) is met, the eating behavior occurs. When the requirement (15) is met, the water-drinking behavior occurs.

$$a−a'α'>0 \tag{14}$$

$$a'−aβ>0 \tag{15}$$

Expression of the above (a−a'α') and (a'−aβ) as a matrix will result in the following equation (16):

$$\begin{bmatrix} Be_t[0] \\ Be_t[1] \end{bmatrix} = \begin{bmatrix} Be_t[0] \\ Be_t[1] \end{bmatrix} - \begin{bmatrix} 0 & \alpha' \\ \beta & 0 \end{bmatrix} \begin{bmatrix} Be_{(t-1)}[0] \\ Be_{(t-1)}[1] \end{bmatrix} \quad (16)$$

Figure 16:
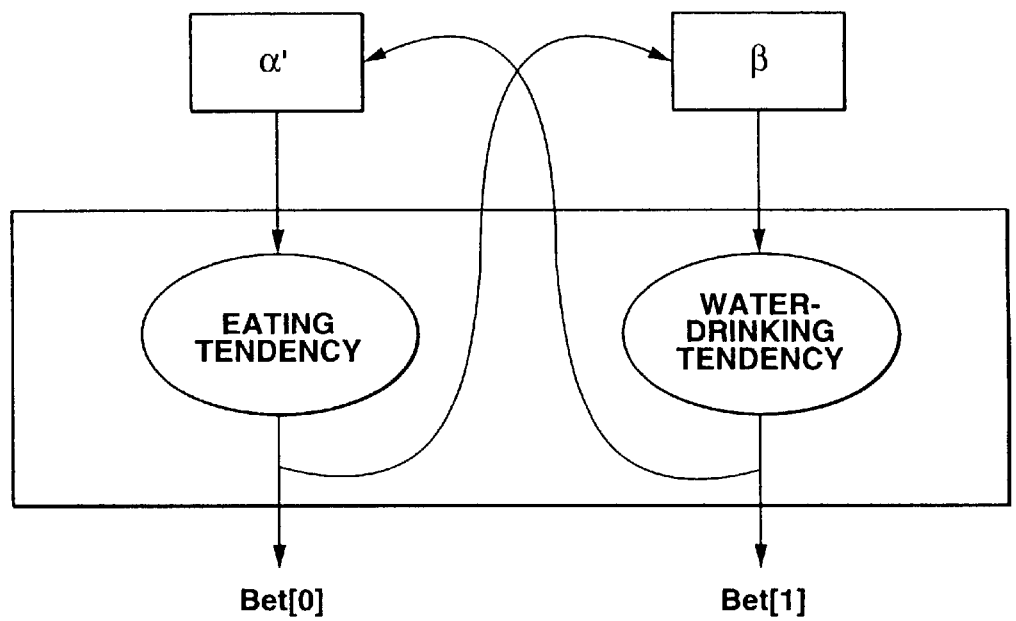
FIG. 16 explains the behavior arbitration(exclusive control).

It is assumed that the above equation is calculated discretely. The above equation can be expressed with an occurrence tendency $Be_t[i]$ at a time t and occurrence tendency $Be_{(t-1)}[i]$ at a time t−1 as given by the following equation (17):

$$\begin{bmatrix} Be[0] \\ Be[1] \end{bmatrix} = \begin{bmatrix} a \\ a' \end{bmatrix} - \begin{bmatrix} 0 & \alpha' \\ \beta & 0 \end{bmatrix} \begin{bmatrix} a \\ a' \end{bmatrix} \quad (17)$$

where α' is a gain (>1) of behavior arbitration(exclusive control) from the water-drinking tendency $Be[1]$ against the eating tendency $Be_t[0]$, and β is a gain (>1) of behavior arbitration(exclusive control) from the eating tendency $Be_t[0]$ against the water-drinking tendency $Be_t[1]$. For example, it can be visualized as shown in FIG. 16 that α=works as a gain of behavior arbitration(exclusive control) against the eating tendency $Be_t[0]$ while β works as a gain of behavior arbitration(exclusive control) against the water-drinking tendency $Be_t[1]$.

Thus, occurrence tendencies of a set of behaviors can be expressed in the form of a determinant. When there is a positive $Be_t[i]$ in a left-side matrix of the determinant, a behavior corresponding to the occurrence tendency $Be_t[i]$ is selected.

Note that since in the above determinant, the value of one of the occurrence tendencies is negative, the equation should be calculated with 0 placed for the negative occurrence tendency.

Figure 17:
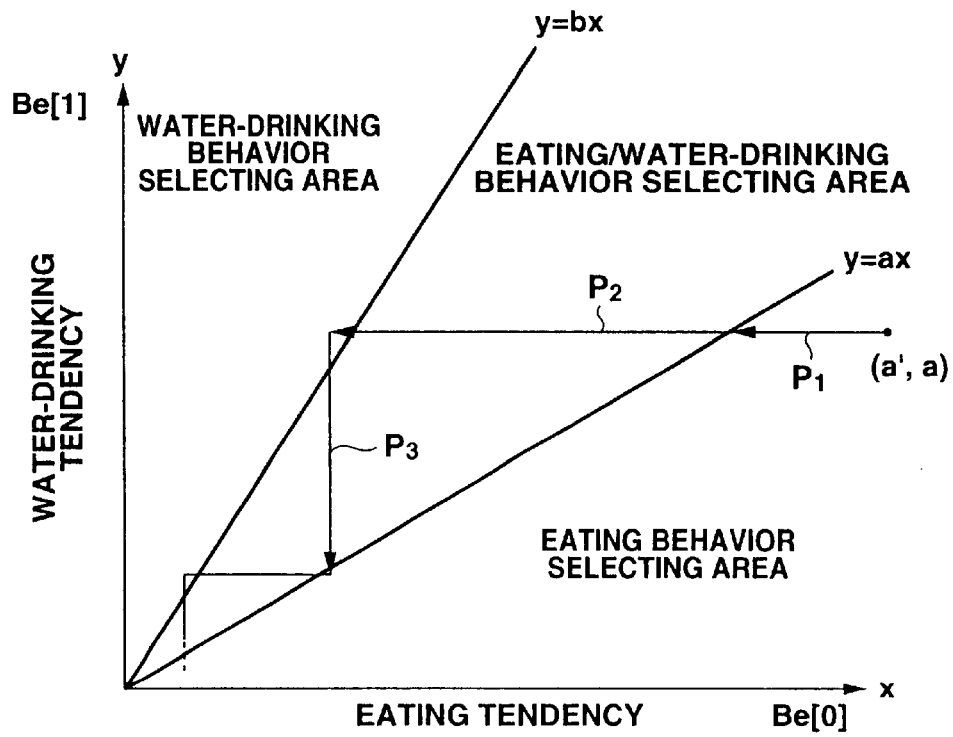
FIG. 17 shows a characteristic curve of the occurrence tendency space explaining the behavior selection implemented by an ethological approach-based mathematical expression.

With equation(17) being solved iteratively, the behavior selection is made as shown in FIG. 17.

It is assumed here that when the selected one of the behaviors is conducted, the cause factors will have less influence on the behavior and the occurrence tendency of the conducted behavior will be smaller. That is, for example, when "eating behavior" is selected as a behavior, the eating behavior is performed and the motivation etc. for eating is attained, so that the influence of the cause factors (motivation) on the "eating behavior" will be smaller and the eating tendency will be smaller (weaker). The behavior selection is performed by behavior arbitration(exclusive control) using equation (17) iteratively as described below.

As shown in FIG. 17, for example, when (eating tendency Be[0], water-drinking tendency Be[1])=(a, a') lies in the eating behavior selecting area (an area defined by y=0 and y=αx), the eating behavior will be selected as a behavior so long as the value (a, a') lies in the eating behavior selecting area. When the value (a, a') lies in the eating behavior selecting area, the eating tendency $Be_t[0]$ on the left side of the equation (17) will have a positive value.

As the eating behavior is continuously selected, the influence of the occurrence of the eating behavior on the cause factors will be smaller so that the eating tendency $Be_t[0]$ will be smaller (weaker). When the eating tendency $Be_t$ is smaller, the value (a, a') will reach the eating/water-drinking behavior selecting area. That is, the value (a, a') will vary as indicated by the arrow $P_1$ in the graph shown in FIG. 17.

In the eating/water-drinking behavior selecting area, the eating behavior is selected. The eating tendency $Be_t[0]$ on the left side of the equation (17) will have a positive value. As the eating behavior is continuously selected, the influence of the occurrence of the eating behavior on the cause factors will be smaller so that the eating tendency $Be_t[0]$ will be smaller. Then the value (a, a') will change from the eating/water-drinking behavior selecting area to the water-drinking behavior selecting area (an area defined by x=0 and y=βx). That is, the value (a, a') will vary as indicated by the arrow $P_2$ in the graph shown in FIG. 17.

In the water-drinking behavior selecting area, the water-drinking behavior is selected. When the value (a, a') lies in water-drinking behavior selecting area, the water-drinking tendency $Be_t[1]$ on the left side of the equation (17) will have a positive value at this time.

Then, as the water-drinking behavior is continuously selected, the occurrence of the water-drinking behavior will have a smaller influence on the cause factors, the water-drinking tendency $Be_t[1]$ will be smaller. Then, the value (a, a') will go from the water-drinking behavior selecting area to the eating/water-drinking behavior selecting area. In the eating/water-drinking behavior selecting area, the water-drinking behavior is selected and the water-drinking tendency $Be_t[1]$ on the left side of the equation (17) will have a positive value. Further, as the water-drinking behavior is continuously selected, the water-drinking tendency $Be_t[1]$ will be smaller so that the value (a, a') will go from the eating/water-drinking behavior selecting area to the eating behavior selecting area. In the eating behavior selecting area, the eating behavior is selected again. That is, the change of the value (a, a') from the water-drinking behavior selecting area to the eating behavior selecting area is as indicated by the arrow $P_3$ in the graph shown in FIG. 17. The newly selected behavior is then switched to from the old one.

Also, providing two switching lines in the occurrence tendency space prevents frequent switching by behaviors, and thus the robot 1 can be prevented from thrashing between behaviors.

Since the eating tendency $Be_t[0]$ and water-drinking tendency $Be_t[1]$ vary as above, the value (a, a')=($Be_t[0]$, $Be_t[1]$) is specified in the occurrence tendency space based on the relation of the values of the eating and water-drinking tendencies, whereby a behavior is selected. At this time, either the eating tendency $Be_t[0]$ or water-drinking tendency $Be_t[1]$ in equation (17) will have a positive value, and the occurrence tendency taking the positive value will be a selected behavior. Such a behavior decision is made by the behavior decision unit 71 shown in FIG. 5.

Note that in the above, the embodiment of the present invention has been described concerning the example in which two behaviors, eating and water-drinking, are switched between them based on the eating tendency $Be_t[0]$ and water-drinking tendency $Be_t[1]$. Actually, however, more behaviors (a number n of behaviors) are compared with each other in the occurrence tendency space to select one of the behaviors. That is, a behavior is selected in an occurrence tendency space defined by n dimensions. For selection of one of n behaviors, the determinant given by the equation (18) is available.

$$\begin{bmatrix} Be_t[0] \\ \vdots \\ Be_t[n-1] \end{bmatrix} = \begin{bmatrix} Be_t[0] \\ \vdots \\ Be_t[n-1] \end{bmatrix} \begin{bmatrix} 0 & G[1][0] & \ldots & G[n-1][0] \\ \vdots & \vdots & \ddots & \vdots \\ G[0][n-1] & G[1][n-1] & \ldots & 0 \end{bmatrix} \begin{bmatrix} Be_{(t-1)}[0] \\ \vdots \\ Be_{(t-1)}[n-1] \end{bmatrix} \quad (18)$$

where G[i] and G[j] are gains of behavior arbitration (exclusive control) of occurrence tendency $Be_t[i]$ of a behavior against the occurrence tendency $Be_t[j]$ of another behavior.

With the above-mentioned algorithm, the occurrence tendency of each behavior can be determined based on cause factors such as a perception and motivation, and a behavior can be decided using the ethological approach in which a behavior is decided (selected) based on the strength (magnitude) of the occurrence tendency.

Note that when a behavior has been selected as shown in FIG. 17, it may be considered that the occurrence tendency is finally minimized to 0, namely, the eating tendency Be[0] and water-drinking tendency Be[1] are minimized to 0 (origin), which accounts for the fact that as a behavior is expressed as above, the influence of cause factors (e.g., a motivation) on the behavior approaches zero.

Figure 18:
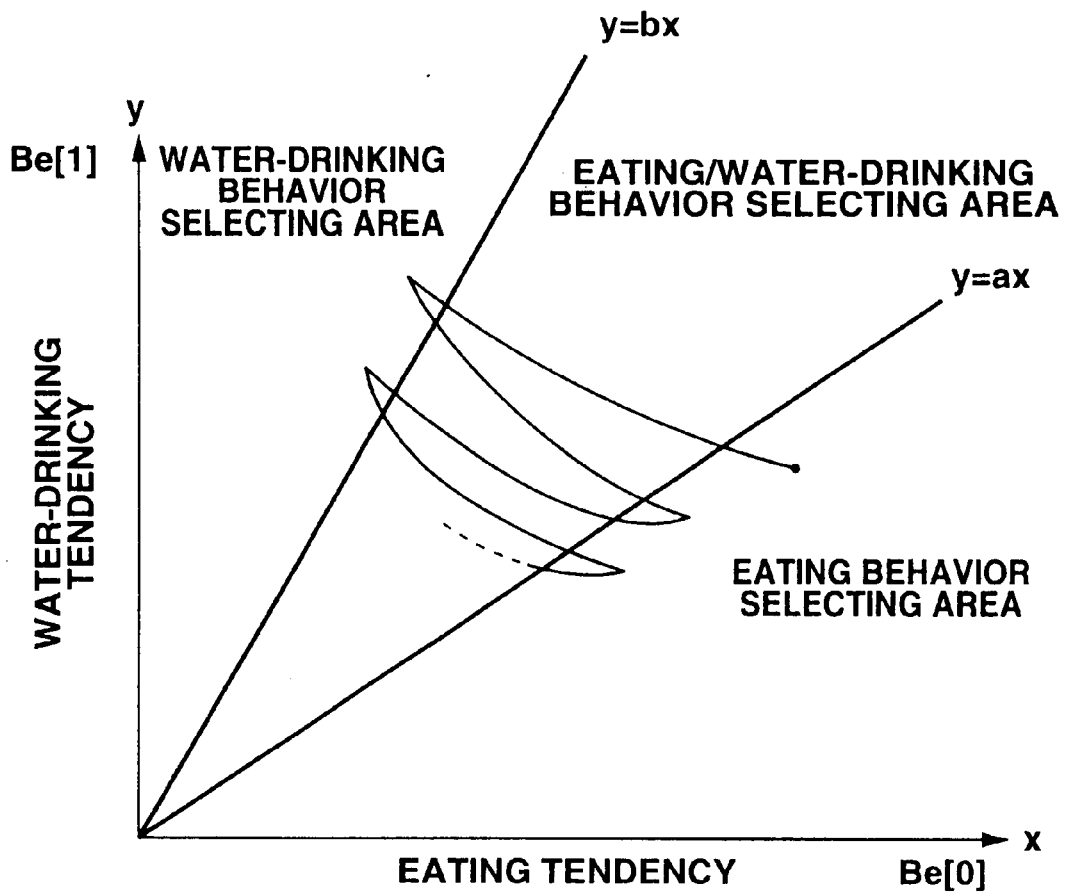
FIG. 18 shows a characteristic curve of the occurrence tendency space explaining the actual behavior selection by the robot apparatus.

However, there is no problem with the ethological approach-based behavior decision since the influence of the cause factors affecting selection of the currently unselected behavior is ongoing. That is, while the water-drinking behavior is being expressed, for example, the "hungry" state being one of the cause factors for the unselected eating behavior varies and thus the evaluation of "hunger" varies so that the eating tendency will be higher, which accounts for the fact that "sleeping" or "walking" enables recovery of the appetite. Namely, the occurrence tendency of an unselected behavior is recovered while the selected behavior is being expressed. This is shown in FIG. 18 for example.

The slopes α and β of the first and second switching lines can be set arbitrarily. Thus, by setting them adaptively to a stage of growth or character of the robot 1, it is possible to express such a behavior appropriately.

For example, the robot 1 has a growing behavior model by which different behaviors are expressed according to stages of growth. When the stage of growth is "infant", the slope a of the first switching line and slope β of the second switching line are taken to be near in value to each other and the eating/water-drinking behavior selecting area is narrowed correspondingly. When the stage of growth is "adult", the slope α of the first switching line and slope β of the second switching line are set to such values, respectively, that the eating/water-drinking behavior selecting area is wider.

Thus, when the robot 1 is at the stage of "infant", frequent switching is made between the eating behavior and water-drinking behavior and the robot 1 thrashes between behaviors. When the robot 1 is at the stage of "adult", switching between the eating and water-drinking behaviors is made at proper intervals and the robot 1 will behave more stably.

Also, the velocity of recovery of the occurrence tendency can be varied according to the level of growth. For example, when the level of growth is low, the recovery velocity is set high. When the growth level is high, the recovery velocity is set slow. In this case, when the robot 1 is at the "infant" stage, switching between the eating and water-drinking behaviors is made frequently. On the other hand, when the robot 1 is at the "adult" stage, switching between the eating and water-drinking behaviors is made appropriately. Thus, a similar effect is produced.

Note that occurrence tendencies are prevented from minimizing to zero by their recovery, but the minimization can be prevented also by computation.

In the foregoing, the formulae for realization of the ethological approach-based behavior decision in the robot 1 has been described. The behavior selection unit 80 selects a behavior using such formulae.

(3-6) Operations in the Behavior Selection Unit 80

The actual operations in the behavior selection unit 80 will be described below.

Figure 19:
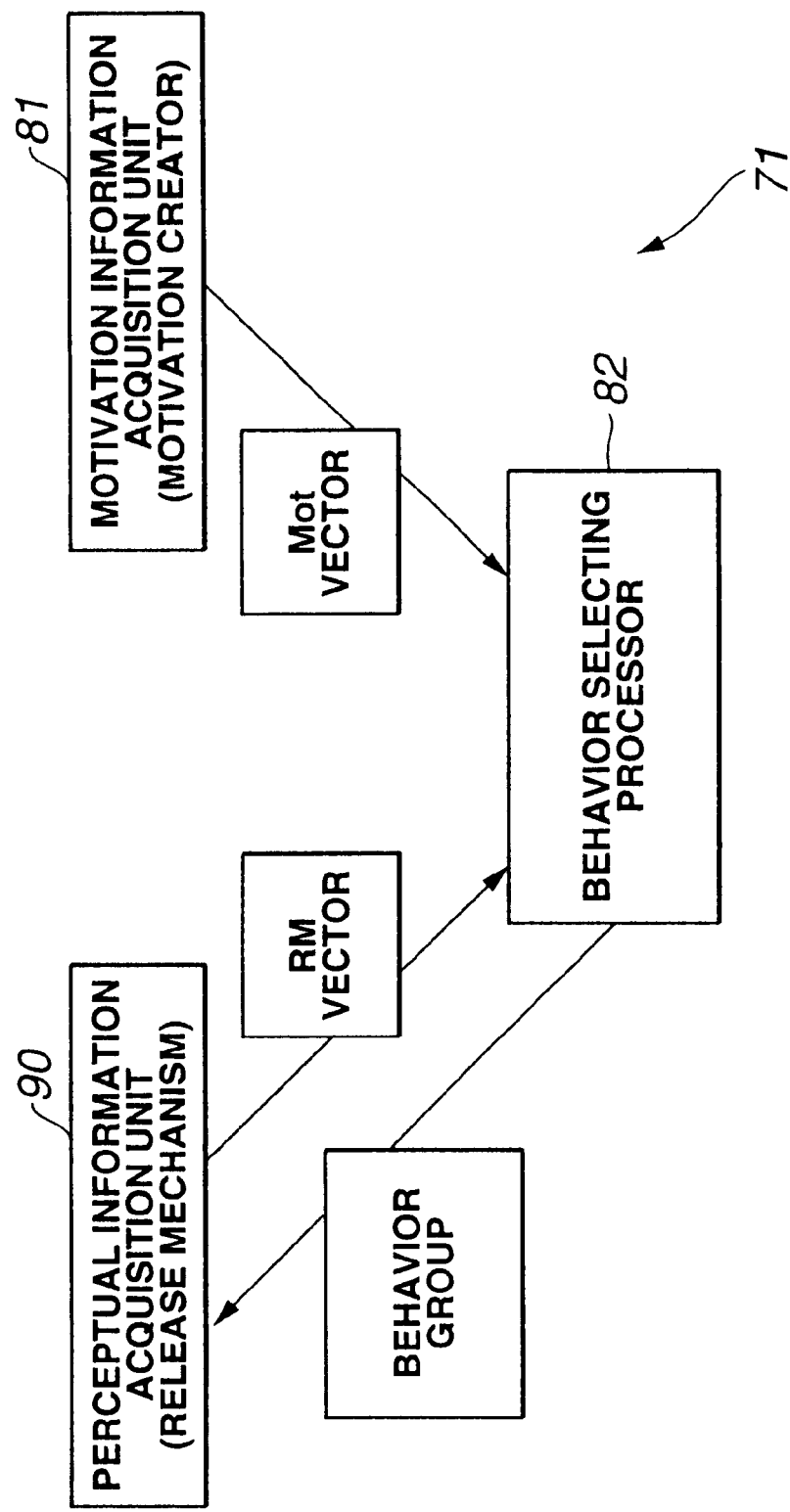
FIG. 19 is a block diagram showing the flow of information among the perceptual information acquisition unit, motivational information acquisition unit and behavior information selector included in the behavior selection unit.

As shown in FIG. 19, the behavior selection unit 80 includes the perceptual information acquisition unit (release mechanism) 90 to acquire perceptual information (RM), motivational information acquisition unit (motivation creator) 81 to acquire motivational information (Mot), and a behavior selecting processor 82 to select a behavior based on perceptual information (RM) and motivational information (Mot).

(3-6-1) Procedure for Acquisition of Occurrence Tendency

The procedure for determining an occurrence tendency $Be_t[i]$ based on perceptual evaluation (perceptual information) RM[i] and motivational state (motivational information) Mot[i] will be descried hereafter. The procedure for determination of an occurrence tendency Bet[i] consists mainly of computation of the value of the occurrence tendency before behavior arbitration(exclusive control) and computation of the value of the occurrence tendency after behavior arbitration(exclusive control). That is, the procedure for determination of the occurrence tendency $Be_t[i]$ consists mainly of computation of the occurrence tendency $Be_t[i]$ on the right side of the equation (18) and the occurrence tendency $Be_t[i]$ on the left side of the equation (18).

Figure 20:
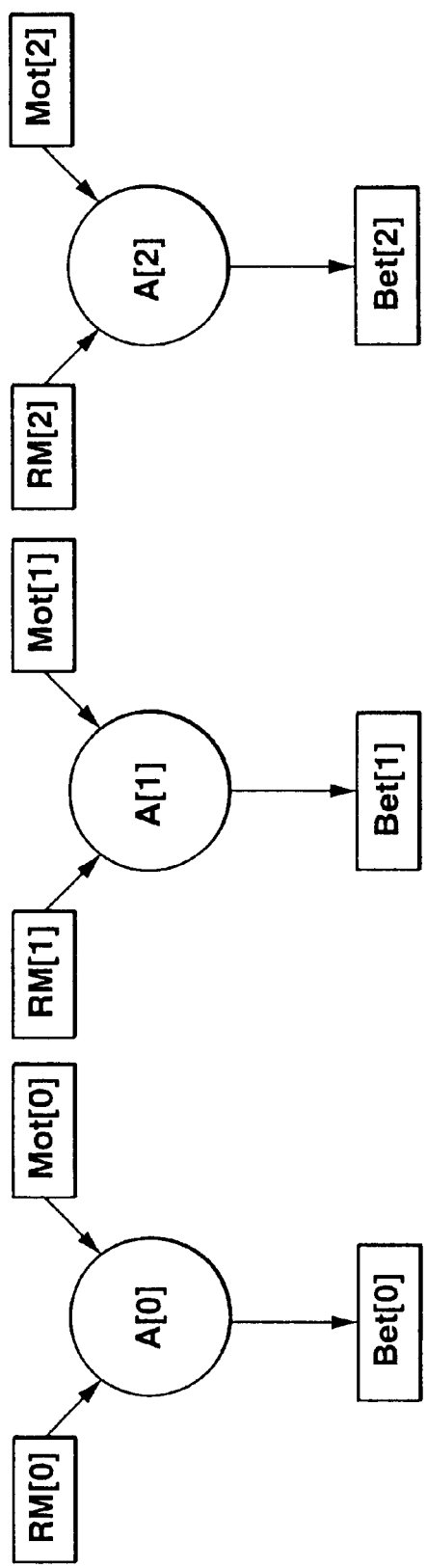
FIG. 20 explains the computation of an occurrence tendency before the behavior arbitration(exclusive control) is done.

The former and latter computations will be described taking, by way of example, the acquisition of occurrence tendencies $Be_t[i]$ of three different behaviors. The three different behaviors belong to the same behavior group. As shown in FIG. 20 for example, three perceptual evaluations, first to third, RM[0], RM[1] and RM[2] and three motivational states, first to third, Mot[0], Mot[1] and Mot[2] are used to acquire three corresponding occurrence tendencies, first to third, $Be_t[0]$, $Be_t[1]$ and $Be_t[2]$ for three different behaviors, respectively.

The three different behaviors whose tendencies of occurrence are to be compared include "eating behavior", "water-drinking behavior" and "eliminative behavior". For the first behavior "eating", the first perceptual evaluation RM[0] is "deliciousness" and the first motivational state Mot[0] is "hunger". For the second behavior "water drinking", the second perceptual evaluation RM[1] is "distance from water" and the second motivational state Mot[1] is "thirst". Finally, for the third behavior "elimination", the third perceptual evaluation RM[2] is "distance from defecation site" and the third motivational state Mot[2] is "desire to evacuate the bowels or urinate". The occurrence tendency space consists of these eating tendency $Be_t[0]$, water-drinking tendency $Be_t[1]$ and elimination tendency $Be_t[2]$.

The occurrence tendencies $Be_t[i]$ corresponding to the "eating behavior", "water-drinking behavior" and "eliminative behavior", respectively, based on the perceptual evaluations RM[i] and motivational states Mot[i] are computed as described below.

The occurrence tendency $Be_t[i]$ is computed using the following equation (19) from the perceptual evaluation RM[i] and motivational state Mot[i]:

$$Be_t[i]=RM[i]\times Mot[i] \qquad (19)$$

When the perceptual evaluation RM[i] and motivational state Mot[i] form an inverse proportional relation, where the relation can be expressed as given by the following equation (20):

$$RM[i]=A[i]/Mot[i] \qquad (20)$$

When the perceptual evaluation RM[i] is placed in equation (19), the coefficient A[i] can be acquired as $Be_t[i]$. Namely, in case that there is an inverse proportional relation between the perceptual evaluation RM[i] and motivational state Mot[i], the coefficient A[i] is computed as the occurrence tendency $Be_t[i]$.

With this computation, an occurrence tendency $Be_t[i]$ before behavior arbitration(exclusive control) can be computed. An occurrence tendency $Be_t[i]$ with consideration given to the behavior arbitration(exclusive control) can be computed by the following equation (21):

$$\begin{bmatrix} Be_t[0] \\ Be_t[1] \\ Be_t[2] \end{bmatrix} = \begin{bmatrix} Be_t[0] \\ Be_t[1] \\ Be_t[2] \end{bmatrix} - \begin{bmatrix} 0 & G[1][0] & G[2][0] \\ G[0][1] & 0 & G[2][1] \\ G[0][2] & G[1][2] & 0 \end{bmatrix} \begin{bmatrix} Be_{(t-1)}[0] \\ Be_{(t-1)}[1] \\ Be_{(t-1)}[2] \end{bmatrix} \qquad (21)$$

Figure 21:
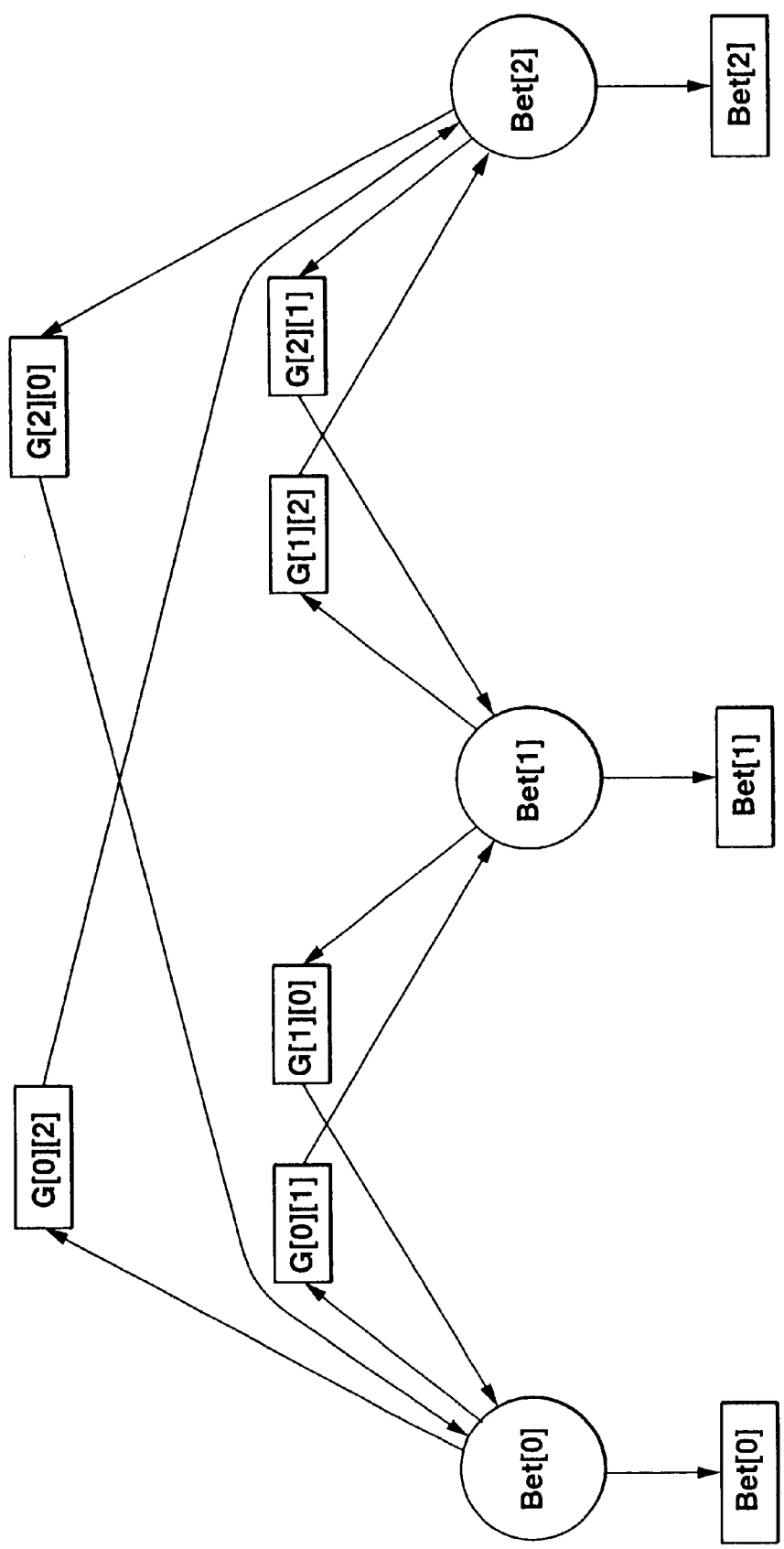
FIG. 21 explains the computation of an occurrence tendency under the behavior arbitration(exclusive control).

It can be visualized as shown in FIG. 21 that the first, second and third occurrence tendencies $Be_t[0]$, $Be_t[1]$ and $Be_t[2]$ are computed as arbitrated by behavior arbitration (exclusive control) gains G[i] and G[j] (i=0, 1, 2; j=0, 1, 2).

As above, an occurrence tendency before behavior arbitration(exclusive control) is computed, and an occurrence tendency is computed using the occurrence tendency before behavior arbitration(exclusive control) and with consideration given to the behavior arbitration(exclusive control).

Figure 22:
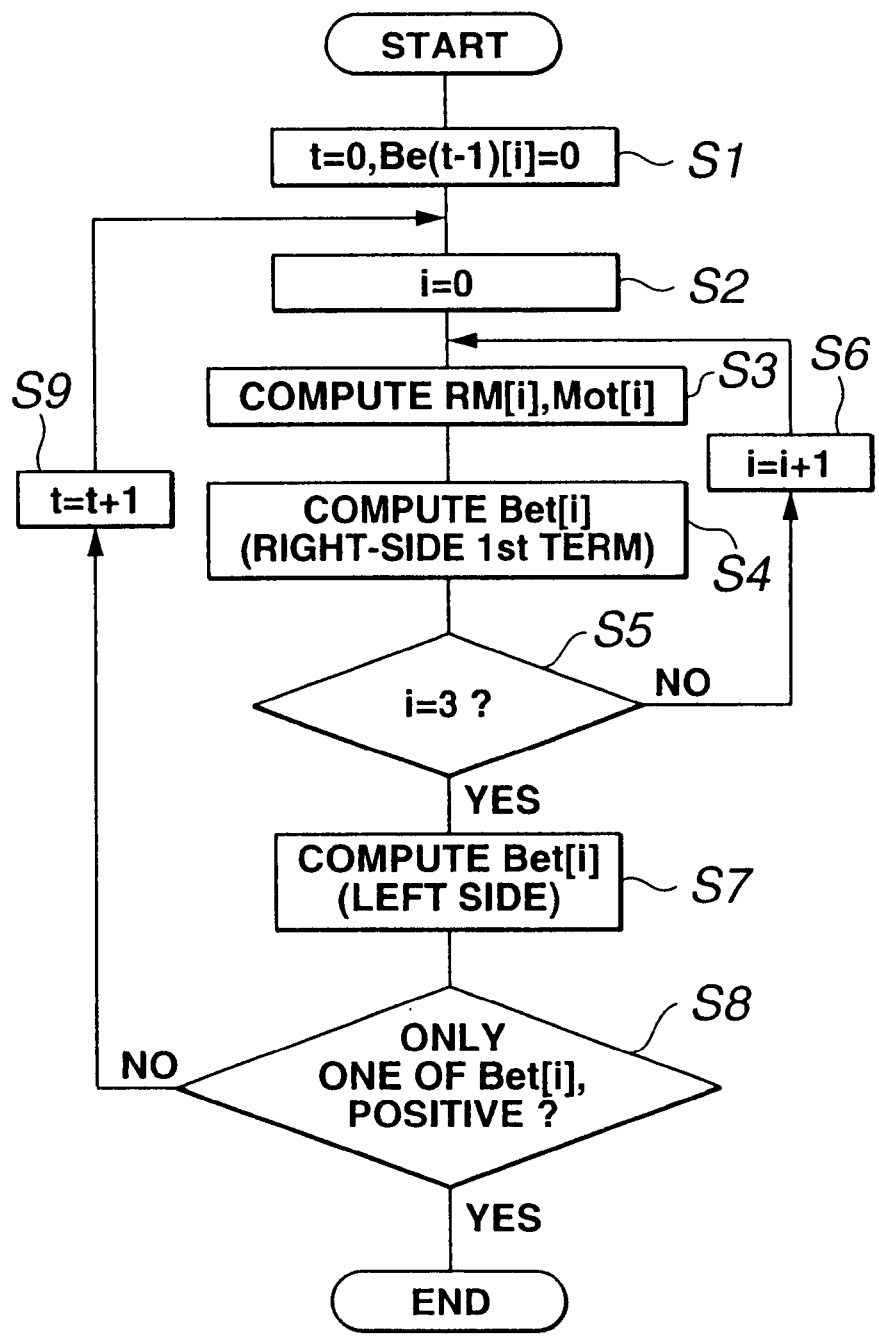
FIG. 22 shows a flow of operations made in computation of the occurrence tendency.

A series of these computations is effected by following the procedure as shown in FIG. 22 for example.

First in step S1, each value is initialized with t=0 and $Be_{(t-1)}[i]=0$. Then in steps S2 to S6, the value of the first term on the right side of the equation (21) is computed for $Be_t[0]$ to $Be_t[2]$. That is, an occurrence tendency $Be_t[i]$ before behavior arbitration(exclusive control) is computed. The operations in steps S2 to S6 are described below.

In step S2, it is assumed that i=0. Thus, the computation of $Be_t[0]$ is started.

In the next step S3, perceptual evaluation RM[0] and motivational state Mot[0] are computed. That is, for example the evaluation RM[0] of "deliciousness" and "hungry" state Mot[1] are acquired.

In step S4, an occurrence tendency $Be_t[0]$ for "eating behavior" is computed as the value of the first term on the right side of the equation (21).

Then in step S5, it is judged whether i=3. More particularly, it is judged whether the values of all the occurrence tendencies $Be_t[0]$ to $Be_t[2]$ to be compared have been computed.

When i=3, i is made i=i+1 in step S6 where the operations in step S3 and subsequent steps are repeated.

With the operations in steps S1 to S6, the water-drinking tendency $Be_t[1]$ and eliminative tendency $Be_t[2]$ will be computed as values before behavior arbitration(exclusive control), next to the eating tendency $Be_t[0]$.

In step S5, when i=3, the operation in step S7 will be performed. In step S7, the occurrence tendency $Be_t[i]$ (i=0 to 2) on the left side of the equation (21) is computed. That is, an occurrence tendency $Be_t[i]$ with consideration given to behavior arbitration(exclusive control) is computed using the equation (21).

Next in step S8, it is judged whether any one of the tendencies $Be_t[i]$ takes a positive value. When none of the tendencies $Be_t[i]$ is positive, the time t is made t=t+1 in step S9 where the operations in step S1 and subsequent steps are repeated. Thus, a iterative computation as given by the equation (21) will be effected. That is, computation is made using $Be_{(t-1)}[i]$ in place of the value $Be_t[i]$ having been acquired in the preceding step.

On the other hand, when any of the occurrence tendencies $Be_t[i]$ is positive, a behavior corresponding to that occurrence tendency $Be_t[i]$ is selected as the one behavior to actually be expressed, with exit from the behavior selection procedure.

As above, the occurrence tendency $Be_t[i]$ can be determined based on the perceptual evaluation (perceptual information) RM[i] and motivational state (motivational information) Mot[i].

(3-6-2) Operations in the Perceptual Information Acquisition Unit 90

Next, operation of the perceptual information acquisition unit 90 to acquire perceptual evaluation RM[i] and motivational information acquisition unit 81 to acquire motivational state Mot[i] will be described in detail below. First, the description is started with the perceptual information acquisition unit 90.

Figure 23:
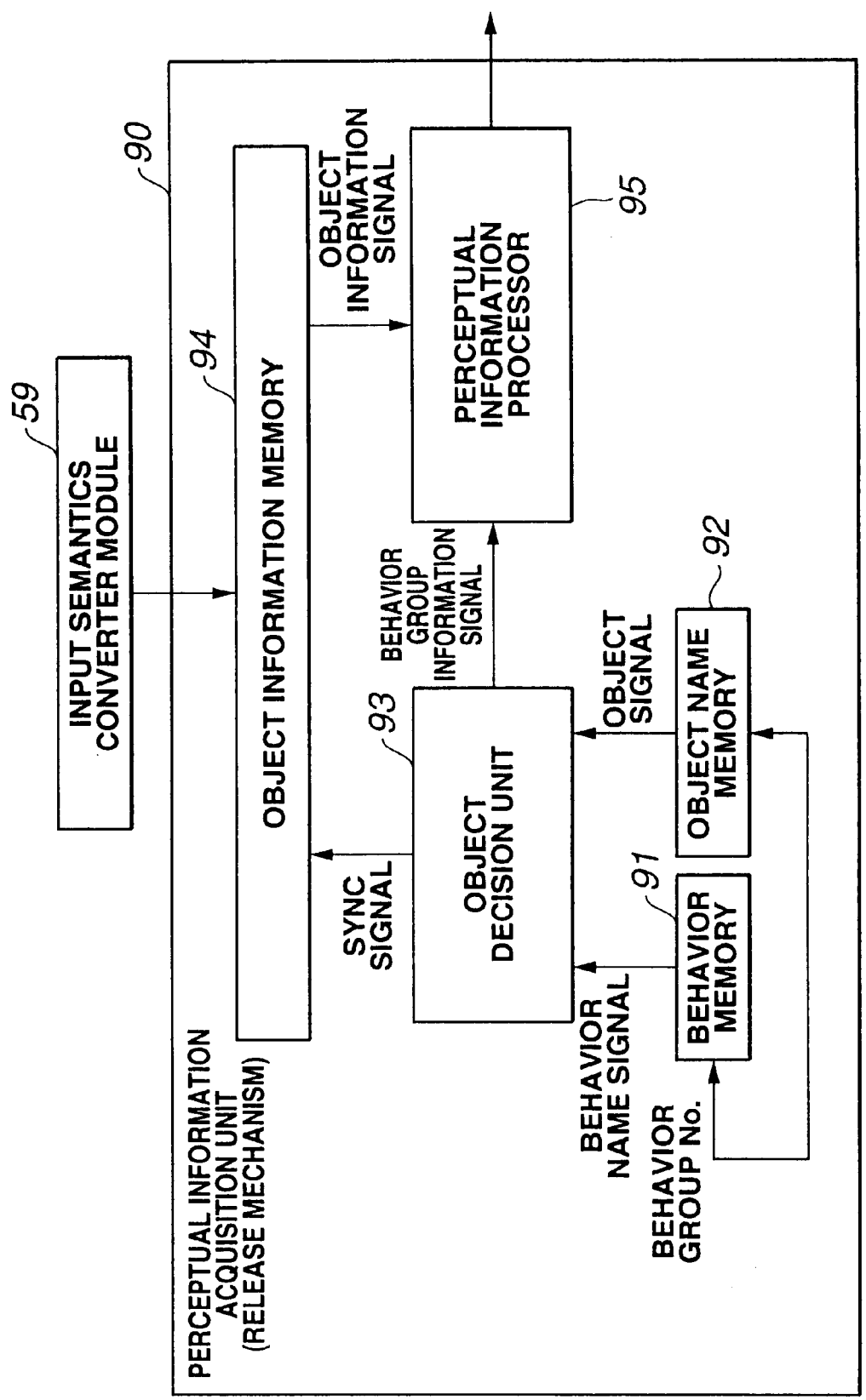
FIG. 23 is a block diagram of the perceptual information acquisition unit.

In response to external or internal information (recognition result), the perceptual information acquisition unit 90 acquires perceptual information (evaluation) being one of the cause factors of a behavior. As shown in FIG. 23, the perceptual information acquisition unit 90 includes a behavior memory 91, object name memory 92, object decision unit 93, object information memory 94 and perceptual information processor 95.

The behavior memory 91 stores a set of selectable memories in a data base for example.

Supplied with a behavior group number (signal), the behavior memory 91 outputs a set of behaviors whose tendencies of occurrence are to be compared as one behavior group in the object decision unit 93.

For example, "eating an apple (apple eating behavior)" will be considered in the following:

The "apple eating" behavior is finally expressed through "approaching the apple", "sniffing at the apple", "taking the apple into the mouth", "touching the apple", etc. "Approaching" is a behavior to shorten the distance from an object, "sniffing" is a behavior to bring the nose, for example, near to the object, "taking into the mouth" is a behavior to take the object into the mouth, and "touching" is a behavior to bring the hand (paw; leg) in contact with the object. These "approaching, "sniffing", "taking into the mouth" and "touching" behaviors can be made to all common edible objects. For example, when the object is an "orange", the behavior to shorten the distance from the object is "approaching the orange", the behavior to bring the nose close to the object is "sniffing at the orange", the behavior to take into the mouth is "taking the orange into the mouth", and the behavior to put the hand in contact with the orange is "touching the orange".

The behavior memory 91 outputs information on a set of behaviors such as "approaching, applicable to all common objects, as one behavior group to the object decision unit 93. That is, the behavior memory 91 provides the object decision unit 93 with behavior name information defined by extracting information on an object to which a low-order behavior which realizes a high-order behavior such as "eating an apple" is applied. The behavior name information output from the behavior memory 91 corresponds to behaviors whose tendencies of occurrence are compared with each other in the behavior selecting processor 82. Namely, the behavior name information is in a mutually-controlled relation with such behaviors themselves.

The behavior name information applicable to all common objects is held in the behavior memory 91 for the purposes of eliminating the necessity of defining a set of signals (commands) for one behavior applicable to different objects, thereby ensuring scalability, which would unavoidably be in case a behavior is defined for each of objects, in order to prevent any large difference in action from one object to another during reproduction of a similar behavior. Note that a special behavior should be defined together with information on an object for which the behavior is intended.

On the other hand, the object name memory 92 stores object names. The object name stored in the object name memory 92 is a one selected for a high-order behavior. For example, when the robot 1 recognizes the existence of an apple, a high-order behavior "eating an apple (apple eating behavior)" is selected. In this case, "apple" is stored as an object name into the object name memory 92, and the object name memory 92 will output the object name information to the object decision unit 93.

The aforementioned behavior memory 91 outputs low-order behavior-relevant behavior information applicable to all common objects to the object decision unit 93. The object name memory 92 will output one of the object names to the object decision unit 93. Therefore, the object decision unit 93 will form a set of behaviors whose tendencies of occurrence are to be compared with complete information from the information output (behavior name signal) from the behavior memory 91 and information output (object signal) from the object name memory 92.

The object decision unit 93 outputs a set of behavior information (behavior group signal) in a comparable form to the perceptual information processor 95. That is, the object decision unit 93 outputs, to the perceptual information processor 95, a pair of behavior names including one acquired by the behavior memory 91 and the other acquired by the object name memory 92.

Note that all the set of behaviors whose tendencies of occurrence are to be compared should not be in conjugation with corresponding objects. Namely, in response to information on a behavior not intended for any object, the object name memory 92 will output information "there is no corresponding object" to the object decision unit 93. The object decision unit 93 outputs, to the perceptual information processor 95, behavior information output from the behavior memory 91 as information on a behavior without corresponding objects.

The behavior memory 91, object name memory 92 and object decision unit 93, constructed as above, work as described below. For example, when supplied with a behavior group number "1", the behavior memory 91 will output "behavior 0", "behavior 1", "behavior 2" and "behavior 3" included in the behavior group number "1" to the object decision unit 93. On the other hand, the object name memory 92 outputs "food" for the "behavior 0", "water" for the "behavior 1", "no object" for the "behavior 2" and "no object" for the "behavior 3". In this example, the high-order behavior is an "ingestive behavior". When the high-order behavior is "eating an apple" as above, the object name memory 92 will output only "apple". Then, the object decision unit 93 will output a pair of each "behavior" from the behavior memory 91 and "object name" from the object name memory 92, as significant object information, to the perceptual information processor 95.

The input semantics converter module 59 outputs, to the object information memory 94, information on a perception supplied to the robot 1, and the object information memory 94 stores information on the perception sent from the input semantics converter module 59. Namely, the object information memory 94 stores parameters for perception evaluations used for computation of an occurrence tendency, such as objects "apple", "distance from the apple", "direction of the apple", etc.

Based on the object information (object information signal) from the object information memory 94 and behavior group information (behavior group information signal) from the object decision unit 93, the perceptual information processor 95 acquires perceptual evaluations RM[i] for behaviors whose tendencies of occurrence are compared in the behavior selecting processor 82. That is, for example, "distance from the apple" is used for perceptual evaluation of "eating the apple (apple eating behavior)" or Approaching the apple.

Then the perceptual evaluation RM[i] acquired by the perceptual information processor 95 is sent to the behavior selecting processor 82. For example, the perceptual evaluation RM[i] is sent as a vector magnitude from the perceptual information acquisition unit 90 to the behavior selecting processor 82 as shown in FIG. 19.

Note that a sync signal can be supplied from the object decision unit 93 to the object information memory 94. The sync signal can be used to provide synchronization between the output from the object decision unit 93 and that from the object information memory 94, whereby the perceptual information processor 95 can be supplied with a parameter corresponding to a behavior from the object decision unit 93 at a determined time. Basically, the robot 1 includes only one perceptual information acquisition unit 90. However, one perceptual information acquisition unit 90 may be provided for each of behaviors. In this case, the perceptual information acquisition unit 90 may work with consideration given only to the application of one behavior to all common objects, and thus the behavior memory 91 becomes unnecessary. In this example, the behavior selection unit is constructed from a set of objects as will be described in detail later.

Figure 24:
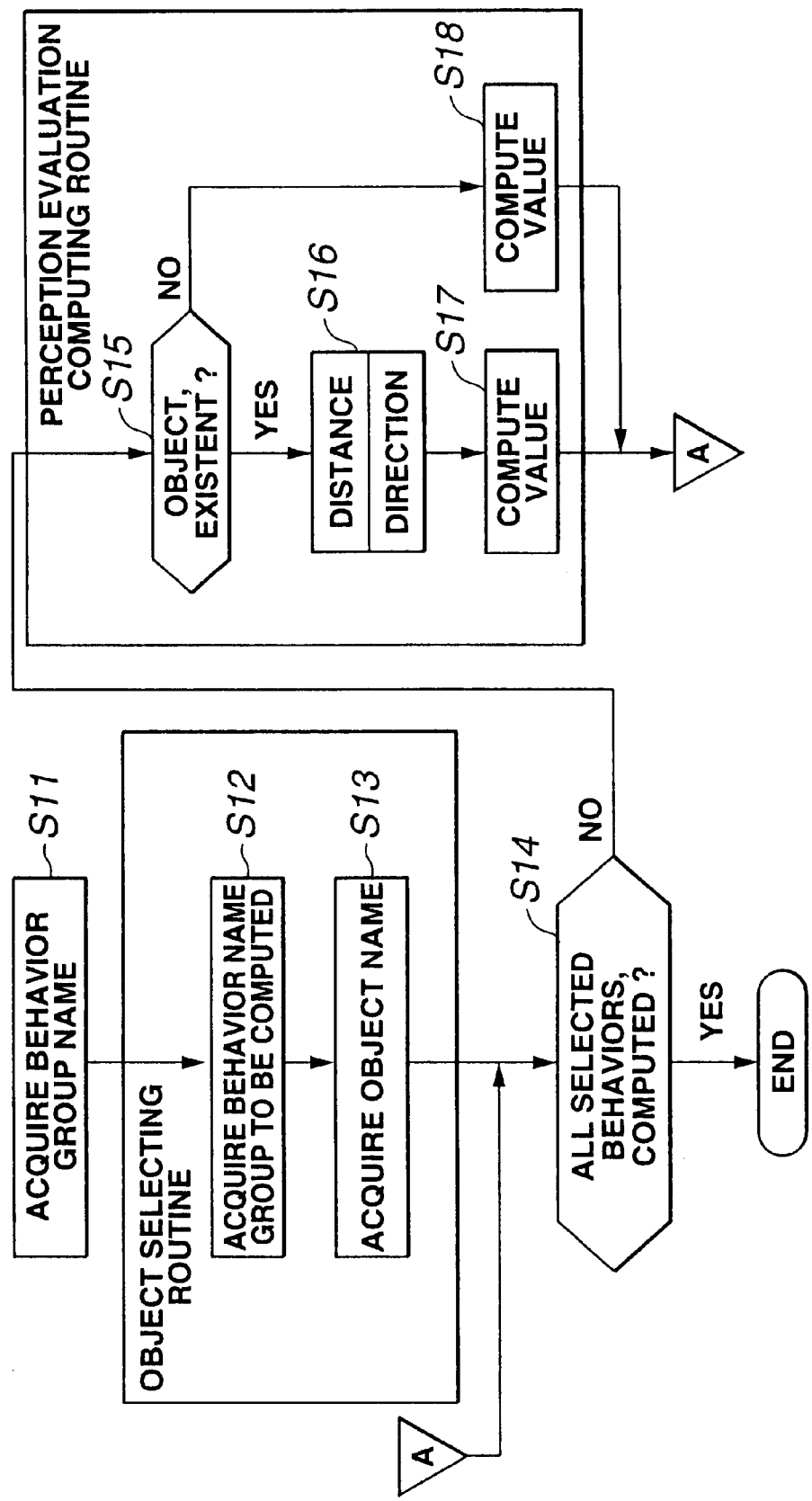
FIG. 24 shows a flow of operations made in the perceptual information acquisition unit.

The operating procedure of the perceptual information acquisition unit 90 is described with reference to FIG. 24.

First in step S11, a behavior group name is acquired. The behavior group includes the low-order behaviors of "eating an apple", such as "approach to the apple", "sniffing at the apple", etc.

Next, an object selecting routine is executed. Through the object selecting routine, the behavior name group is acquired in step S12. Thus, a set of behaviors (behavior information in a form applicable to all common objects) is stored in the behavior memory 91. The behavior information defines behavior names such as "approaching, "sniffing", etc.

In step S13, an object name is acquired. Thus, the acquired behavior name through the high-order behavior is stored in the object name memory 92. The object name is for example "apple".

The object selecting routine is then executed to acquire a behavior name group and object name. Next in step S14, it is judged whether perceptual evaluation RM[i] has been computed for all selected behaviors in the perceptual information processor 95. In case the perceptual evaluation RM[i] has been computed for all the selected behaviors, the procedure is terminated. When the computation of the perceptual evaluation RM[i] is not complete for all the selected behaviors, a perceptual evaluation computing routine is executed.

The perceptual evaluation computing routine is executed in the perceptual information processor 95 and consists of the following steps.

In step S15, it is judged whether there exists an object. When the judgment is that an object exists, the procedure goes to step S16. On the other hand, if the judgment is "No", the procedure goes to step S18.

In step S16, the perceptual information processor 95 will acquire a distance and direction of the object (parameters for acquisition of perceptual evaluation) from the object information memory 94, and computes a perceptual evaluation (value) RM[i] in step S17. Namely, for example, an evaluation RM[i] of "approach to the apple" is computed from "distance from the apple". Note that the distance is detected by the distance sensor 22 while the direction is detected using an image supplied from the CCD camera 20 or the like.

On the other hand, in step S18, the perceptual information processor 95 computes a perceptual evaluation (value) RM[i] without any object. This operation is applicable to a behavior to be evaluated and not intended for any object.

The perceptual evaluation computing routine is executed until it is judged in step S14 that the perceptual evaluation RM[i] has been computed for all the behaviors whose tendencies of occurrence are to be compared (a set of behaviors included in the behavior group). That is, with the operations in step S14 and perceptual evaluation computing routine, perceptual evaluation RM[i] is computed for all the behaviors included in the behavior group.

When it is judged in step S14 that the perceptual evaluation RM[i] has been computed for all the behaviors included in the behavior group, the procedure is terminated.

The perceptual information acquisition unit 90 operates as above. With the perceptual information acquisition unit 90, it is possible to acquire perceptual evaluation RM[i] for a set of behaviors in the behavior group, whose occurrence tendencies are to be compared.

(3-6-3) Operations in the Motivational Information Acquisition Unit 81

Figure 25:
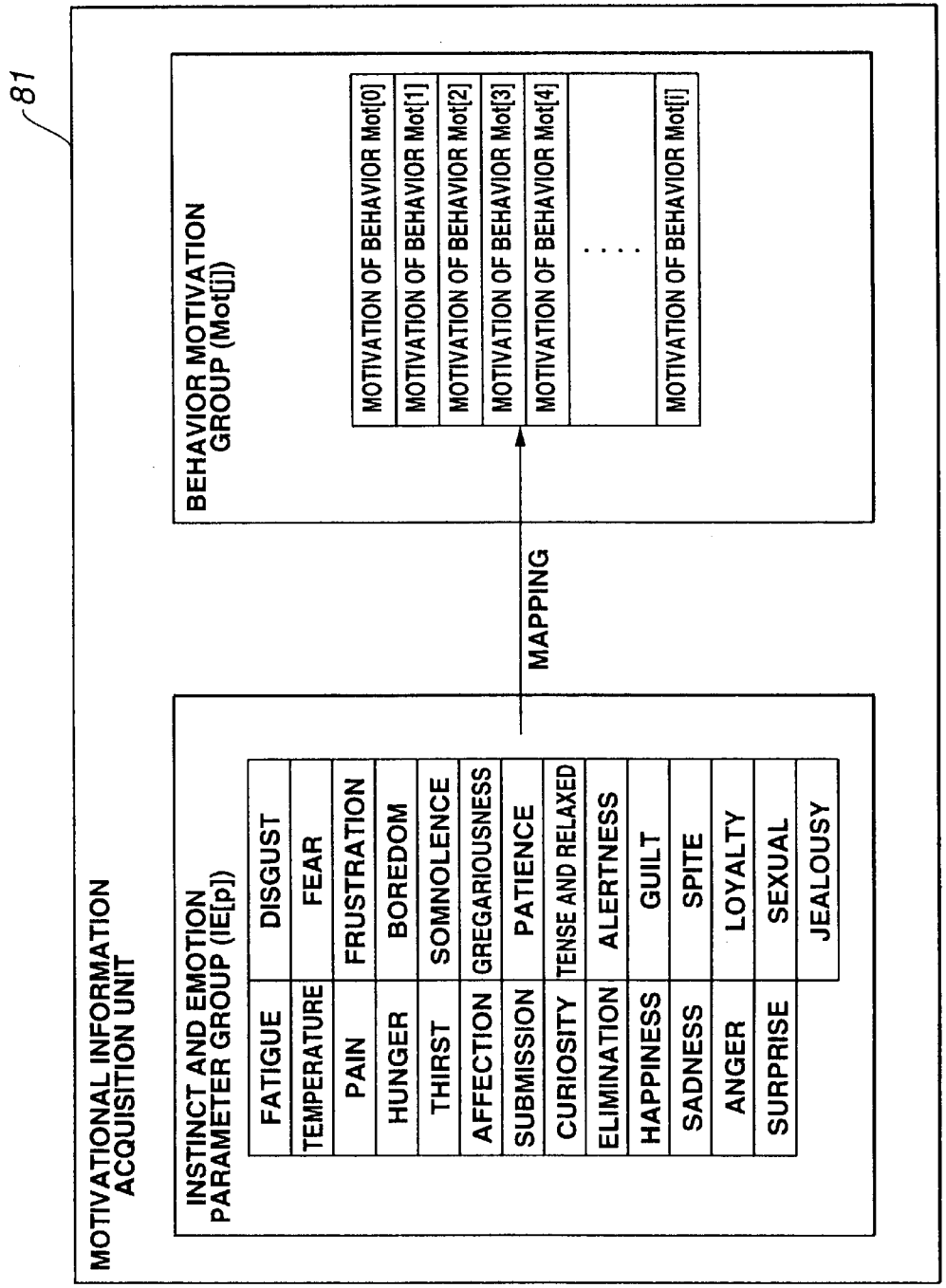
FIG. 25 explains the motivational information acquisition unit.

The motivational information acquisition unit 81 acquires a motivation being one of the cause factors of a behavior based on the states of instinct and emotion, varying adaptively to external or internal information (recognition result). The motivational information acquisition unit 81 has a set of instinct/emotion parameters IE[p] (instinct/emotion parameter group) as shown in FIG. 25, and acquires a set of motivations Mot[i] for a behavior. More specifically, the motivation for a behavior is acquired as described below.

The instinct/emotion parameter group IE[p] consists of information which can be influenced by instinct and emotion. More particularly, it consists of a set of parameters determined by the aforementioned internal state model. Namely, the instinct/emotion parameters include for example "fatigue", "temperature", "pain", "hunger", "thirst", "affection", "submission", "curiosity", "elimination", "happiness", "sadness", "anger", "surprise", "disgust", "fear", "frustration", "boredom", "somnolence", "gregariousness", "patience", "tense/relaxed", "alertness", "guilt", "spite", "loyalty", "sexual", "jealousy", etc.

The behavior motivation group Mot[i] corresponds to a set of behaviors included in the same behavior group. For example, such behaviors include "hunger" etc. for "ingestive behavior" and "thirst" etc. for "water-drinking behavior".

The motivational information acquisition unit 81 maps the instinct/emotion parameters IE[p] to compute a motivation Mot[i] for each of the behaviors using the following equation (22).

$$\begin{bmatrix} Mot[0] \\ Mot[1] \\ \vdots \\ Mot[2] \end{bmatrix} = \begin{bmatrix} K[0][0] & K[0][1] & K[0][m] \\ K[1][0] & K[1][1] & K[1][m] \\ \vdots & \vdots & \vdots \\ K[i][0] & K[i][1] & K[i][m] \end{bmatrix} \begin{bmatrix} IE[0] \\ IE[1] \\ \vdots \\ IE[m] \end{bmatrix} \quad (22)$$

The equation (22) is used to multiply the instinct/emotion parameter IE[p] by a coefficient K[i][p] to compute a motivation Mot[i] for each of the behaviors by mapping as a linear sum. The motivation Mot[i] computed as determinant is sent as a vector magnitude from the motivational information acquisition unit 81 to the behavior selecting processor 82 as shown in FIG. 19.

Taking motivations for "investigative", "demanding" and "resting" behaviors by way of example, the robot behaviors will be described later. The motivation Mot[0] for the "investigation" behavior, Mot[1] for "demanding" behavior and Mot[2] for the "resting" behavior are given by the following equation (23):

$$Mot[i] = \begin{bmatrix} \text{Invetigative} \\ \text{Demanding} \\ \text{Resting} \end{bmatrix} \quad (23)$$

Also, K[i][p] is given by the equation (24):

$$K[i][p] = \begin{bmatrix} -10 & 10 & 0 \\ 0 & 0 & 15 \\ 10 & -5 & 0 \end{bmatrix} \quad (24)$$

Also, the instinct/emotion parameter IE[p] is given by the following equation $$IE[p] = \begin{bmatrix} \text{Fatigue} \\ \text{Curiosity} \\ \text{Affection} \end{bmatrix} \quad (25)$$

Thus, the motivations for the "investigative", "demanding" and "resting" behaviors are given by the equation (26):

$$\begin{bmatrix} \text{Invetigative} \\ \text{Demanding} \\ \text{Resting} \end{bmatrix} = \begin{bmatrix} -10 & 10 & 0 \\ 0 & 0 & 15 \\ 10 & -5 & 0 \end{bmatrix} \times \begin{bmatrix} \text{Fatigue} \\ \text{Curiosity} \\ \text{Affection} \end{bmatrix} \quad (26)$$

In the equation (26), "investigation" is a function of an instinct/emotion parameter in which "fatigue" acts as a negative factor while "curiosity" acts as a positive factor. Also, the "demanding" is a function of an instinct/emotion parameter in which "affection" acts as a positive factor. "Resting" is a function of an instinct/emotion parameter in which "fatigue" acts as a positive factor while "curiosity" acts as a negative factor.

The first example in which the instinct/emotion parameter IE[p] is [10, 50, 20] will be considered here. In this state, the curiosity is high. The "investigative" Mot[0] is 400 (=−100+500+0), "demanding" Mot[1] is 300 (=0+0+300), and "resting" Mot[2] is −150 (=−100−250+0).

Next, a second example in which the instinct/emotion parameter IE[p] is [70, 10, 30] will be considered. This state means that the robot is fatigued by the investigation. In this state, the "investigation" Mot[0] is −600 (=−700+100+0), "demanding" Mot[1] is 450 (=0+0+450), and "resting" Mot[2] is 650 (=700−50+0).

A third example in which the instinct/emotion parameter IE[p] is [30, 20, 60] will be considered. In this state, the fatigue has been reduced somehow and the affection is high. The "investigation" Mot[0] is −100 (=−300+200+0), "demanding" Mot[1] is 300 (=0+0+300), and "resting" Mot[2] is 200 (=300−100+0).

As above, a behavior motivation Mot[i] can be acquired based on the instinct/emotion parameter group IE[p] and coefficient K[i][m]. By appropriately mapping the instinct/emotion parameter group K[i][p], it is possible to acquire a desired motivation Mot[i] for acquisition of the tendency for occurrence RM[i]. That is, motivations such as "thirsty" and "hungry" as above can also be acquired.

The motivational information acquisition unit 81 operates as above. For each behavior, a motivation Mot[i] can be acquired by the motivational information acquisition unit 81. The motivation acquired by the motivational information acquisition unit 81 is variable based on the parametric values of the instinct and emotion, and as a result, the motivation will be reflected in a selected behavior. For example in the above example, the behavior reflects the motivation.

Basically, the desire increases with time elapsed. Therefore, it will continuously increase unless gratified. When the curiosity becomes high, the robot 1 will start an investigation (as above first example). As the robot 1 walks around during the investigation, the fatigue will increase correspondingly. The curiosity itself will decrease along with the investigation. If no information is supplied to the robot 1 even after walking for a while, the curiosity decreases and fatigue increases so that the behavior of the robot 1 is switched to "resting" (as above second example). After some resting, the fatigue is decreased while the affection increased with time elapsed, and the behavior of the robot 1 is switched to "demanding" (as above third example). Thus, the motivation will be reflected in a selected behavior.

Note that the value of the aforementioned coefficient K[i][p] may be set arbitrarily. With the coefficient K[i][p] arbitrarily set, mapping by the instinct/emotion parameter IE[p] for acquisition of a motivation Mot[i] can be varied widely. With the coefficient K[i][p] thus set, mapping can be made in accordance with the kind and growth level of an animal applied to the robot 1.

In the foregoing, there has been described in detail the perceptual information acquisition unit 90 to acquire a perceptual evaluation RM[i] and motivational information acquisition unit 81 to acquire a motivational state Mot[i]. Based on a perceptual evaluation RM[i] and motivational state Mot[i] acquired by the perceptual information acquisition unit 90 and motivational information acquisition unit 81, respectively, the behavior selecting processor 82 selects one of the behaviors.

The above behavior selection is done until a behavior in the lowest behavior layer is selected. That is, the behavior selection system is constructed in the form of a hierarchy as shown in FIG. 7. The behavior selection with the perceptual evaluation RM[i] and motivational information Mot[i] is effected in each layer as mentioned above until one of the behaviors in the lowest layer (behavior to actually be output) is decided. Namely, as shown in FIG. 6B, the "ingestive behavior" is the result of the selection made in the subsystem layer based on perceptual evaluation RM[i] and motivational information Mot[i], "water-drinking behavior" is the result of the selection made in the mode layer consisting of a group of further realized behaviors based on the perceptual evaluation RM[i] and motivational information Mot[i], "approach to water" is the result of the selection made in the module layer consisting of a group of further realized behaviors based on the perceptual evaluation RM[i] and motivational information Mot[i], and "move forward(advance)" is the result of the selection made in the motor command layer consisting of a group of further realized behaviors based on the perceptual evaluation RM[i] and motivational information Mot[i]. With these operations, the "eating behavior" being an abstract behavior (as a desire) is realized by actual behaviors such as "move forward" etc.

Note that for selection of a behavior in each layer, the occurrence tendency of the behavior is computed based on cause factors such as perception and motivation and the behavior is selected based on the result of computation but motivational information used for computation of the tendency for occurrence of the behavior may be common to all the layers. That is, for example when the "ingestive behavior" is a high-order behavior, all behaviors subordinate to the high-order behavior are intended for realization of the "ingestive behavior". With this fact taken in consideration, the low-order behaviors are intended to appease the "hunger (thirst)". Therefore, for the low-order behaviors realizing the "ingestive behavior", the "hunger(thirst)" is motivational information (cause factor).

Note that the above is not always true for the perception. This is due to the fact that the perceptual information (external intelligent elements) for "approach to water" includes "distance from water" but "direction of water" is the most suitable as perceptual information for "move forward(advance)" subordinate to "approach to water" in some cases.

(3-7) Operations in the Modulator 72

The modulator 72 and the output semantics converter module 68 which will be described later operate to actually express a behavior selected by the behavior selecting processor 82 as above.

The modulator 72 decides a behavior to finally be expressed based on a behavior selected by the behavior selection unit 80 and representative emotional information (representative emotional signal) received from the internal-state model unit 71.

The representative emotional information output from the internal-state model unit 71 indicates the current emotional state of the robot 1. For example, the internal-state model unit 71 outputs an instinct (desire) or emotion whose parametric value is the largest of the representative emotional information.

The modulator 72 modulates a behavior selected by the behavior selection unit 80 based on the above representative emotion. Namely, the modulator 72 works to express an emotion by a behavior.

As above, it is not necessary to directly express a current emotion as a behavior of the robot 1 but the above procedure is effective for expression of an emotional behavior. That is, in case the robot 1 is not really angry but only a little angry, a behavior selected by the behavior selection unit 80 is accompanied with some "disgust".

The modulator 72 outputs information on a behavior selected and modulated with the above emotion to the output semantics converter module 68. For example, the modulator 72 outputs behavior information as an abstract-behavior command to the output semantics converter module 68.

The output semantics converter module 68 supplies the signal processing modules 61 to 67 with the output corresponding to the behavior information from the modulator 72. Thus, the robot 1 will output, as an actual behavior, the behavior decided by the behavior decision system 70.

The behavior decision system 70 has been described in the foregoing. Owing to this behavior decision system 70, the internal-state model unit 71 can change the internal state such as instinct and emotional states of the robot 1 based on the recognition result from the input semantics converter module 59. Also, the behavior selection unit 80 can select a behavior to be expressed by the robot 1 from a set of behaviors based on the recognition result from the input semantics converter module 59.

Then the modulator 72 generates behavior information having emotion added thereto based on the internal state acquired by the internal-state model unit 71 and behavior acquired by the behavior selection unit 80, and outputs the behavior information with the emotion to the output semantics converter module 68.

(4) Operations of the Output Semantics Converter Module 68

The output semantics converter module 68 holds information on the type (biped or quadruped), shape, etc. of the robot 1, and controls the signal processing modules 61 to 67 to realize behavior information from the modulator 72 according to the information related to the robot 1. In case the robot 1 is of quadruped type for example, since the output semantics converter module 68 knows that the robot 1 is of the quadruped type, when it is supplied with behavior information "advance(move forward)" from the modulator 72, it outputs a command to the signal processing modules which control the four legs in order to realize the behavior "advance". At this time, receiving the abstract behavior commands from the modulator 72, the output semantics converter module 68 will send a command to each of the signal processing modules 61 to 67 which control the four legs.

The signal processing modules 61 to 67 control the corresponding device-based commands from the output semantics converter module 68. Thus, a behavior decided (selected) in the aforementioned behavior decision system 70 will be expressed as an actual behavior of the robot 1.

Also, the robot 1 behaves with the posture and motion thereof being managed. Each component of the robot 1 works independently in principle but since the posture and motion are thus managed, the robot 1 is inhibited from making a predetermined motion independently.

As shown in FIG. 1, the robot 1 includes the body unit 2 and the leg units 3A to 3D, head unit 4 and tail unit 5, all coupled to the body unit 2. Thus, basically in the robot 1, these units can move independently for a selected behavior under the control of the signal processing modules 61 to 67. However, the interference between the units will result in appropriate motion in some cases. Also, transition from a current posture to an intended posture or motion is impossible in certain cases.

To prevent any unreasonable or impossible posture or such the interference between the units, the units are aligned with each other to manage the posture and motion. In the robot 1, the posture and motion are managed by the signal processing module (posture management module) 61 shown in FIG. 4.

More particularly, when the posture management module 61 is supplied with an instruction "move forward(advance)" while the robot 1 is in the sitting position, search is made for a posture changing path along which the posture is changed from "sitting" to "walking" state. For example, search is made for a posture changing path along which the posture is changed from "sitting" to "walking" state through a set of postures and motions. Then, based on the result of the search for the posture changing path from the "sitting" to "walking" state, instructions are sent to the signal processing modules according to the order of the changing paths in order to realize a posture and motion on the changing path. Thus, in the robot 1, a desired target posture and motion, namely, a behavior having been decided by the aforementioned behavior decision system 70, can be realized with the prevention of any impossible or unreasonable posture or interference between the units.

The construction and operations of the robot 1 have been described in the foregoing. Owing to the aforementioned construction, the robot 1 can output a behavior decided using the ethological approach. Thus, the robot 1 will have an improved likeness to a living thing or a creature and the user will feel more familiar and satisfactory with the robot 1.

(5) Other Modes for Carrying out the Present Invention

In the foregoing, the best mode for carrying out the present invention has been described concerning the robot 1. However, the present invention can be embodied in any of the modes which will be described below.

In the aforementioned embodiment, the behavior decision system 70 finally decides to select a behavior with reference to motivational information. For example, in the example shown in FIG. 6B, the behavior "move forward(advance)" is selected with reference to motivational information. However, a final behavior selection may be decided without reference to such motivational information.

Figure 26A:
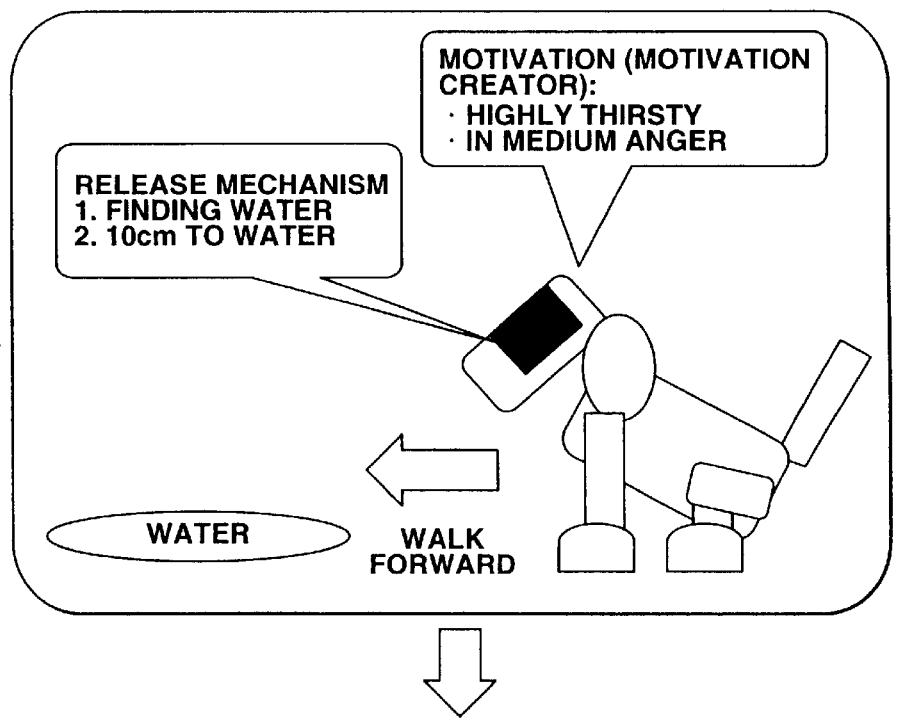
FIGS. 26A and 26B explain another embodiment of the robot apparatus according to the present invention, in which selection of behavior in a lower layer of the hierarchy-structure behavior selection system is not influenced by any motivation.
Figure 26B:
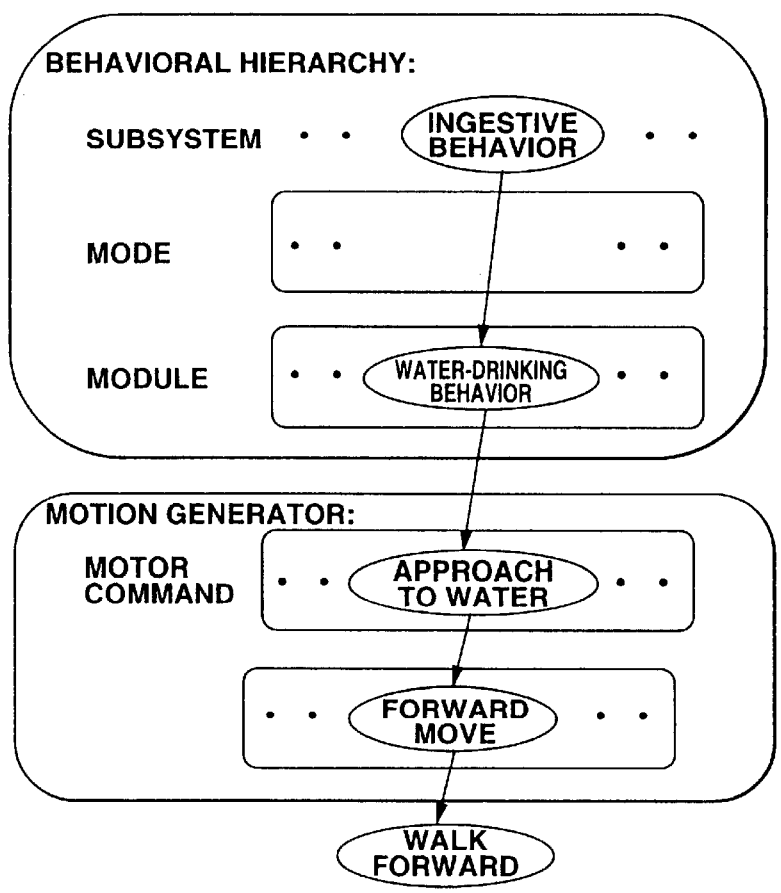

More specifically, as shown in FIGS. 26A and 26B for example, a behavior "approach to water" subordinate to "ingestive behavior" and further a behavior "move forward" subordinate to the behavior "approach to water" are selected with reference to information (except for motivational information), such as perceptual information such as distance from the object in consideration. For example, when a certain behavior (indeterminate behavior) is intended, a motivation will greatly act on the selection of the behavior. The behavior range including possible behaviors is narrowed and then with the possible behaviors being dissociated from the motivation, the behavior selecting procedure (the behavior selecting thought) is switched to one for realization of the behaviors. Namely, a behavior finally selected is decided so as not to be influenced by the motivation. Then, for example, perceptual information is used for final decision of the behavior. Note that it may be defined that the mode layer is the 0-th layer while the module layer is the first layer.

Figure 27:
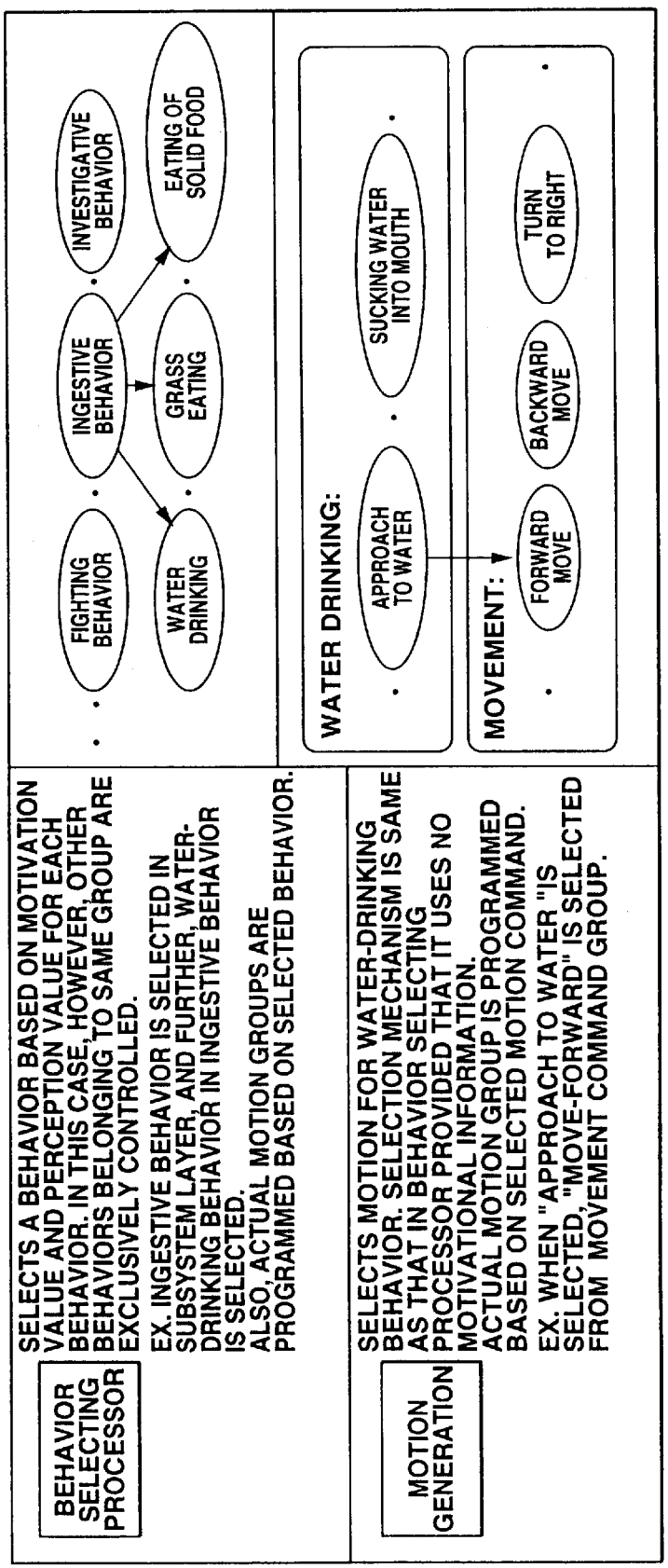
FIG. 27 explains functions of the behavior selecting processor and action generator in the second embodiment of the robot apparatus according to the present invention.
Figure 28:
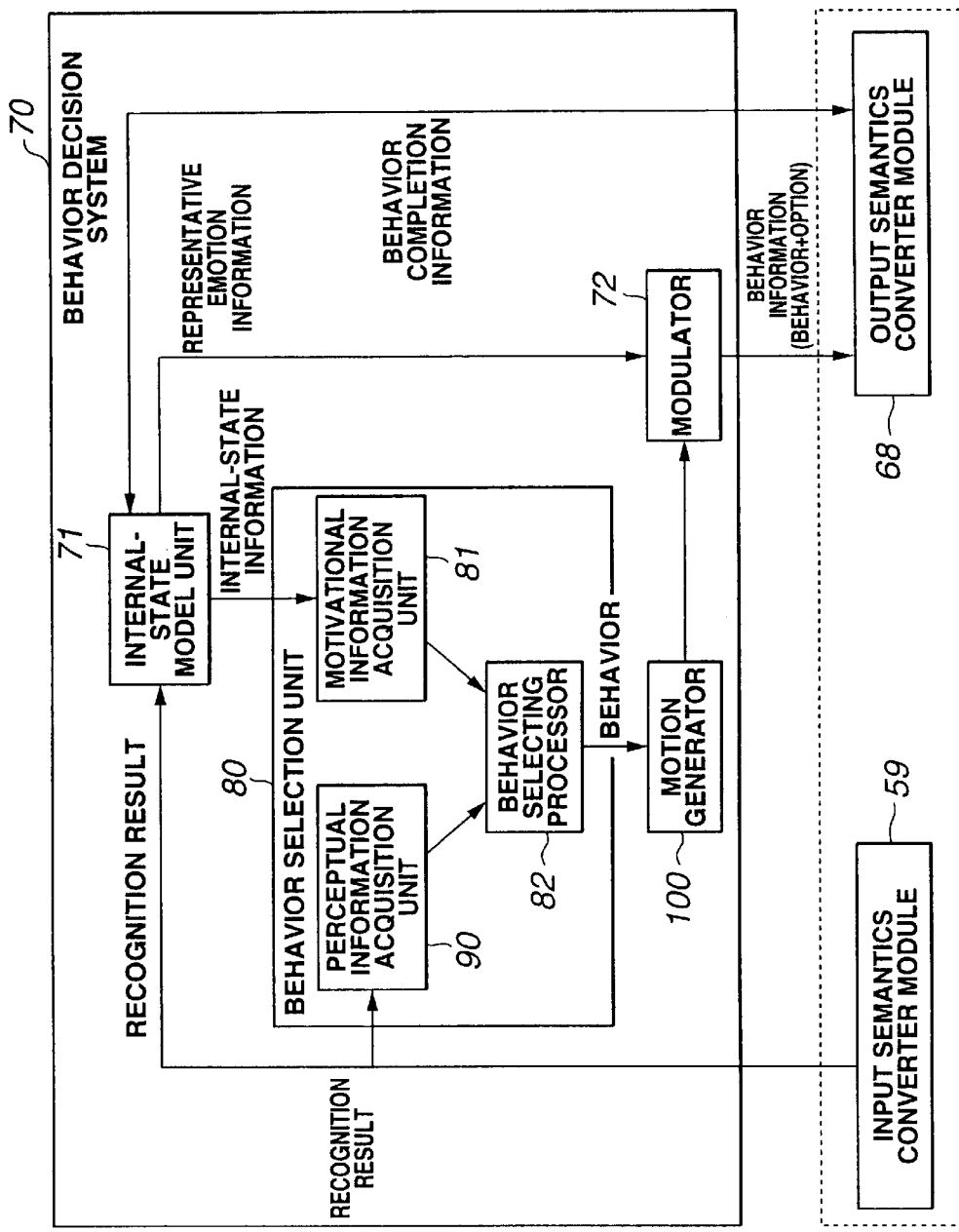
FIG. 28 is a block diagram of the behavior decision system in the second embodiment of the robot apparatus.

For example, to decide a behavior not based on motivational information as above, a motion generator 100 is provided as shown in FIGS. 27 and 28. The motion generator 100 selects a behavior "approach to water" and a motion subordinate to the former behavior and which will realize a motion "move forward(advance)", from behaviors selected by the behavior selecting processor based on perceptual information etc. Then, the motion generator 100 outputs the selected motion to the modulator 72 which will output a behavior modulated with an emotion sent from the internal-state model unit 71 as above.

Figure 29:
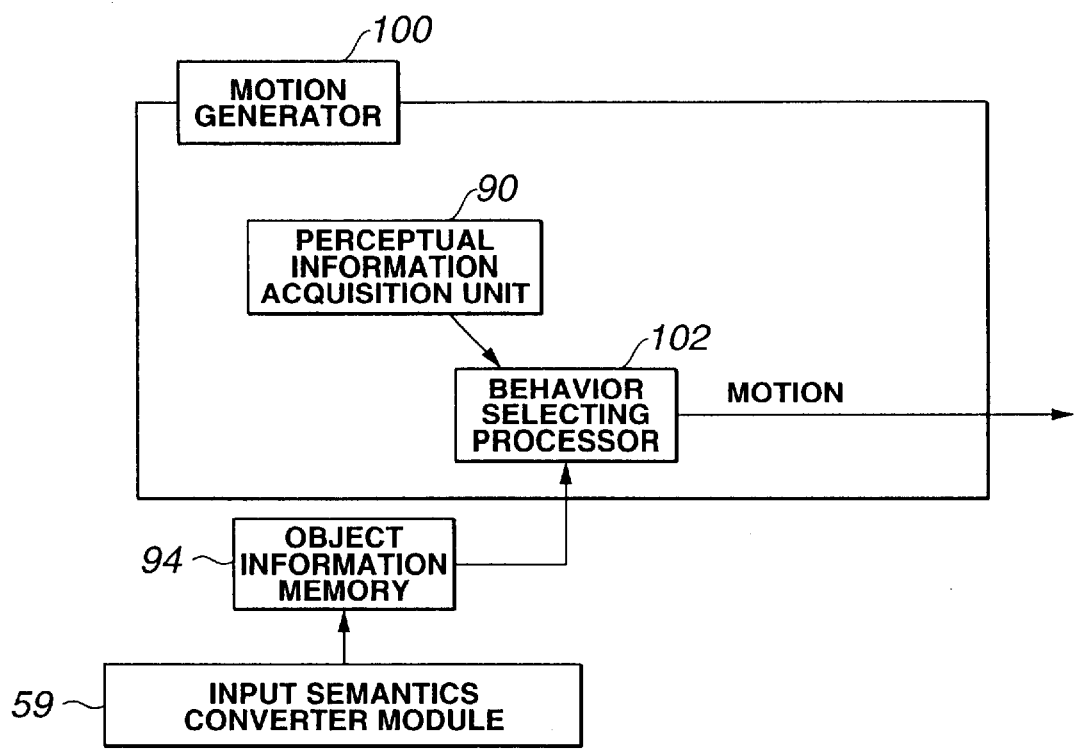
FIG. 29 is a block diagram of the action generator.

More specifically, the motion generator 100 includes a perceptual information acquisition unit 90 and a behavior selecting processor 102 as shown in FIG. 29. For example, an object information memory 94 also provided in the motion generator 100 to store various kinds of information from the output semantics converter module 68 is used to select a motion in the behavior selecting processor 102. Thus, when the intended behavior is "move forward (advance)", the motion generator 100 uses only information such as a distance from the object (e.g, information that the distance to the object is 10 cm) and the direction to the object (e.g., information that the object is to the right of the robot 1), both elements of information stored in the object information memory 94, to select a motion in the behavior selecting processor 102.

In the aforementioned embodiment, one of a set of behaviors is selected by the behavior selection unit 80. For example, the behavior selection unit 80 holds information on a set of behaviors and decides one of the behaviors based on the data on the behaviors. However, the present invention is not limited to this manner of behavior decision.

For example, the behavior decision system 70 can have the behavior decision part thereof designed as object-oriented. Note that even when the behavior decision system is built as objected-oriented, the hierarchical structure consisting of high-order behaviors and low-order behaviors is used as is. For selection of a behavior, a behavior is selected in units of object from the behavior group organized in units of object. More specifically, the behavior decision system has a hierarchical structure consisting of a set of behavior selection units (object or thread) $80_1$, $80_2$ and $80_3$ for selection of a behavior as shown in FIG. 30.

Figure 30:
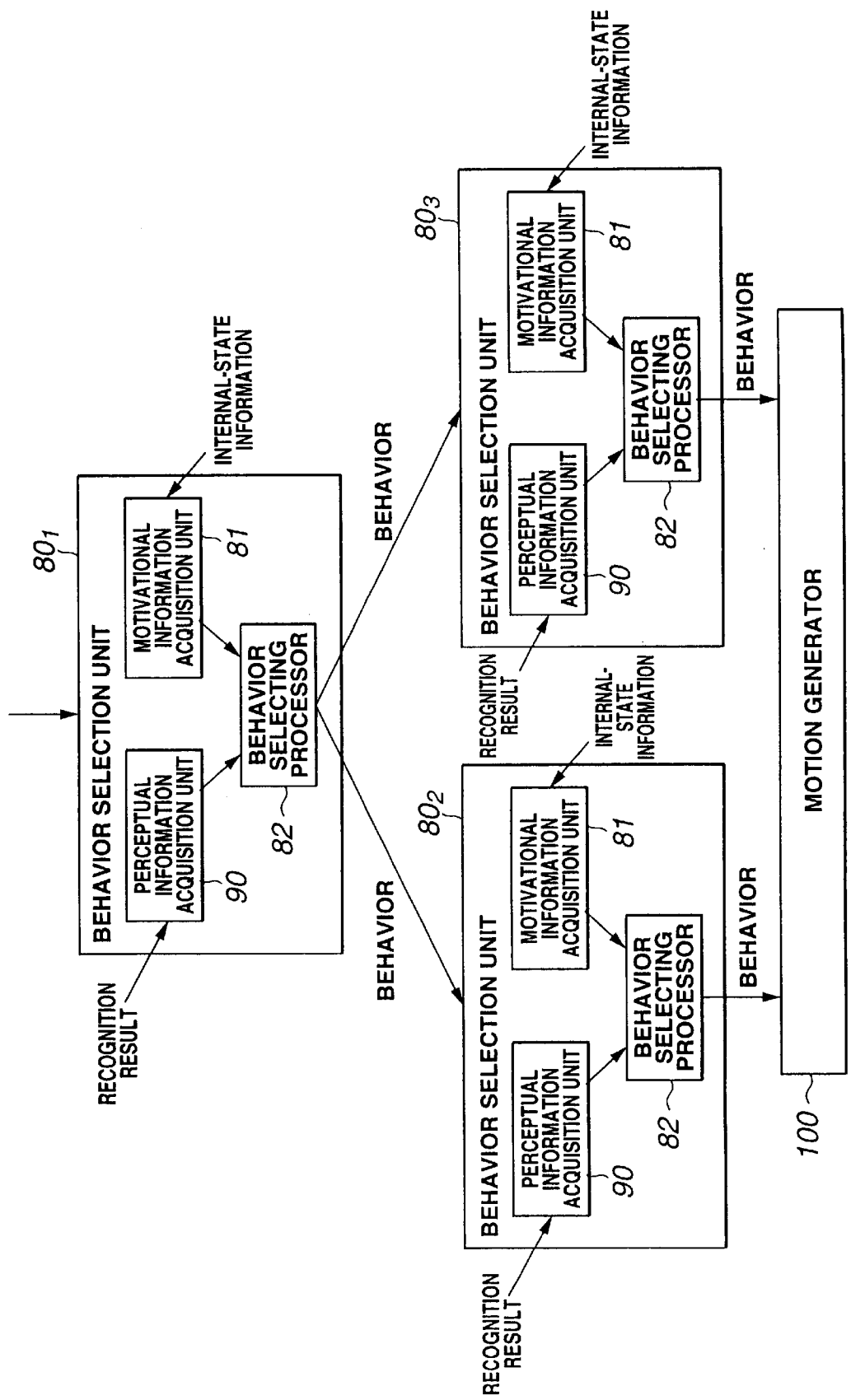
FIG. 30 is a block diagram of the multiple behavior selection units as objects.

In this embodiment, the behavior selection units as objects are provided in two layers, upper and lower, as shown in FIG. 30. Needless to say, however, the present invention is not limited to this configuration of the behavior decision system 70.

Each of the behavior selection units $80_1$, $80_2$ and $80_3$ includes a perceptual information acquisition unit 90, motivational information acquisition unit 81 and behavior selection processor 82 similar to the behavior selection unit 80 in the behavior decision system 70.

In this case, based on a behavior selected by the behavior selection unit $80_1$ in the higher layer, the behavior selection units $80_2$ and $80_3$ in the lower layer select a behavior. Namely, the behavior selection in the upper layer leads to the behavior selection by one of the behavior selection units in the lower layer. The behavior selection unit in the lower layer will select a lower-order behavior.

Then, the behavior selection unit located in the lowest layer of such a behavior decision system consisting of the set of behavior selection units 801, 802 and 803 will deliver information on the selected behavior to the aforementioned motion generator 100.

With the behavior decision system intended for the object-oriented behavior decision, it is not necessary to always know how the entire system stands regarding the behavior decision, whereby the burden of the behavior decision can be reduced. For the addition of a new behavior, it suffices to add a corresponding new object, whereby it is made unnecessary to rewrite all the data for selection of behaviors. The addition of a new behavior means acquisition of a new behavior by learning or addition of a new behavior, incidental to a change of the growth level.

The behavior group configurations of the subsystem layer (SUBSYSTEM), mode layers (MODE1 and MODE2) and module layer (MODULE) shown in FIG. 6B or 26B are shown in further detail in FIGS. 31 and 32. Industrial Applicability In the robot apparatus having been described in the foregoing, external or internal information is detected by a detecting-means, a cause factor influencing the behavior is acquired by a cause factor acquiring means from the external or internal information detected by the detecting-means, an occurrence tendency of the cause factor-influenced behavior is acquired by an occurrence tendency acquiring means based on the cause factor acquired by the cause factor acquiring means, a comparison is made by an occurrence tendency comparing means among occurrence tendencies of two or more behaviors, acquired by the occurrence tendency acquiring means and belonging to the same group, one of the behaviors is selected by a behavior selecting means based on the result of the occurrence tendency comparison made by the occurrence tendency comparing means, and the moving parts of the robot apparatus are controlled by moving part controlling means based on the behavior selected by the behavior selecting means to have the robot apparatus express the selected behavior. Briefly, the robot apparatus selects one of the behaviors through a comparison between occurrence tendencies of the behaviors, decided under the influence of the cause factor, and expresses the behavior as an ethological approach.

In the aforementioned method for deciding the behavior of a robot apparatus, external or internal information is detected by a detecting-means in an information detecting step, a cause factor influencing the behavior of the robot apparatus is acquired in a cause factor acquiring step from the external or internal information detected in the information detecting step, an occurrence tendency of the cause factor-influenced behavior is acquired in an occurrence tendency acquiring step based on the cause factor acquired in the cause factor acquiring step, a comparison is made in an occurrence tendency comparing step among occurrence tendencies of two or more behaviors, acquired in the occurrence tendency acquiring step and belonging to the same group, one of the behaviors is selected in a behavior selecting step based on the result of the occurrence tendency comparison made in the occurrence tendency comparing step, and the moving parts of the robot apparatus are controlled in a moving part controlling step based on the behavior selected in the behavior selecting step to have the robot apparatus express the selected behavior. Briefly, the robot apparatus selects one of the behaviors through a comparison between occurrence tendencies of the behaviors, decided under the influence of the cause factor, and expresses the behavior as an ethological approach.

What is claimed is:

1. A robot apparatus whose moving parts are controlled to make the robotic device behave expressively, the device comprising:

means for detecting external or internal information;

means for acquiring a cause factor influencing the behavior from the external or internal information detected by the information detecting-means;

means for acquiring an occurrence tendency of the cause factor-influenced behavior based on the cause factor acquired by the cause factor acquiring means;

means for making a comparison among occurrence tendencies of two or more behaviors, acquired by the occurrence tendency acquiring means and belonging to the same group;

means for selecting one of the behaviors based on the result of the occurrence tendency comparison made by the occurrence tendency comparing means; and means for controlling the moving parts based on the behavior selected by the behavior selecting means to have the robot apparatus express the selected behavior;

wherein the occurrence tendency of the behavior selected by the behavior selecting means being varied adaptively to the cause factor which is variable due to the actual occurrence of the behavior; and wherein a set of behaviors are organized in the form of a hierarchical structure such that a number of low-order behaviors are associated with a high-order behavior.

2. The device of claim 1, wherein the cause factor acquiring means acquires at least a cause factor concerning the perception and a cause factor concerning the motivation.

3. The device of claim 2, wherein the cause factor acquiring means acquires the cause factor concerning the motivation, consisting of instinctive or emotional elements.

4. The device of claim 3, wherein the instinctive elements includes at least one of "fatigue", "temperature", "pain", "hunger", "thirst", "affection", "curiosity", "elimination" and "sexual", and the emotional elements include at least one of "happiness", "sadness", "anger", "surprise", "disgust", "fear", "frustration", "boredom", "somnolence", "gregariousness", "patience", "tense", "relaxed", "alertness", "guilt", "spite", "loyalty", "submission"and "jealousy".

5. A robot apparatus whose moving parts are controlled to make the robotic device behave expressively, the device comprising:

means for detecting external or internal information;

means for acquiring a cause factor influencing the behavior from the external or internal information detected by the information detecting-means;

means for acquiring an occurrence tendency of the cause factor-influenced behavior based on the cause factor acquired by the cause factor acquiring means;

means for making a comparison among occurrence tendencies of two or more behaviors, acquired by the occurrence tendency acquiring means and belonging to the same group;

means for selecting one of the behaviors based on the result of the occurrence tendency comparison made by the occurrence tendency comparing means;

means for controlling the moving parts based on the behavior selected by the behavior selecting means to have the robot apparatus express the selected behavior;

wherein the occurrence tendency of the behavior selected by the behavior selecting means is varied adaptively to the cause factor which is variable due to the actual occurrence of the behavior;

a behavior selection system in which a set of behaviors are organized in the form of a hierarchical structure, a set of low-order behaviors belonging to the same group indicating concrete behaviors of high-order behavior, and wherein:

the occurrence tendency comparing means compares occurrence tendencies of the set of low-order behaviors in the group corresponding to the high-order behavior;

the behavior selecting means selects a low-order behavior based on the result of the occurrence tendency comparison by the occurrence tendency comparing means; and when the behavior selected by the behavior selecting means is a lowest-order one, the moving part controlling means controls the moving parts based on the lowest-order behavior.

6. The device of claim 5, wherein:

the cause factor acquiring means acquires a cause factor concerning the perception and a cause factor concerning the motivation; and the occurrence tendency acquiring means acquires the occurrence tendency of at least one behavior in the lowest layer based on the cause factor concerning the perception.

7. The device of claim 1, further comprising a set of objects for the behavior selection; and wherein the cause factor acquiring means, occurrence tendency acquiring means and behavior selecting means are implemented by the objects, respectively.

8. The device of claim 1, wherein the occurrence tendency comparing means compares a set of occurrence tendencies by behavior arbitration(exclusive control) between the occurrence tendencies of behaviors whose tendencies of occurrence are to be compared.

9. The device of claim 1, wherein the detecting-means is a sensor.

10. The device of claim 9, wherein the cause factor acquiring means acquires a cause factor for evaluation of a behavior from sensor information being external or internal information detected by the sensor.

11. A method for deciding the behavior of a robot apparatus whose moving parts are controlled to have the robot apparatus behave expressively, the method comprising the steps of:

detecting external or internal information of the robot by an information detecting-means;

acquiring a cause factor influencing the behavior from the external or internal information detected in the information detecting step;

acquiring an occurrence tendency of the cause factor-influenced behavior based on the cause factor acquired in the cause factor acquiring step;

making a comparison among occurrence tendencies of two or more behaviors, acquired in the occurrence tendency acquiring step and belonging to the same group;

selecting one of the behaviors based on the result of the occurrence tendency comparison made in the occurrence tendency comparing step; and controlling the moving parts based on the behavior selected in the behavior selecting step to have the robot apparatus express the selected behavior;

wherein the occurrence tendency of the behavior selected in the behavior selecting step being varied adaptively to the cause factor which is variable due to the actual occurrence of the behavior; and wherein a set of behaviors are organized in the form of a hierarchical structure such that a number of low-order behaviors are associated with a high-order behavior.

12. The method of claim 11, wherein in the cause factor acquiring step, there are acquired at least one cause factor concerning the perception and a cause factor concerning the motivation.

13. The method of claim 12, wherein in the cause factor acquiring step, there is acquired the cause factor concerning the motivation, consisting of instinctive or emotional elements.

14. The device of claim 13, wherein the instinctive elements includes at least one of "fatigue", "temperature", "pain", "hunger", "thirst", "affection", "curiosity", "elimination"and "sexual", and the emotional elements include at least one of "happiness", "sadness", "anger", "surprise", "disgust", "fear", "frustration", "boredom", "somnolence", "gregariousness", "patience", "tense", "relaxed", "alertness", "guilt", "spite", "loyalty", "submission"and "jealousy".

15. The device of claim 11, wherein:

the robot apparatus further comprises a set of objects for the behavior selection; and the cause factor acquiring step, occurrence tendency acquiring step and behavior selecting step are executed by the objects, respectively.

16. The device of claim 11, wherein in the occurrence tendency comparing step, a set of occurrence tendencies is compared by behavior arbitration(exclusive control) between the occurrence tendencies of behaviors whose tendencies of occurrence are to be compared.

17. The device of claim 11, wherein the detecting-means is a sensor.

18. The device of claim 17, wherein in the cause factor acquiring step, there is acquired a cause factor for evaluation of a behavior from sensor information being external or internal information detected by the sensor.

19. A method for deciding the behavior of a robot apparatus whose moving parts are controlled to have the robot apparatus behave expressively, the method comprising the steps of:

detecting external or internal information of the robot by an information detecting-means;

acquiring a cause factor influencing the behavior from the external or internal information detected in the information detecting step;

acquiring an occurrence tendency of the cause factor-influenced behavior based on the cause factor acquired in the cause factor acquiring step;

making a comparison among occurrence tendencies of two or more behaviors, acquired in the occurrence tendency acquiring step and belonging to the same group;

selecting one of the behaviors based on the result of the occurrence tendency comparison made in the occurrence tendency comparing step;

controlling the moving parts based on the behavior selected in the behavior selecting step to have the robot apparatus express the selected behavior;

the occurrence tendency of the behavior selected in the behavior selecting step being varied adaptively to the cause factor which is variable due to the actual occurrence of the behavior wherein the robot apparatus further comprises a behavior selection system in which a set of behaviors are organized in the form of a hierarchical structure, a set of low-order behaviors belonging to the same group indicating concrete behaviors of high-order behavior;

wherein in the occurrence tendency comparing steps, there are compared occurrence tendencies of the set of low-order behaviors in the group corresponding to the high-order behavior;

wherein in the behavior selecting step, there is selected a low-order behavior based on the result of the occurrence tendency comparison made in the occurrence tendency comparing step; and wherein in the moving part controlling step, when the behavior selected in the behavior selecting step is a lowest-order one, the moving parts is controlled based on the lowest-order behavior.

20. The device of claim 19, wherein:

in the cause factor acquiring step, there is acquired a cause factor concerning the perception and a cause factor concerning the motivation; and in the occurrence tendency acquiring step, there is acquired the occurrence tendency of at least one behavior in the lowest layer based on the cause factor concerning the perception.

* * * * *